US009464893B2

(12) United States Patent
Vanko et al.

(10) Patent No.: US 9,464,893 B2
(45) Date of Patent: Oct. 11, 2016

(54) LEVEL, PLUMB, AND PERPENDICULARITY INDICATOR FOR POWER TOOL

(71) Applicant: Black & Decker Inc., Newark, DE (US)

(72) Inventors: John C. Vanko, Timonium, MD (US); Craig A. Schell, Street, MD (US); Robert S. Gehret, Hampstead, MD (US); Michael K. Forster, White Hall, MD (US); Tal Gottesman, Towson, MD (US); Sankarshan Murthy, Mountain View, CA (US); Daniel Puzio, Baltimore, MD (US); Joerg Zellerhoff, Towson, MD (US); Robert A. Usselman, Forest Hill, MD (US); Scott J. Eshleman, Parkville, MD (US); Joao Norona, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 731 days.

(21) Appl. No.: 13/779,919

(22) Filed: Feb. 28, 2013

(65) Prior Publication Data

US 2014/0000921 A1 Jan. 2, 2014

Related U.S. Application Data

(60) Provisional application No. 61/665,492, filed on Jun. 28, 2012.

(51) Int. Cl.
*G01C 9/00* (2006.01)
*B23Q 17/22* (2006.01)
*B25F 5/02* (2006.01)

(52) U.S. Cl.
CPC ............... *G01C 9/00* (2013.01); *B23Q 17/22* (2013.01); *B25F 5/022* (2013.01)

(58) Field of Classification Search
CPC .... G01C 9/00; B25H 1/0078; B25H 1/0085; B25H 1/0092; B25F 5/022; B25F 5/023; B25F 5/024; Y10T 408/21; B25B 21/00; B23Q 17/22; B23Q 17/2233; B23Q 17/24; B23Q 17/2414
USPC .......... 173/2, 11, 20, 171, 176, 217; 33/365, 33/366.11, 366.14, 303; 408/6–16; 340/686.1–686.2; 700/279
See application file for complete search history.

(56) References Cited

U.S. PATENT DOCUMENTS 3,094,845 A 6/1963 Gali Mallofre
3,871,405 A 3/1975 Schwarz
(Continued)

FOREIGN PATENT DOCUMENTS

DE 3309226 9/1984
DE 3728454 C2 12/1993
(Continued)

*Primary Examiner* — Stephen F Gerrity
*Assistant Examiner* — Joshua Kotis
(74) *Attorney, Agent, or Firm* — Scott B. Markow

(57) ABSTRACT

A power tool includes a housing, an output shaft having a tool axis, and a motion sensor that senses motion of the tool housing. A control circuit receives an input signal from the motion sensor, to make a first determination, based on the input signal, whether the tool is being operated in a horizontal mode or a vertical mode. The control circuit makes a second determination, based on the input signal, whether the tool axis is substantially level when the tool is being operated in the horizontal mode or the tool axis is substantially plumb when the tool is being operated in the vertical mode. An indicator receives an output signal from the control circuit that causes the indicator to indicate whether the tool axis is level when being operated in the horizontal mode or plumb when being operated in the vertical mode.

19 Claims, 40 Drawing Sheets

(56) References Cited

U.S. PATENT DOCUMENTS

| | | | |
|---|---|---|---|
| 4,211,352 A | 7/1980 | Zilk | |
| 4,344,555 A | 8/1982 | Wolfberg | |
| 5,484,026 A * | 1/1996 | Susaki | B25B 21/00 173/11 |
| 5,609,028 A | 3/1997 | Kakuda et al. | |
| 6,220,496 B1 | 4/2001 | Hirai et al. | |
| 6,536,536 B1 * | 3/2003 | Gass | B23B 31/123 173/171 |
| 6,572,000 B2 | 6/2003 | Hirai et al. | |
| 6,796,387 B1 | 9/2004 | Lund et al. | |
| 7,063,247 B1 | 6/2006 | Lund et al. | |
| 7,154,406 B1 * | 12/2006 | Judge | B25F 5/022 200/61.45 R |
| 7,182,148 B1 * | 2/2007 | Szieff | B25B 21/00 173/171 |
| 7,200,516 B1 * | 4/2007 | Cowley | B23B 49/00 356/138 |
| 7,225,959 B2 | 6/2007 | Patton et al. | |
| 7,494,035 B2 | 2/2009 | Weaver et al. | |
| 2005/0251294 A1 * | 11/2005 | Cerwin | B25F 5/022 700/279 |
| 2006/0102365 A1 | 5/2006 | Phillips et al. | |
| 2008/0283569 A1 | 11/2008 | Kral | |
| 2009/0028652 A1 * | 1/2009 | Yamamoto | B23B 49/00 408/6 |
| 2010/0200260 A1 | 8/2010 | Mikami et al. | |
| 2010/0282482 A1 * | 11/2010 | Austin | G05B 19/41805 173/2 |
| 2011/0114345 A1 * | 5/2011 | Schlesak | B23Q 11/0092 173/1 |

FOREIGN PATENT DOCUMENTS

| | | |
|---|---|---|
| DE | 102004050076 A1 | 6/2005 |
| EP | 1853409 B1 | 3/2010 |
| EP | 2338642 A2 | 6/2011 |
| EP | 2388675 A1 | 11/2011 |
| FR | 2651299 A1 | 3/1991 |
| JP | 05261677 | 10/1993 |
| WO | 2004113027 A1 | 12/2004 |
| WO | 2005052440 A1 | 6/2005 |
| WO | 2008061004 A2 | 5/2008 |
| WO | 2008061004 A3 | 5/2008 |

* cited by examiner

LEVEL, PLUMB, AND PERPENDICULARITY INDICATOR FOR POWER TOOL

CROSS REFERENCE TO RELATED APPLICATIONS

This application claims priority, under 35 U.S.C. §119(e) to U.S. Provisional Patent Application No. 61/665,492, filed Jun. 28, 2012, titled "Level, Plumb, and Perpendicularity Indicator for Power Tool," which is incorporated by reference in its entirety.

TECHNICAL FIELD

This application relates to power tools, and more particularly to a system and method for indicating whether a power tool is level, plumb, or perpendicular to a workpiece.

BACKGROUND

In power tools, it is often desirable to ensure that a power tool is operating in a desired orientation relative to a workpiece. For example, when using a drill/driver, it is desirable for the user to know when the tool is level (for a vertical workpiece), plumb (for a horizontal workpiece), or perpendicular (for an angled workpiece). Some power tools have attempted to satisfy this desire may by including a bubble level (a bubble in a liquid filled tube that moves in a direction of gravity) on the tool. Other power tools have attempted to satisfy this desire by including one or more lights that shine, on a workpiece. However, these attempted solutions are inaccurate and cumbersome because they rely on the user's perception, and are difficult to visualize while using a tool. There remains a desire for a more accurate and reliable indicator for indicating when a power tool is in a desired orientation relative to a workpiece.

SUMMARY

In an aspect, a power tool that defines a tool axis. An indicator system is configured to indicate whether the tool axis is level, plumb, or perpendicular to a workpiece. The system includes one or more sensors each configured to sense one or more quantities of motion of the tool housing in at least three directions. The sensors are connected to a circuit configured to process signals from the sensors to determine whether the tool is level, plumb, or perpendicular to the workpiece. An indicator is coupled to the circuit to indicate to the user whether the tool is level, plumb, or perpendicular to the workpiece. Implementations of this aspect may include one or more of the following features.

The tool may include one or more of a housing, a motor contained in the housing, an output shaft extending in a direction of the tool axis, a transmission for transmitting motion of the motor to the tool axis, and a switch for controlling operation of the tool. The tool may constitute one of a drill, a screwdriver, a drill/driver, an impact driver, a saw (e.g., a circular saw or a reciprocating saw), an oscillating tool, or any other type of power tool.

The one or more motion sensors may include one or more accelerometers to sense acceleration of the tool housing. There may be three accelerometers arranged along orthogonal axes. The acceleration due to gravity in each direction may be used to determine whether the tool is level, plumb, or perpendicular. In addition or in the alternative, the one or more motion sensors may additionally include one or more gyroscopic sensors to sense rotational movement of the tool housing. There may be three gyroscopic sensors arranged about three orthogonal axes. The gyroscopic sensors may be used to sense rotational movement of the tool to determine whether the accelerometers have given false readings due to vibration. The accelerometers may comprise one or more MEMS accelerometers. The accelerometers may include one or more thermal accelerometers.

The circuit may comprise analog components. In one possible embodiment, the analog circuit may include a one or more operational amplifiers, hereafter referred to as op amps. For example, if an op amp determines that a signal from a sensor exceeds a reference signal, the op amp may alter the illumination brightness of an indicator light. The circuit may alternatively or additionally comprise digital components. The digital components may include an analog-to-digital converter that converts an analog signal from a sensor to a digital value. The digital components may further include a processor that is programmed to determine whether the tool axis is level, plumb, or perpendicular based upon the digital values from the sensors, and to output a digital signal to control the indicator. The digital components may further include a digital-to-analog converter for converting the digital indicator signal to an analog indicator signal. The circuit may further include an LED driver circuit for controlling illumination of one or more LEDs based on the digital or analog indicator signal.

The power tool may include one or more modes of operation. In a vertical mode of operation, the tool is configured to operate on a horizontal workpiece and to indicate whether the tool axis is plumb to the workpiece. In a horizontal mode of operation, the tool is configured to operate on a vertical workpiece and to indicate whether the tool axis is level relative to the workpiece. In an angled mode of operation the tool is configured to operate on a workpiece that is neither horizontal nor vertical, and to determine whether the tool axis is perpendicular to the workpiece. The tool may include a switch for selecting among the modes of operation, or may include a circuit for determining the mode of operation based on signals from one or more of the sensors. The tool may include a normalization mode to allow the user to set the desired orientation of the tool axis, and then determine whether the tool axis deviates from the desired orientation by more than a predetermined amount. The tool may further include a switch that enables a user to select a sensitivity for the tool axis deviating from the desired orientation.

The indicator may include a single light that changes state to indicate when the tool axis is not level, plumb, or perpendicular to the workpiece. Alternatively, the indicator may include an array of lights. The array may include a left light and a right light to indicate when the tool axis is angled in a left or right direction relative to the workpiece. The array may further include a top light and a bottom light to indicate when the tool axis is angled in a top or bottom direction relative to the workpiece. The lights may indicate alignment by changing state, such as by flashing, by illuminating at different brightness levels, by extinguishing, or by changing colors. A second pair of lights for indicating when drill is canted up or down relative to the drill axis via a change of state of one or both of the lights. Each of the lights may be on an axis perpendicular to the tool axis. The lights may also be used to illuminate the workpiece.

In another aspect, a power tool includes a housing, an output shaft extending from the housing in a direction of a tool axis, and a motion sensor configured to sense motion of the tool housing. A control circuit is configured to receive an input signal from the motion sensor, to make a first determination, based on the input signal, whether the tool is being operated in a horizontal mode or a vertical mode. The control circuit is also configured to make a second determination, based on the input signal, whether the tool axis is substantially level when the tool is being operated in the horizontal mode or the tool axis is substantially plumb when the tool is being operated in the vertical mode. An indicator is coupled to the control circuit and configured to receive an output signal from the control circuit that causes the indicator to indicate whether the tool axis is level when being operated in the horizontal mode or plumb when being operated in the vertical mode.

Implementations of this aspect may include one or more of the following features. The motion sensor may include at least three accelerometers arranged to detect acceleration of the tool housing along at least three different axes. The at least three accelerometers may include an X-accelerometer arranged to detect acceleration along an X-axis that is substantially parallel to the tool axis, a Y-accelerometer arranged to detect acceleration along a Y-axis that is substantially orthogonal to the X-axis, and a Z-accelerometer arranged to detect acceleration along a Z-axis that is substantially orthogonal to the X-axis and the Y-axis. The control circuit may be configured to compare a mathematical combination of a Y value and a Z value that correspond to signals from the Y-accelerometer and the Z-accelerometer, respectively, to a first reference value, to make the first determination whether the tool is being operated in the horizontal mode. When the tool is being operated in the horizontal mode, the control circuit may be configured to compare a X value that is based on a signal from the X-accelerometer to a second reference value to make the second determination whether the tool axis is substantially level. The control circuit is configured to compare a X value that is based on a signal from the X-accelerometer to a third reference value to make the first determination whether the tool is being operated in the vertical mode. When the tool is being operated in the vertical mode, the control circuit may be configured to compare a mathematical combination of the Y value and the Z value to a fourth reference value to make the second determination whether the tool axis is substantially plumb.

The control circuit may be configured to compare a X value that is based on a signal from the X-accelerometer to a first reference value to make the first determination whether the tool is being operated in the horizontal mode, and the second determination whether the tool axis is substantially level. The control circuit may be configured to compare a mathematical combination of a Y value and a Z value that are based on signals from the Y-accelerometer and the Z-accelerometer, respectively, to a second reference value to make the first determination whether the tool is being operated in the vertical mode, and the second determination whether the tool axis is substantially plumb.

The control circuit may include a microprocessor programmed to make the first and second determinations. The control circuit may include at least one operational amplifier coupled the motion sensor, the operational amplifier configured to compare the input signals from the motion sensor to at least one reference signal make the second determination.

The motion sensor may include a rotational motion sensor arranged to detect rotational motion of the tool housing. The control circuit may be configured to determine, based on the detected rotational motion of the tool housing, whether any of the accelerometers have given a false indication that the tool axis is substantially level or substantially plumb.

The power tool may further include a memory unit and a normalization switch that may activate an angled mode of operation. When the normalization switch is actuated, a reference value corresponding to a desired orientation of the tool axis may be stored in the memory unit. The control circuit then may be configured to compare further input signals from the motion sensor to the reference value to determine whether the tool axis is substantially aligned with the desired orientation of the tool axis, and to generate an output signal that corresponds to whether the tool axis is substantially aligned with the desired orientation of the tool axis.

In another aspect, a method is disclosed for indicating when a power tool having a housing and an output shaft extending in a direction of a tool axis is level when being operated in a horizontal mode, or is plumb when being operated in a vertical mode. An input signal is received from a motion sensor that is configured to sense motion of the tool housing. A first determination is made, based on the input signal, whether the tool is being operated in a horizontal mode or a vertical mode. A second determination is made, based on the input signal, whether the tool axis is level when the tool is being operated in the horizontal mode, or whether the tool axis is plumb when the tool is being operated in the vertical mode. An output signal is generated to an indicator to cause the indicator to indicate when the tool axis is substantially level when the tool is being operated in the horizontal mode. or the tool axis is substantially plumb when the tool is being operated in the vertical mode.

Implementations of this aspect may include one or more of the following features. Receiving the input signal may include receiving input signals from an X-accelerometer arranged to detect acceleration along an X-axis that is substantially parallel to the tool axis, a Y-accelerometer arranged to detect acceleration along a Y-axis that is substantially orthogonal to the X-axis, and a Z-accelerometer arranged to detect acceleration along a Z-axis that is substantially orthogonal to the X-axis and the Y-axis. Making the first determination that the tool is being operated in the horizontal mode, and making the second determinations that the tool axis is substantially level each may include comparing a X value based on the input signal from the X-accelerometer to a first reference value. Making the first determination that the tool is being operated in the vertical mode, and the second determination that the tool axis is substantially plumb may include comparing a mathematical combination of a Y value and a Z value that are based on signals from the Y-accelerometer and the Z-accelerometer, respectively, to a second reference value. A rotational motion signal may be received from a rotational motion sensor arranged to detect rotational motion of the tool housing. Based on the rotational motion signal, it may be determined whether any of the accelerometers have given a false indication of the tool axis being substantially level or substantially plumb. A normalization signal may be received for activating an angled mode of operation. When the normalization signal is received, a reference value may be stored that corresponds to a desired orientation of the tool axis. Further input signals from the motion sensor may be compared to the reference value to determine whether the tool axis is substantially aligned with the desired orientation of the tool axis. An output signal may be generated to the indicator that corresponds to the determination of whether the tool axis is substantially aligned with the desired orientation.

In another aspect, a method is disclosed for indicating when a power tool having a housing and an output shaft extending in a direction of a tool axis is substantially aligned with a desired orientation of the tool axis. A first input signal is received that indicates a desired orientation of the tool axis. A second input signal is received from a linear motion sensor arranged in the housing to sense linear motion of the housing. Based on the second input signal, it is determined whether the tool axis is substantially aligned with the desired orientation of the tool axis. A third input signal is received from a rotational motion sensor arranged in the housing to sense rotational motion of the housing. Based on the third input signal, it is determined whether the second input signal has given a false indication of the tool axis being substantially aligned with the desired orientation of the tool axis. If the second input signal has not given a false indication, an output signal is generated to an indicator to cause the indicator to indicate whether the tool axis is substantially aligned with the desired orientation of the tool axis.

In another aspect, a method for indicating when an output tool axis of a power tool is level, plumb, or perpendicular to a workpiece comprises the following steps. The power tool senses motion or acceleration of the tool in at least one direction. Based on the sensed motion or acceleration, the power tool determines whether the tool axis is level, plumb, or perpendicular to a workpiece. The power tool changes the state of an indicator to indicate to a user whether the tool axis is level, plumb, or perpendicular to the workpiece. Implementations of this aspect may include one or more of the following features.

The sensing step may include sensing signals from one or more accelerometers. There may be three accelerometers arranged along orthogonal axes. The power tool may sense acceleration due to gravity in each of the directions. In addition or in the alternative, the power tool may sense rotational movement from one or more gyroscopic sensors. There may be three gyroscopic sensors arranged about three orthogonal axes. The power tool may sense rotational movement of the tool to determine whether the accelerometers have rotated, and based on this determine whether the accelerometers have given false readings of level, plumb, and/or perpendicularity due to vibration.

The power tool may determine whether the tool is in a horizontal mode of operation, a vertical mode of operation, and an angled mode of operation by comparing values of one or more of the sensors to one or more limit values. If in the horizontal mode of operation, the power tool may determine whether the tool is level by comparing the values of one or more of the sensors to one or more limit values. If in the vertical mode of operation, the power tool may compare the values of one or more of the other sensors to one or more limit values. If in the angled mode of operation, the power tool may determine whether the tool is perpendicular by comparing one or more of the sensor signals to one or more limit values. The power tool may perform the determinations of level, plumb, or perpendicularity using an analog signal processing circuit and/or a digital signal processor or any combination thereof. The power tool may receive a user input of the desired mode of operation. The power tool may receive a user input of a normalization of a desired orientation of operation. The tool may further receive a user input of a desired sensitivity for the orientation of the tool axis.

The power tool may change the state of an indicator by altering the state of one or more lights (e.g., by altering the illumination, brightness, or color of the lights or by flashing the lights). In one implementation, the power tool may alter the state of one or more lights in an array of lights. The power tool may alter the state of a left light and a right light to indicate when the tool axis is angled in a left or right direction relative to the workpiece. The power tool may alter a state of a top light and a bottom light to indicate when the tool axis is angled in a top or bottom direction relative to the workpiece.

Advantages may include one or more of the following. The level, plumb, and perpendicularity system and method provides an automated electronic way of enabling a user to easily determine when a power tool is being operated in a desired orientation. The system may further include improvements to reduce or eliminate the effects of tool vibration on the sensor system. A further advantage may include drilling vertical holes into surfaces that are not horizontal or level, and drilling level holes into surfaces at oblique angles such that the surface is not perpendicular to the drill hole. These and other advantages and features will be apparent from the description, the drawings, and the claims.

DETAILED DESCRIPTION

Figure 1:
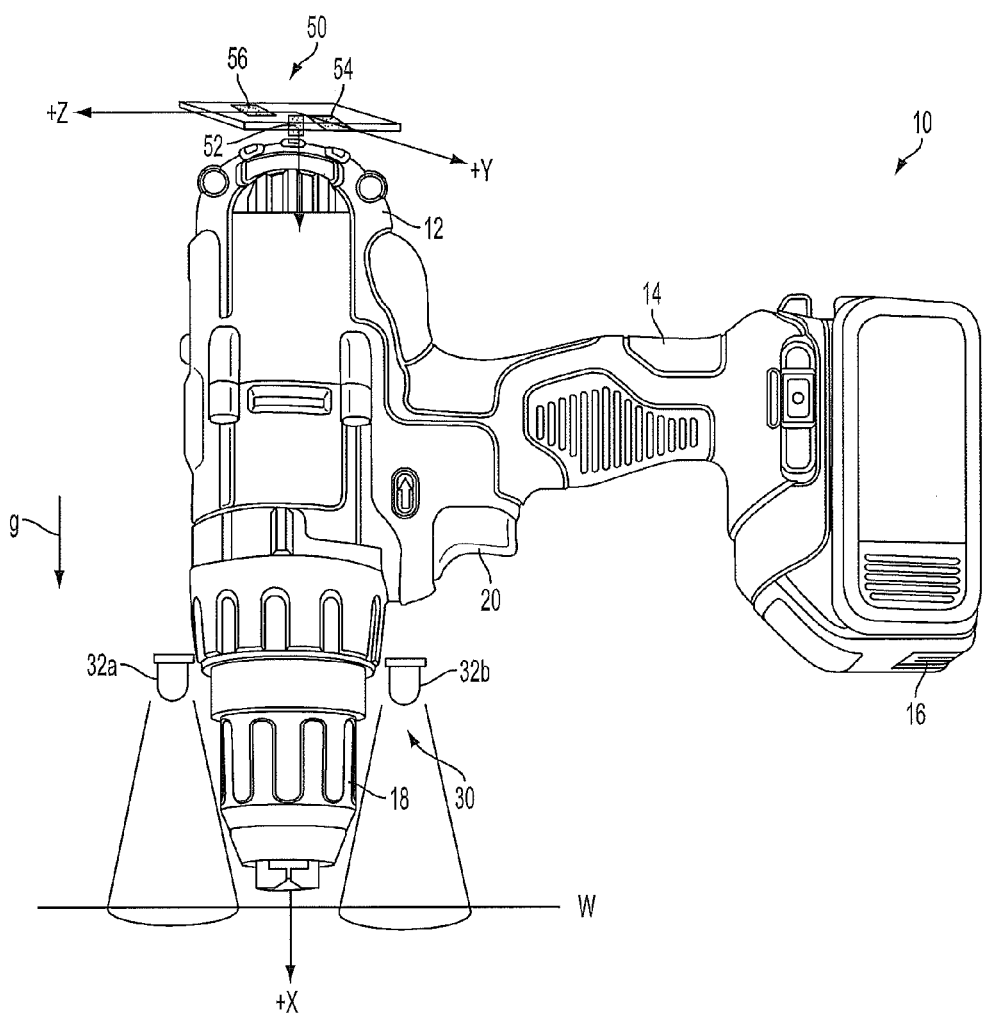
FIGS. 1 and 4A-4B are side views of a first embodiment of a power tool in a vertical mode of operation and plumb to a workpiece.
Figure 2:
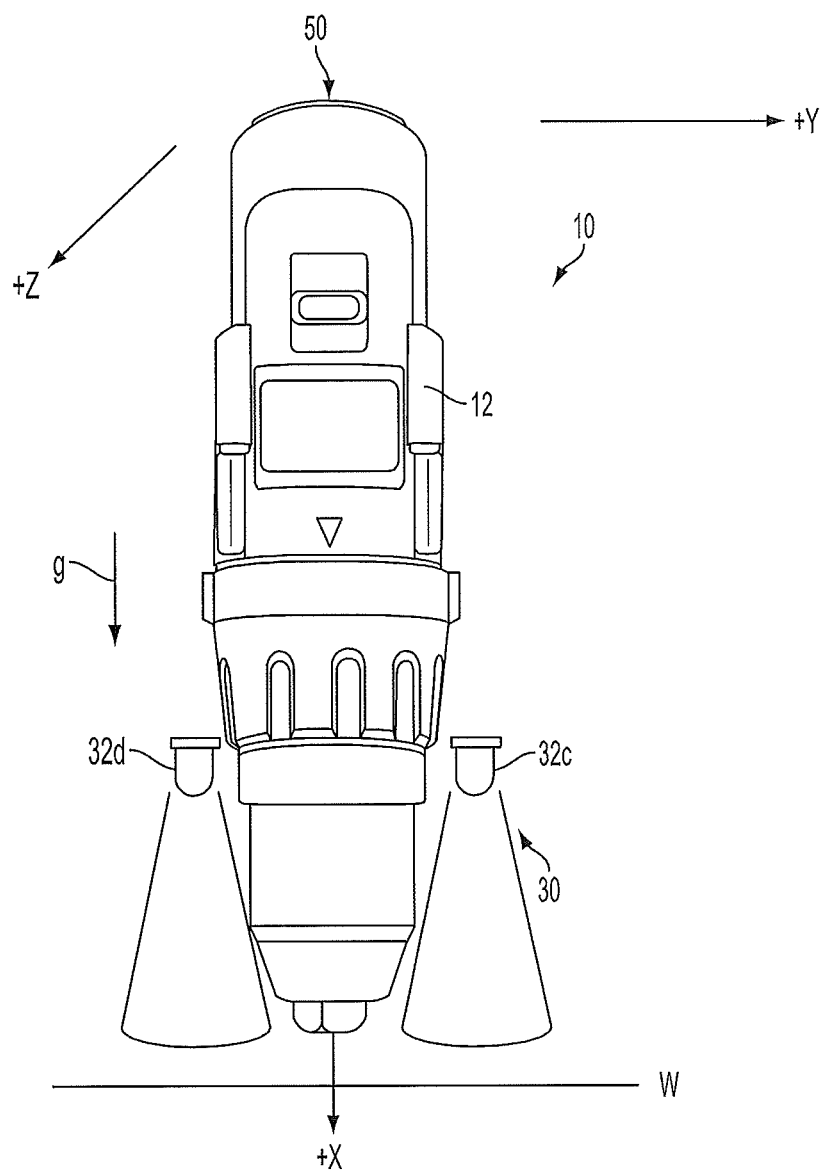
FIGS. 2 and 5A-5B are top views of the power tool of FIG. 1 in a vertical mode of operation and plumb to a workpiece.
Figure 3A:
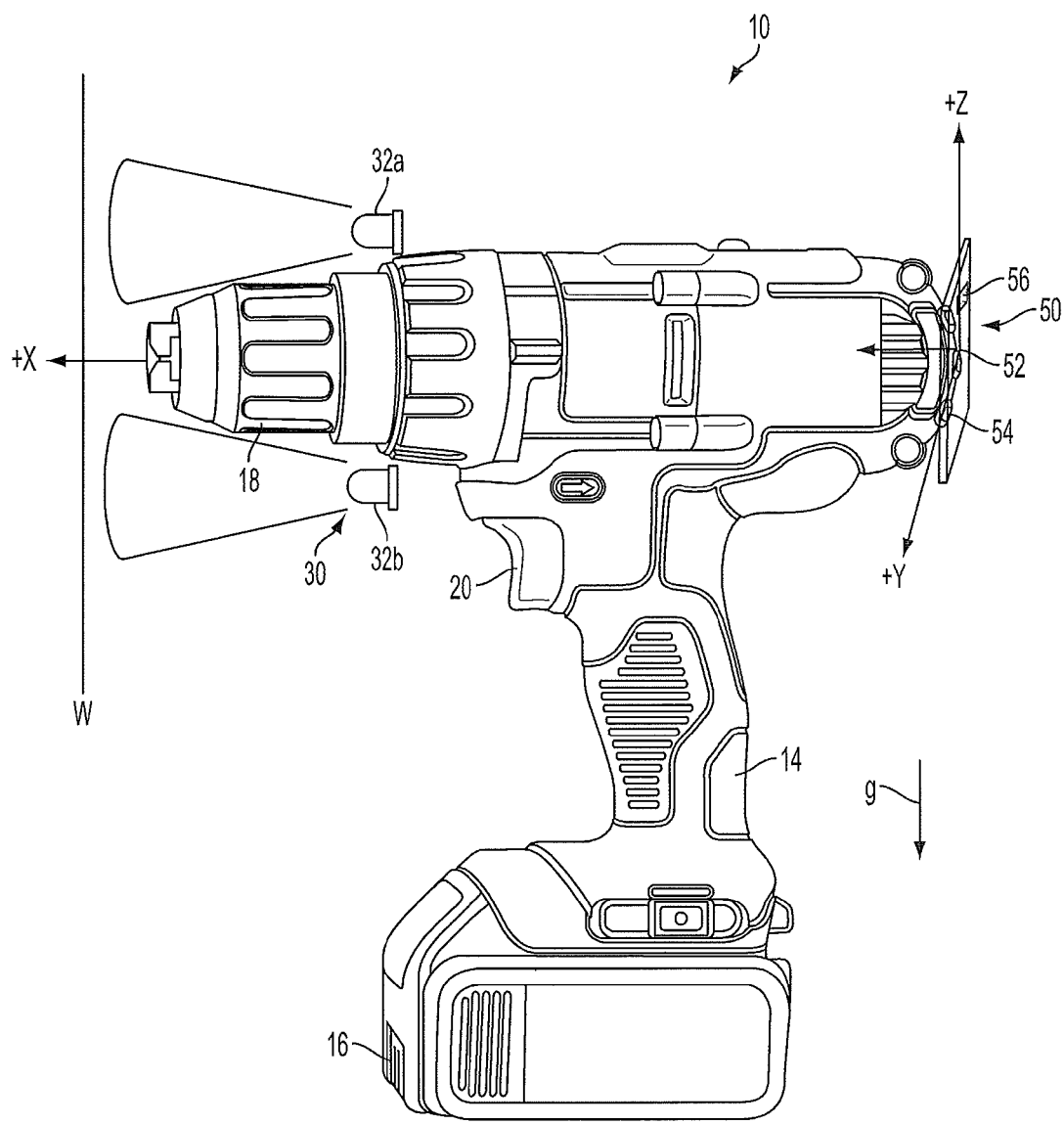
FIGS. 3A-3C is a side view of the power tool of FIG. 1 in a horizontal mode of operation and level with a workpiece.

Referring to FIGS. 1-3, in one embodiment, a power tool 10, such as a drill, includes a tool housing 12, a handle 14 extending from the tool housing, and a power source 16 (e.g., a battery) coupled to a base of the handle 14. Coupled to the tool housing for rotation is a tool bit holder 18 (e.g., a chuck) configured to hold and drive a tool bit (e.g., a drill bit or a screwdriver bit) about an axis X, for application to a workpiece W. Inside the tool housing 12 is a motor and transmission for rotatably driving the tool bit holder 18. Coupled to the handle is a switch 20 (e.g., a variable speed trigger) that controls power delivery from the power source 16 to the motor. Optionally, the power tool 10 also includes a light unit 30 configured to illuminate the workpiece and/or provide information regarding operation of the power tool 10 to the user.

The power tool 10 also includes a sensor system 50 having three modes of operation for indicating when the power tool 10 is operating such that the tool bit axis X is generally level, plumb, and perpendicular to the workpiece W. In the first mode of operation, called vertical operation, the workpiece W is parallel to the ground (as shown in FIGS. 1 and 2), and the tool 10 is said to be "plumb" when the tool bit axis X is generally perpendicular to the workpiece W. In the second mode of operation, called horizontal operation, the workpiece W is perpendicular to the ground (as shown in FIG. 3), and the tool is said to be "level" when the tool bit axis X is generally perpendicular to the workpiece W. In the third mode of operation, called angled drilling, the workpiece is at any arbitrary angle to the ground, and the tool is said to be "perpendicular" when the tool bit axis X is generally perpendicular to the workpiece W (as shown in FIG. 17A).

The sensor system 50 includes three orthogonal acceleration sensors each arranged along an axis of a three-axis orthogonal coordinate system, which may or may not coincide with axes defined by the tool housing. In the example illustrated in FIGS. 1 and 2, an X-axis accelerometer 52 is arranged to sense acceleration along a positive X-axis that is coincident with the tool bit axis X, as shown in FIGS. 1 and 2. A Y-axis accelerometer 54 is arranged to sense acceleration along a positive Y-axis that is orthogonal to the X-axis, and that extends from the tool housing 12 to the left side of the tool as shown in FIG. 2. A Z-axis accelerometer 56 is arranged to sense acceleration along a positive Z-axis that is orthogonal to the X-axis and to the Y-axis, and that extends from the tool housing 12 toward the top of the tool, as shown in FIG. 1. It should be understood that the accelerometers could be arranged according to any three orthogonal axes. It should also be understood that deviations from orthogonal can be accommodated, by methods well-known to those skilled in the art, but for purposes of clarity this application will assume orthogonal whenever there is a plurality of sensors.

The accelerometers 52, 54, 56 each output a signal or voltage that corresponds to the magnitude of acceleration of the tool in the positive direction of that accelerometer. Since gravity has a known direction and acceleration ($g=9.8$ m/s$^2$), the signal or voltage output from each accelerometer is a function of the gravity based acceleration vector acting in the direction of that sensor when the tool is still and not otherwise accelerating. For example, when the tool is the vertical mode (as shown in FIG. 1), the absolute value of the X-accelerometer will be approximately equal to 1 g, and the absolute values of the Y- and Z-accelerometers will be approximately equal to 0 g when the tool is plumb. When the tool is operating in the horizontal mode (as shown in FIG. 3), the absolute value of the X-accelerometer will be approximately equal to 0 g, and the absolute values of the Y-accelerometer and the Z-accelerometer will vary depending upon how the handle of the tool is rotated about the tool axis X, while the tool axis X remains level. When the tool is in the angled drilling mode of operation (as shown in FIG. 17A), the values of the X-, Y-, and Z-accelerometers are given by the respective direction cosines of the gravity vector in the orthogonal system defined by the accelerometers, where the magnitude of the gravity vector is one. Other systems have been devised and these give trigonometric functions based upon the Euler angles, for instance, that define the orientation of the workpiece (see Weisstein, Eric W. "Euler Angles." From *MathWorld*—A Wolfram Web Resource, http://mathworld.wolfram.com/EulerAngles.html, which is incorporated by reference). By determining whether and how much the values for the X-, Y-, and Z-accelerometers differ from their values when the tool is level, plumb or perpendicular to the workpiece, it can be determined whether the tool is level, plumb, and/or perpendicular to the workpiece W, and provide an indication to the user when the tool is not level, plumb, and/or perpendicular.

Figure 4A:
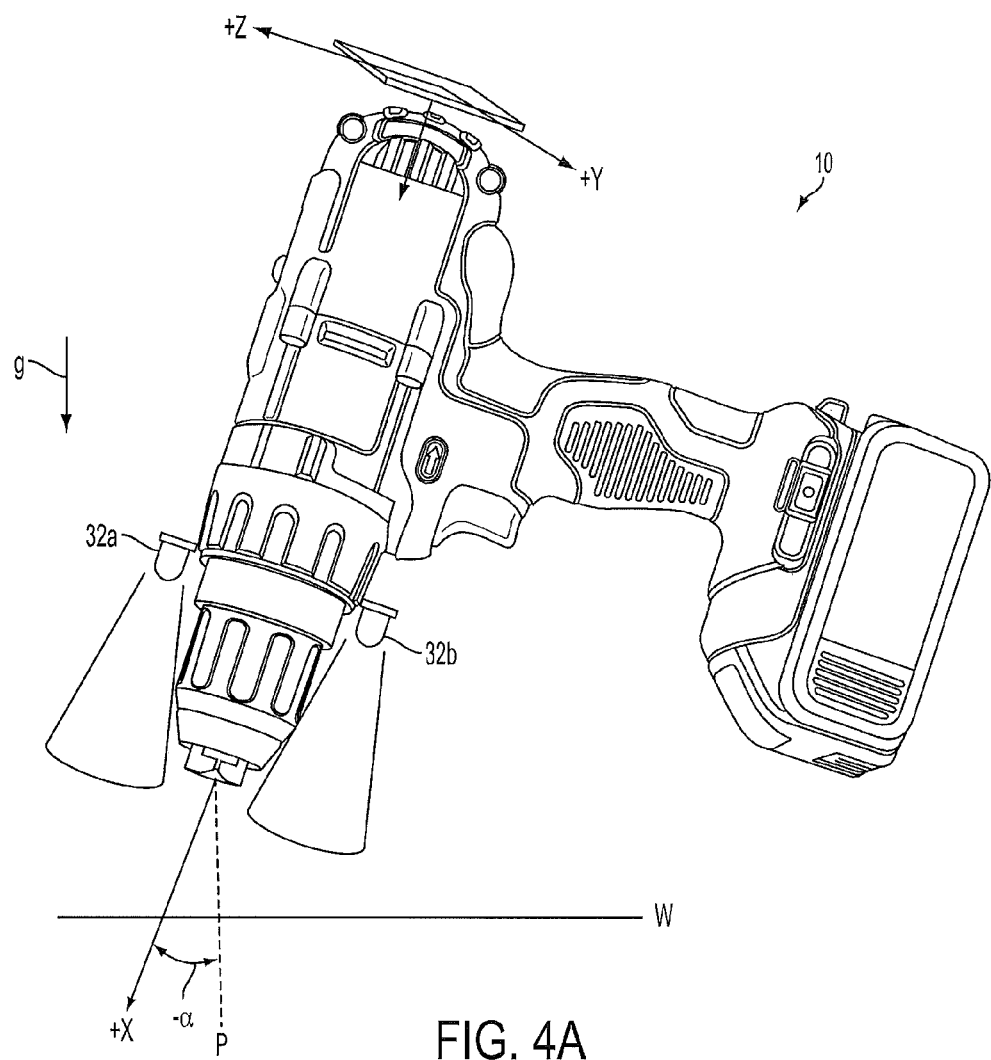
Figure 4B:
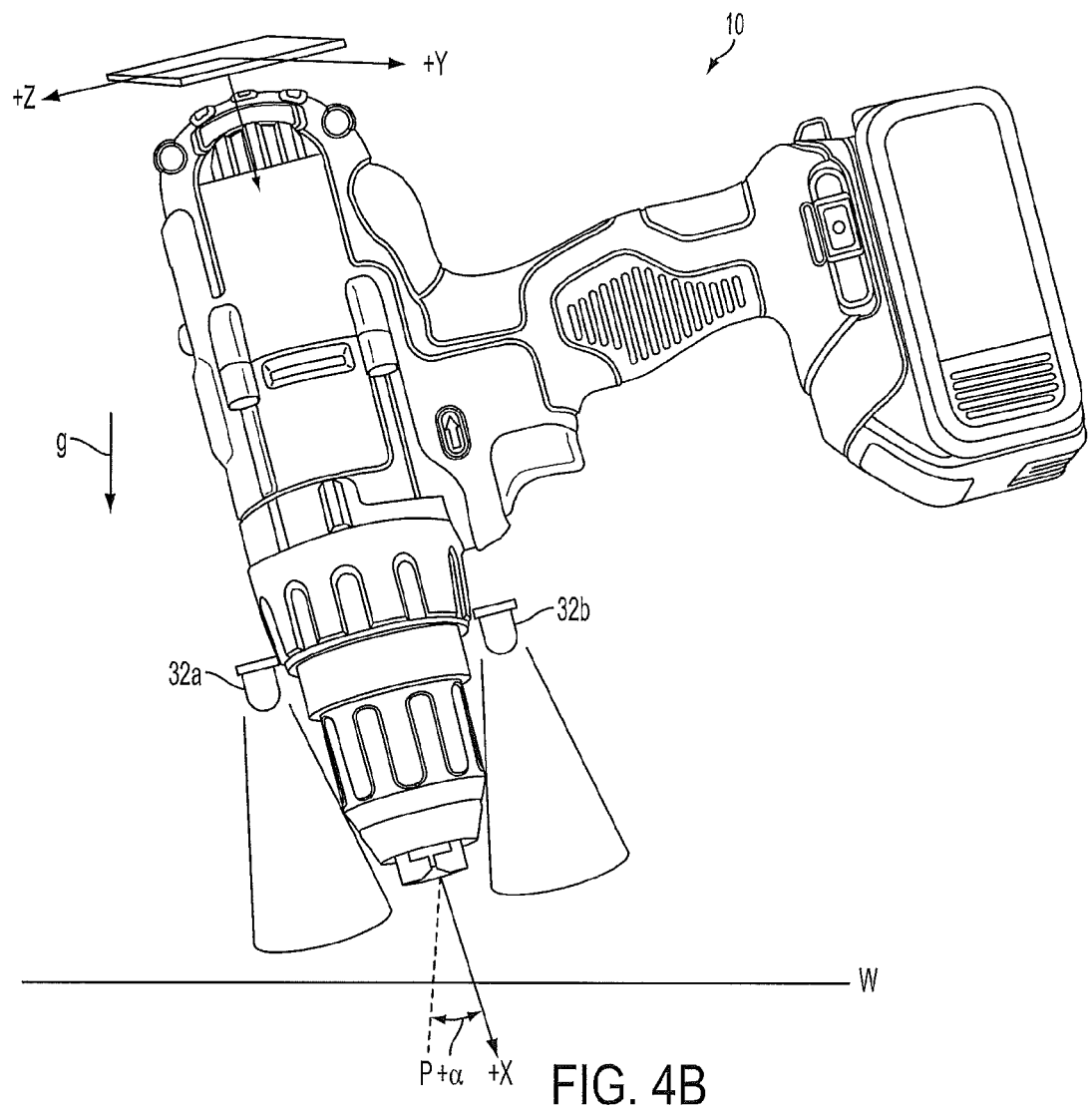
Figure 5A:
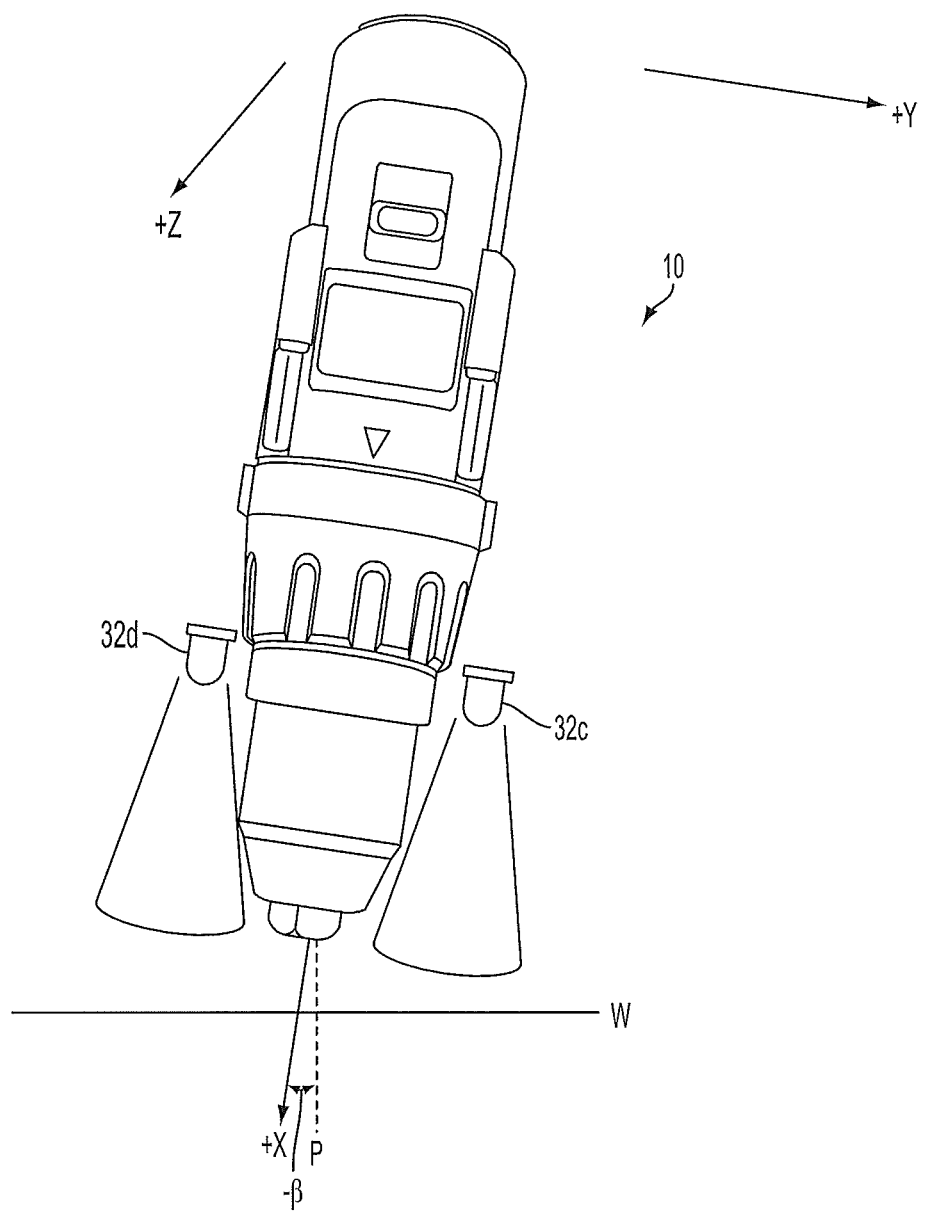
Figure 5B:
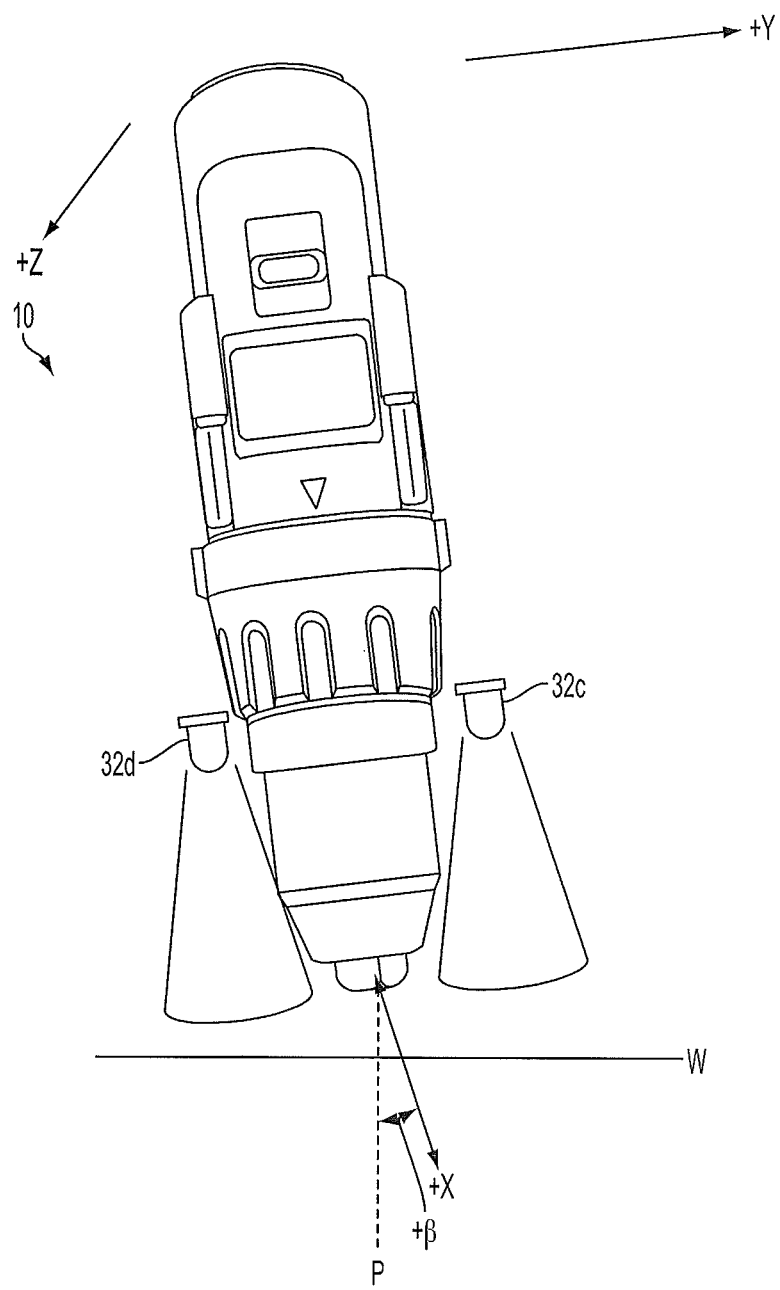

In one embodiment, the light unit 30 includes an upper LED 32a, a lower LED 32b, a left LED 32c, and a right LED 32b that together indicate whether the tool holder axis X is inclined from level, plumb, or perpendicular to the workpiece. When the tool axis X coincides with a line P that is level, plumb, or perpendicular to the workpiece W, all four of the LEDs 32a-32d are illuminated at the same brightness. When the tool axis X is angled relative to the line P, the LED(s) closer to the workpiece are illuminated more brightly, and the LED(s) that are farther from the workpiece are illuminated less brightly. For example, in FIG. 4A, the tool axis X is at an angle $-\alpha$ from perpendicular P, and the lower LED 32b is closer to the workpiece and illuminated more brightly than the upper LED 32a. In FIG. 4B, the tool axis is at an angle $+\alpha$ from perpendicular, and the upper LED 32a is closer to the workpiece and illuminated more brightly than the lower LED 32b. In FIG. 5A, the tool axis X is angled at an angle $-\beta$ to perpendicular P, and the left LED 32c is closer to the workpiece and illuminated more brightly than the right LED 32d. In FIG. 5B, the tool axis X is at an angle +β to perpendicular P, and the right LED 32d is closer to the workpiece and illuminated more brightly than the left LED 32c.

Figure 6A:
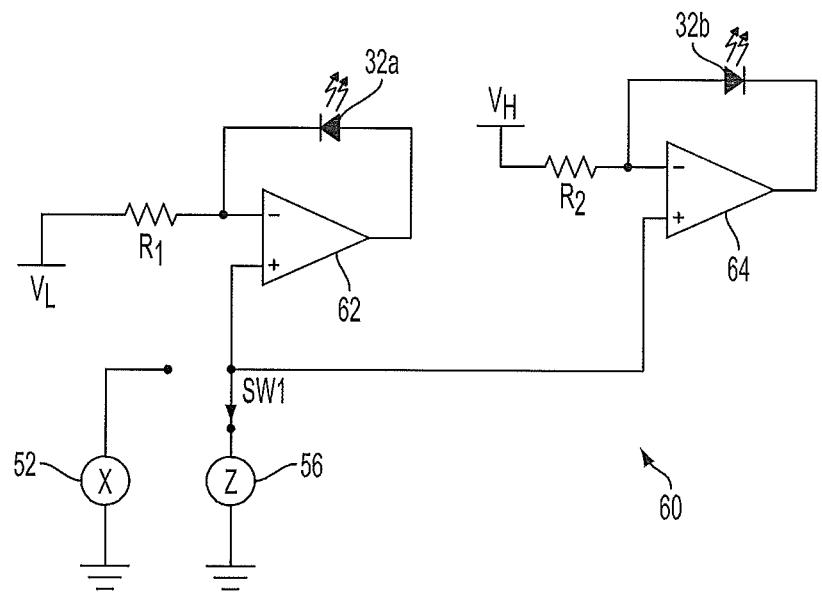
FIGS. 6A-6E are schematic diagrams of embodiments of analog circuits that control illumination of the LEDs of the power tool of FIG. 1.

Referring 6A-6D, illumination of the LEDs 32a-32d can be controlled by analog circuits 60 and 70, which are selectively connected to the outputs of the X-, Y-, and Z-accelerometers via switches SW1, SW2, and SW3 to enable switching between the vertical mode and the horizontal mode of operation, as described further below. Referring to FIG. 6A, in the vertical mode, illumination of the top and bottom LEDs 32a, 32b is controlled by the output from the Z-accelerometer, such that the upper LED 32a is brighter when the tool axis X is at an angle +α to the plumb line P, and lower LED 32b is brighter when the tool axis X is at an angle −α to the plumb line P. The signal from the Z-accelerometer 56 is output to the positive input of a first op amp 62 via the switch SW1. The negative input of the first op amp 62 is connected to a low reference voltage $V_L$ via a resistor R1. The output of the first op amp 62 is connected to the top LED 32a. The low reference voltage $V_L$ is equal to a threshold voltage that is less than the voltage output from the Z-accelerometer at 0 g. Thus, if the tool axis X is inclined by the angle +α, then the voltage output from the Z-accelerometer will be greater than its 0 g value, and the op amp 62 will cause more current to flow through the top LED 32a than would flow if the Z-accelerometer were at its 0 g position when α=0, causing it to illuminate more brightly than if the Z-accelerometer were at its 0 g position when α=0. Conversely, if the tool axis X is inclined by the angle −α, then the voltage output of the Z-accelerometer will be less than its 0 g value, and the first op amp 62 will cause less current to flow through the LED 32a, causing it to illuminate less brightly. The magnitude of the current through the LED 32a will be the difference of the voltage Z and voltage $V_L$ divided by the resistance of $R_1$ (i.e., $I_{LED32a}=(Z-V_L)/R_1$).

The signal from the Z-accelerometer is also output to the positive input of a second op amp 64 via the switch SW1. The negative input of the second op amp 64 is connected to a high reference voltage $V_H$ via a resistor R2. The output of the second op amp 64 is connected to the bottom LED 32b. The high reference voltage $V_H$ is equal to a threshold voltage that is less than the voltage output from the Z-accelerometer at 0 g. Thus, if the tool axis X is inclined at the angle +α, then the voltage output from the Z-accelerometer will be greater than its 0 g value, and the op amp 62 will cause less current to flow through the bottom LED 32b, causing it to illuminate less brightly. Conversely, if the tool axis X is inclined by the angle −α, then the voltage output of the Z-accelerometer will be less than its 0 g value, and the comparator will cause more current to flow through the bottom LED 32b, causing it to illuminate more brightly. The magnitude of the current through the LED 32b will be the difference of the voltage $V_H$ and voltage Z divided by the resistance of $R_2$ (i.e., $I_{LED32b}=(V_H-Z)/R_2$).

Figure 6B:
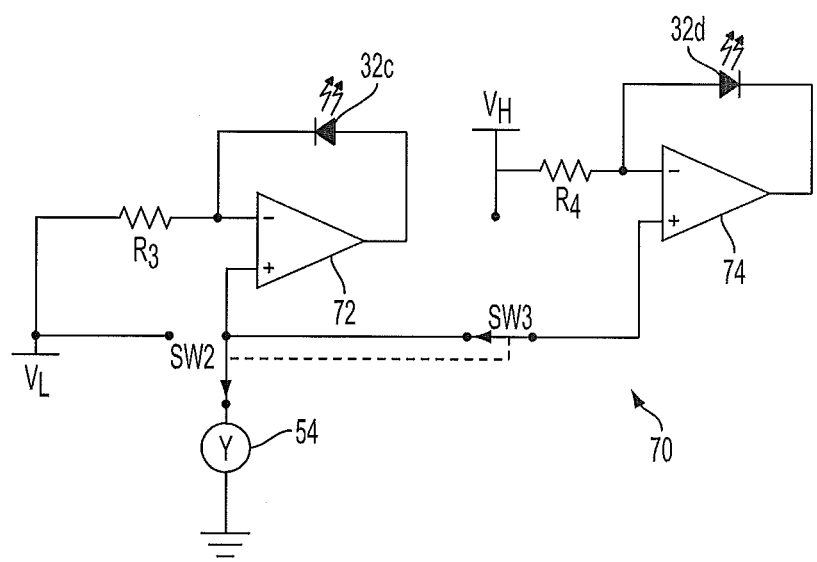

Referring to FIG. 6B, in the vertical mode, illumination of the left and right LEDs 32c, 32d is similarly controlled by output from the Y-accelerometer, such that the left LED 32c is brighter when the tool axis X is at an angle −β to the plumb line P, and the right LED 32d is brighter when the tool axis X is at an angle +β to the plumb line P. The signal from the Y-accelerometer 54 is output to the positive input of a third op amp 72 via the switch SW2. The negative input of the third op amp 72 is connected to the low reference voltage $V_L$ via a resistor R3. The output of the op amp 72 is connected to the left LED 32c. The low reference voltage $V_L$ is equal to a threshold voltage that is less than the voltage output from the Y-accelerometer at 0 g. Thus, if the tool axis X is inclined by the angle +β, then the voltage output from the Y-accelerometer will be greater than its 0 g value, and the op amp 72 will cause more current to flow through the LED 32c, causing it to illuminate more brightly. Conversely, if the tool axis X is inclined by an angle −β, then the voltage output of the Y-accelerometer will be less than its 0 g value, and the op amp 72 will cause less current to flow through the LED 32c, causing it to illuminate less brightly. The magnitude of the current through the LED 32c will be the difference of the voltage Y and voltage $V_L$ divided by the resistance of $R_3$ (i.e., $I_{LED32c}=(Y-V_L)/R_3$).

The signal from the Y-accelerometer is also output to the positive input of a fourth op amp 74 via the switch SW3. The negative input of the op amp 74 is connected to a high reference voltage $V_H$ via a resistor R4. The output of the op amp 74 is connected to the right LED 32c. The high reference voltage $V_H$ is equal to a threshold voltage that is less than the voltage output from the Y-accelerometer at 0 g. Thus, if the tool axis X is inclined by an angle −β, then the voltage output from the Y-accelerometer will be greater than its 0 g value, and the op amp 74 will cause less current to flow through the right LED 32d, causing it to illuminate less brightly. Conversely, if the tool axis X is inclined by an angle +β, then the voltage output of the Y-accelerometer will be less than its 0 g value, and the op amp 74 will cause more current to flow through the right LED 32d, causing it to illuminate more brightly. The magnitude of the current through the LED 32d will be the difference of the voltage $V_H$ and voltage Y divided by the resistance of $R_4$ (i.e., $I_{LED32d}=(V_H-Y)/R_4$).

For example, if the resistors R1-R4 each have a resistance of 10 ohms, $V_L$=1.55V and $V_H$=1.75V, and an angular deviation of 5° from vertical results in 0.1V difference in the output of an accelerometer, then representative values for the accelerometer outputs and amount of current flowing through the top, bottom, left, and right LEDs 32a-32d at various inclination angles (degrees) are shown in the below Table 1:

TABLE 1

Illumination of LEDs for Vertical (Downward) Operation

| α | β | Z out | Y out | Top LED 32a | Bottom LED 32b | Left LED 32c | Right LED 32d |
|---|---|---|---|---|---|---|---|
| 0 | 0 | 1.65 V | 1.65 V | 10 mA | 10 mA | 10 mA | 10 mA |
| +5 | 0 | 1.75 V | 1.65 V | 20 mA | 0 mA | 10 mA | 10 mA |
| −5 | 0 | 1.55 V | 1.65 V | 0 mA | 20 mA | 10 mA | 10 mA |
| 0 | +5 | 1.65 V | 1.75 V | 10 mA | 10 mA | 0 mA | 20 mA |
| 0 | −5 | 1.65 V | 1.55 V | 10 mA | 10 mA | 20 mA | 0 mA |
| +5 | −5 | 1.75 V | 1.55 V | 20 mA | 0 mA | 20 mA | 0 mA |

Figure 6C:
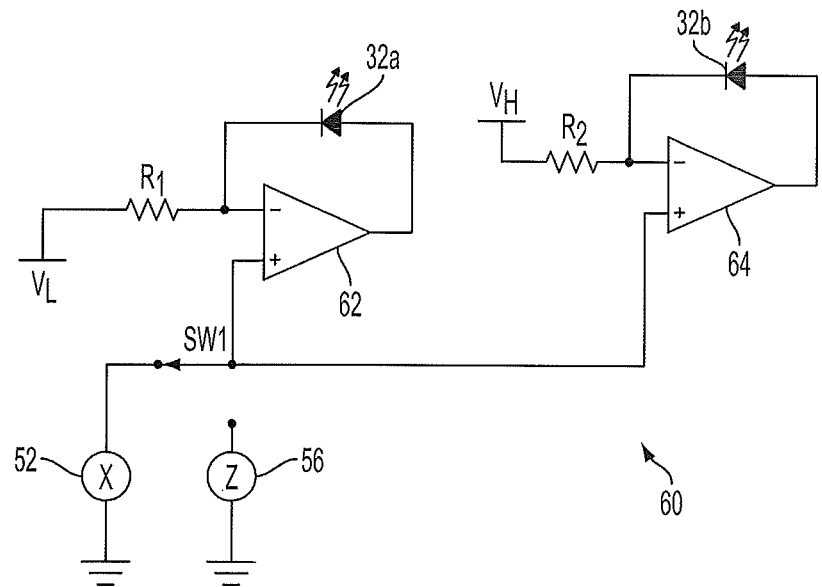
Figure 6D:
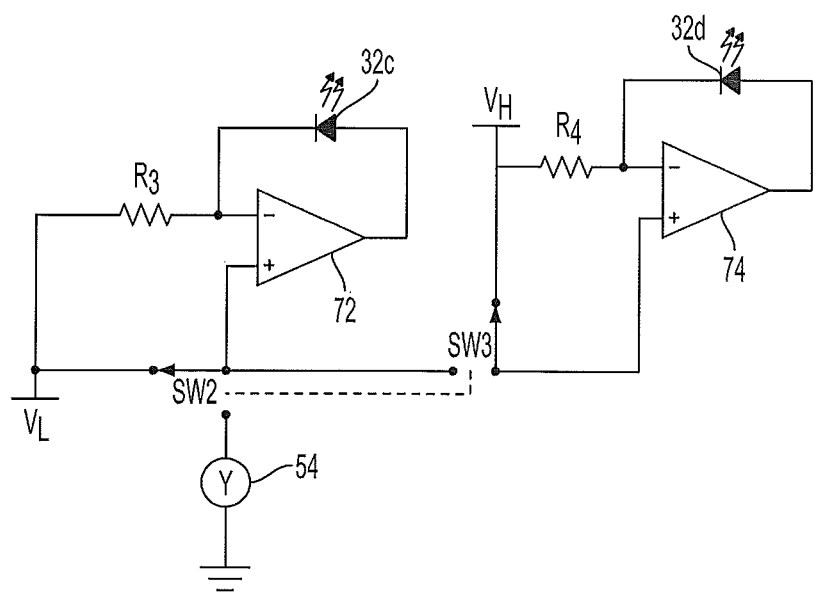

Referring to FIGS. 6C and 6D, in the horizontal mode, the switch SW1, SW2, and SW3 are switched so that only the X-accelerometer 52 and the top and bottom LEDs 32a, 32b are used to indicate whether the tool is level, while the left and right LEDs 32c, 32d are not illuminated at all. The top LED 32a is brighter when the tool axis X is at an angle −γ to the level line P (see FIG. 3B), and the bottom LED 32b is brighter when the tool axis X is at an angle +γ to the level line P (see FIG. 3C). Referring to FIG. 6C, the signal from the X-accelerometer 52 is output to the positive input of the first op amp 62 via the switch SW1. The negative input of the first op amp 62 is still connected to the low reference voltage $V_L$ via the resistor R1. The output of the first op amp 62 is also still connected to the top LED 32a. The low reference voltage $V_L$ is equal to a threshold voltage that is less than the voltage output from the X-accelerometer at 0 g. Thus, if the tool axis X is inclined by angle $-\gamma$, then the voltage output from the X-accelerometer 52 will be greater than its 0 g value, and the first op amp 62 will cause more current to flow through the top LED 32a, causing it to illuminate more brightly. Conversely, if the tool axis X is inclined by angle $+\gamma$, then the voltage output of the X-accelerometer 52 will be less than its 0 g value, and the first op amp 62 will cause less current to flow through the top LED 32a, causing it to illuminate less brightly. The magnitude of the current through the LED 32a will be the difference of the voltage X and voltage $V_L$ divided by the resistance of $R_1$ (i.e., $I_{LED32a}=(X-V_L)/R_1$).

The signal from the X-accelerometer 52 is also output to the positive input of a second op amp 64. The negative input of the second op amp 64 is still connected to the high reference voltage $V_H$ via the resistor R2. The output of the second op amp 64 is connected to the bottom LED 32b. The high reference voltage $V_H$ is equal to a threshold voltage that is greater than the voltage output from the X-accelerometer at 0 g. Thus, if the tool axis X is inclined at an angle $+\gamma$, then the voltage output from the X-accelerometer will be less than its 0 g value, and the second op amp 64 will cause more current to flow through the bottom LED 32b, causing it to illuminate more brightly. Conversely, if the tool axis X is inclined by angle $-\gamma$, then the voltage output of the X-accelerometer will be greater than its 0 g value, and the second op amp 64 will cause less current to flow through the bottom LED 32b, causing it to illuminate less brightly. The magnitude of the current through the LED 32b will be the difference of the voltage $V_H$ and voltage X divided by the resistance of $R_2$ (i.e., $I_{LED32b}=(V_H-X)/R_2$).

Referring to FIG. 6D, in the horizontal mode, the switch SW2 now connects the positive input of the third op amp 72 to the low reference voltage $V_L$, and the switch SW3 now connects the fourth op mp 74 to the high reference voltage $V_H$. Because the potentials on the positive and negative inputs for each of the third and fourth op amps 72, 74 are the same, neither op amp 72, 74 will cause current to flow through the left and right LEDs 32c, 32d. Thus, when operating in the horizontal mode, the left and right LEDs 32c, 32d are not illuminated.

For example, if the resistors R1, R2 each have a resistance of 10 ohms, $V_L=1.55V$ and $V_H=1.75V$, and an angular deviation of 5° from horizontal results in 0.1V difference in the output of the X-accelerometer, then representative values for the X-accelerometer output and amount of current flowing through the LEDs 32a-32d at various inclination angles (degrees) are shown in the below Table 1:

TABLE 1

| Illumination of LEDs for Horizontal operation | | | | | |
|---|---|---|---|---|---|
| $\gamma$ | X out | Top LED 32a | Bottom LED 32b | Left LED 32c | Right LED 32d |
| 0 | 1.65 V | 10 mA | 10 mA | 0 mA | 0 mA |
| +5 | 1.55 V | 0 mA | 20 mA | 0 mA | 0 mA |
| −5 | 1.75 V | 20 mA | 0 mA | 0 mA | 0 mA |

Figure 6E:
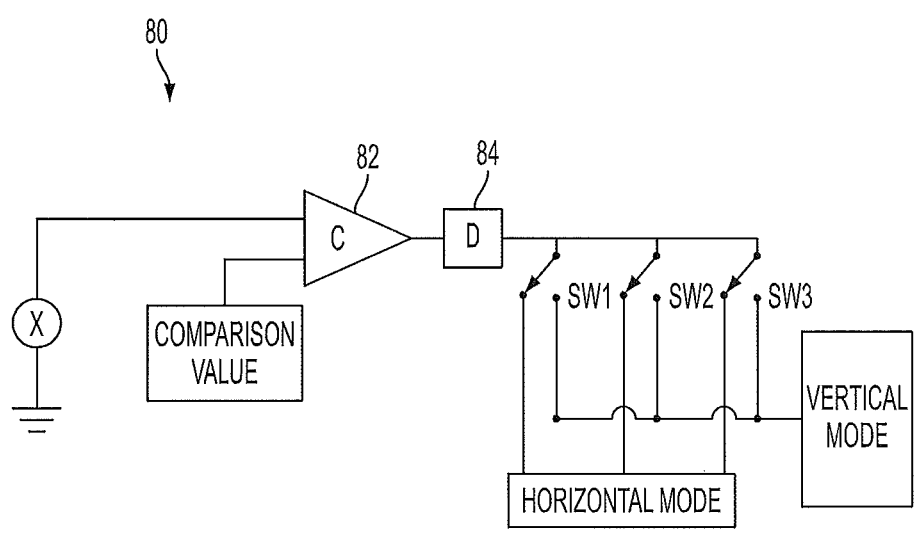

The switches SW1, SW2, SW3 may be connected to one or more manual toggle switches actuatable by the user to toggle between the horizontal and vertical modes of operation. For example, switches SW1, SW2, SW3 may be relay switches or transistor switches connected to a single manual toggle switch on the tool housing. Referring to FIG. 6E, in another embodiment, the tool may include a horizontal/vertical determining circuit 80 that determines whether the tool is in the horizontal or vertical mode and actuates switches SW1, SW2, and SW3 appropriately For example, circuit 80 includes a comparator 82 having inputs connected to the X-accelerometer and a comparison value, and an output connected to a driver circuit D for driving the switches SW1, SW2, SW3. The comparison value is set to be approximately the ½ g value for the X-accelerometer. If the voltage signal from the X-accelerometer is less than its ½ g value, this indicates that the tool is in the horizontal mode, and the driver causes the switches SW1, SW2, SW3 to be in the positions as shown in FIGS. 6A and 6D. If the voltage signal from the X-accelerometer is greater than its ½ g value, this indicates that the tool is in the vertical mode, and the driver circuit causes the switches SW1, SW2, and SW3 to be in the positions shown in FIGS. 6C and 6D.

Figure 7:
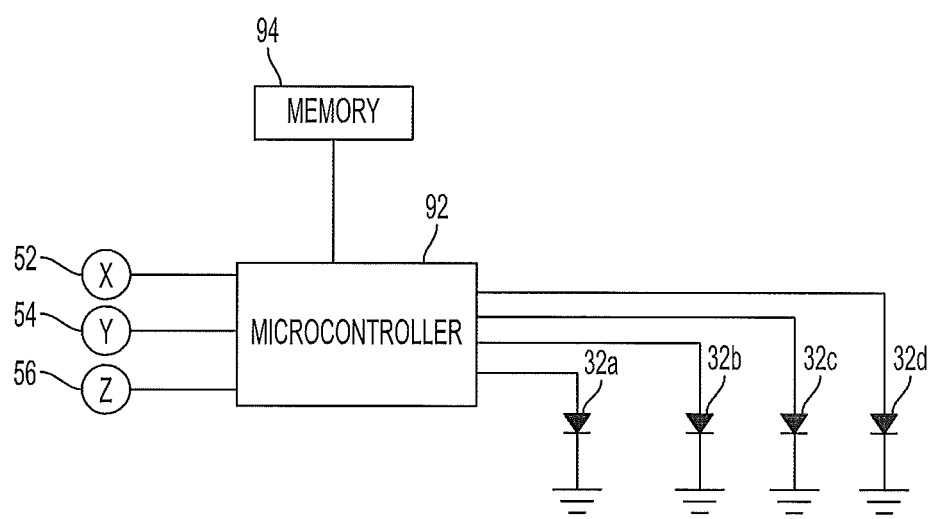
FIG. 7 is a schematic diagram of a digital circuit that controls illumination of the LEDs of the power tool of FIG. 1.

Referring to FIG. 7, in another embodiment, illumination of the LEDs 32a-32d is controlled using a digital circuit 90. The X-, Y-, and Z-accelerometers 52, 54, 56 may have digital outputs that are connected to three inputs of a microcontroller 92. Alternatively, the X-, Y-, Z-accelerometers may have analog outputs that are connected to the microcontroller 92 via one or more analog-to-digital converters (not shown), or the microcontroller 92 may include analog-to-digital conversion and accept the analog accelerometer signals directly. In yet another embodiment, the X-, Y-, and Z-accelerometers may be embodied in a package that has a single digital communications channel that communicates digital values that corresponds to the values of acceleration along the three orthogonal axes. In yet another embodiment, the X-, Y-, and Z-accelerometers may be embodied in a package that provides three Pulse Width Modulated (PWM) outputs indicative of the acceleration of each respective axis, which are then connected to microcontroller which interprets the PWM signals into digital values. One or more outputs of the microcontroller 92 are connected to the LEDs 32a-32d, either directly or by means of one or more digital-to-analog converters and/or LED driver circuits in a manner that will be apparent to one of ordinary skill in the art. The microcontroller 92 may also include or be coupled to a memory module (e.g., a ROM chip) 94 that stores threshold values needed to evaluate the signals from the accelerometers, e.g., in a look-up table. The microcontroller 92 may be programmed, with the use of hardware circuits and by the use of software algorithms, to control illumination of the LEDs.

Figure 3B:
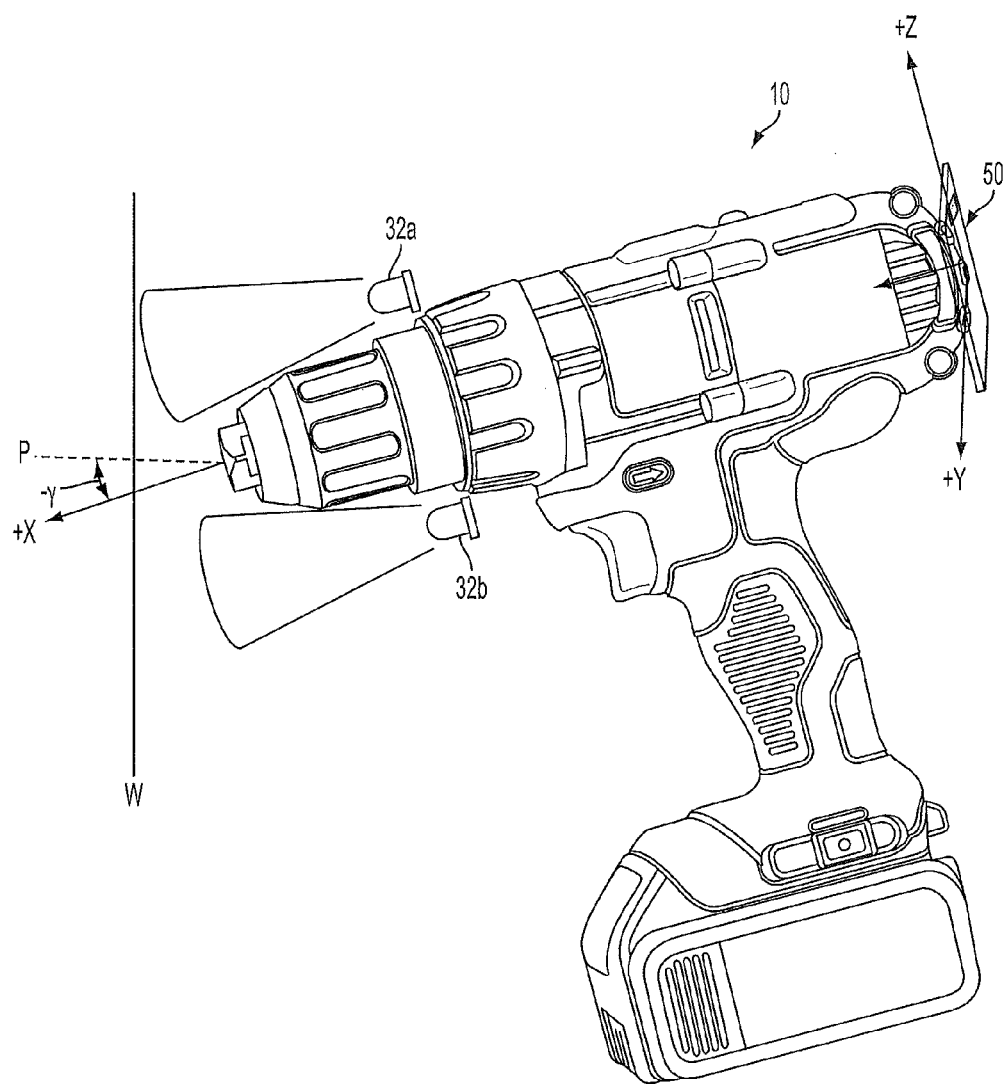
Figure 3C:
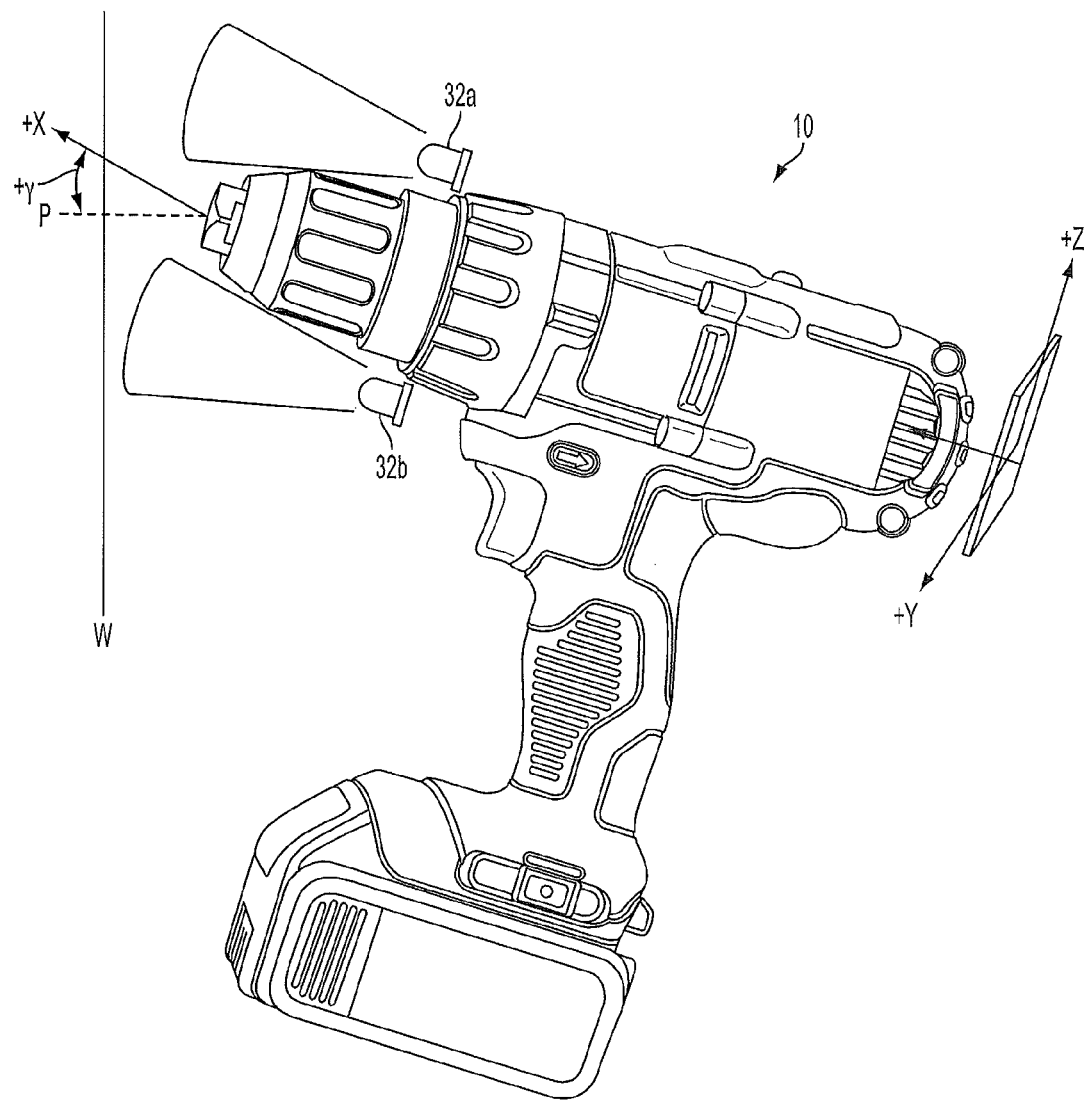
Figure 8A:
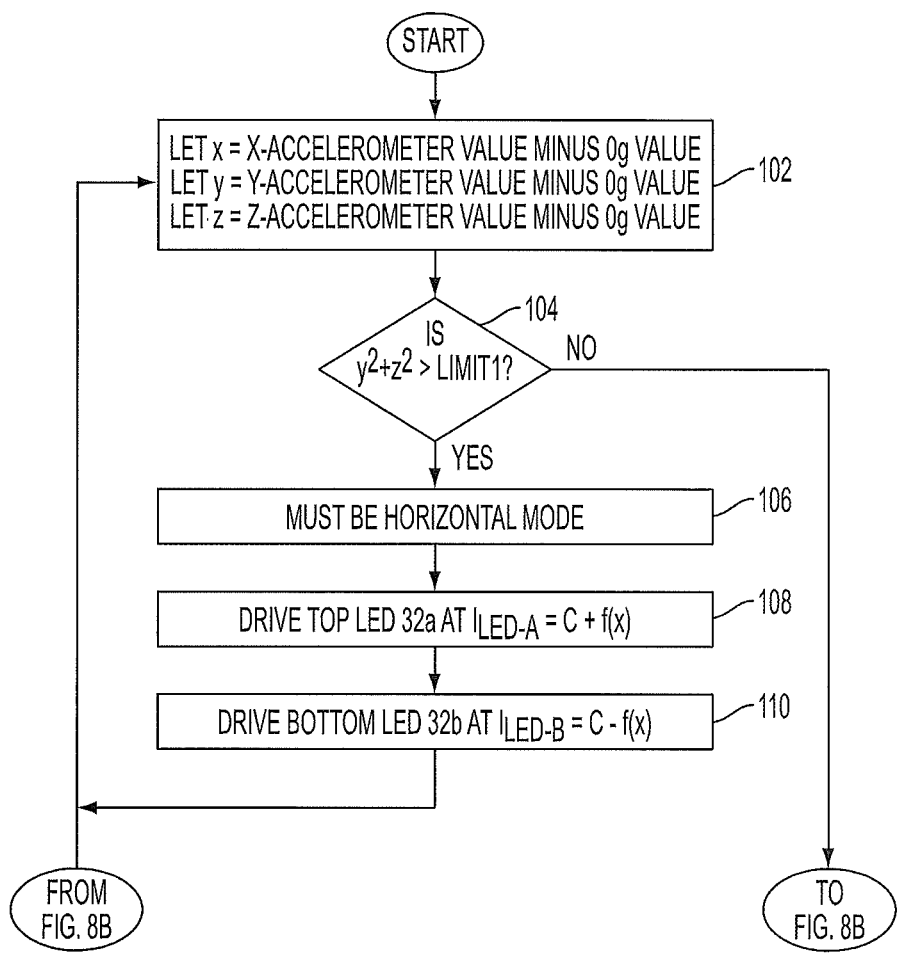
FIGS. 8A-8B are flow charts illustrating an algorithm for controlling illumination of the LEDs in the power tool of FIG. 1 in a horizontal mode and a vertical mode.
Figure 8B:
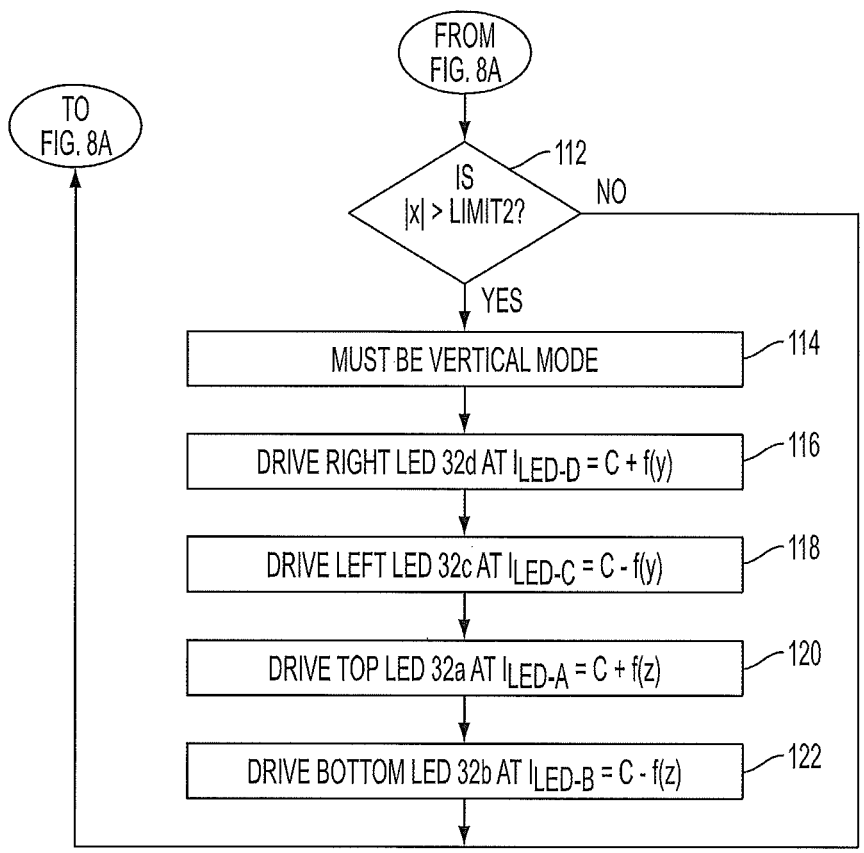

Referring to FIGS. 8A-8B, one implementation of an algorithm 100 for controlling illumination of the LEDs in the horizontal and vertical modes includes the following steps. At step 102, values for variables x, y, and z are set to be equal to digital representations of the values generated by each of the X-, Y-, and Z-accelerometers less their zero g values, respectively. For example, if the X-accelerometer (and the X-axis) is aligned with gravity in the positive X-axis direction, then the value x will equal the a digital representation of the g value of the X-accelerometer, and if the X-accelerometer is perpendicular to gravity, then the value x will be equal to a digital representation of the zero g value of the X-accelerometer. If the positive X-axis of the X-accelerometer is pointed upward at an angle $+\gamma$ (as shown in FIG. 3C), then the value of x will be equal to a digital representation of the X-accelerometer output (which is less than its zero g value) minus the zero g value for the X-accelerometer. Thus, the value of x equals a digital representation of the $-g*\sin(\gamma)$ output of the X-accelerometer. If the positive X-axis of the X-accelerometer is pointed downward at an angle $-\gamma$ (as shown in FIG. 3B), then the value of x will be equal to a digital representation of the X-accelerometer output (which is greater than its zero g value) minus the zero g value for the X-accelerometer. Thus, the value of x equals a digital representation of the $-g*\sin(\gamma)$ output of the X-accelerometer.

For example, if the zero g output voltage from the X-accelerometer is +1.5V, the 0.087 g output voltage is +3.0V, the −0.087 g output voltage is 0.0V, and the analog-to-digital conversion is 8 bits, then the values for x at angles of 0, +5, and −5 degrees are given by the following table:

| Angle ($\gamma$) | X-accelerometer output voltage | X-accelerometer output voltage minus zero g value | x (decimal value) |
| --- | --- | --- | --- |
| 0° | 1.5 V | 0 | 0 |
| +5° | 3.0 V | +1.5 | 127 |
| −5° | 0.0 V | −1.5 | −128 |

Similar relationships exist for the variables y and z and the Y- and Z-accelerometer outputs when the tool is angled at angles +α, −α, +β, and −β.

At step 104, the value of $y^2+z^2$ is compared to a threshold value, Limit1, to determine whether drilling is more nearly horizontal or more nearly vertical. If drilling is more nearly horizontal then the value of $y^2+z^2$ should be very close to the $g^2$ values for the Y- and Z-accelerometers. Accordingly, Limit1 is set to be just slightly below the $g^2$ value for the Z-accelerometer. If $y^2+z^2$ is greater than Limit1, then at step 106, this indicates that the drill is in a horizontal mode.

At step 108, the microcontroller causes the top LED 32a to illuminate, applying a current of $I_{LED-A}$ having a value equal to a constant value C (selected to cause an intermediate brightness) plus a function of x, f(x). In one embodiment, f(x) is a linear function where f(x)=x/R, where R is a constant. For example, if C is 10 mA, and R=10 ohms, then the value of $I_{LED-A}$ when the tool is angled at an angle of $\gamma$=−5° is equal to 20 mA (so that the top LED 32a is illuminated at maximum brightness). The value of $I_{LED-A}$ when the tool is angled at an angle of $\gamma$=+5° is equal to 0 mA (so that the top LED 32a is extinguished). At step 110, the microcontroller causes the bottom LED 32b to illuminate, applying a current of $I_{LED-B}$ having a value equal to the constant value C minus the same function of x, f(x). For example, if f(x)=x/R, if C=10 mA, and R=10 ohms, then the value of $I_{LED-B}$ when the tool is angled at an angle of $\gamma$=−5° is equal to 0 mA (so that the bottom LED 32b is extinguished). The value of $I_{LED-B}$ when the tool is angled at an angle of $\gamma$=+5° is equal to 20 mA (so that the bottom LED 32b is illuminated at maximum brightness). After step 110, the algorithm loops back to the first step 102, and continues until the user stops operating the power tool.

If, at step 104 the value of $y^2+z^2$ is less than Limit1, then the microcontroller proceeds to step 112 to determine whether the tool is in a vertical mode. At step 112, the microcontroller determines whether the absolute value of x is greater than a Limit2, which is slightly less than the g value for x. If |x| is less than or equal to Limit2, this indicates that the tool is not in the vertical mode, the algorithm loops back to the first step 102. If, at step 112, the microcontroller determines that |x| is greater than Limit2, then, at step 114, this indicates that the tool is in a vertical mode.

At step 116, the microcontroller causes the right LED 32d to illuminate, applying a current of $I_{LED-D}$ having a value equal to the constant value C (selected to cause an intermediate brightness) plus a function of y, f(y). In one embodiment, f(y) is a linear function where f(y)=y/R, where R is a constant. For example, if C is 10 mA, and R=10 ohms, then the value of $I_{LED-D}$ when the tool is angled at an angle of $\beta$=+5° is equal to 20 mA (so that the right LED 32d is illuminated at maximum brightness). The value of $I_{LED-D}$ when the tool is angled at an angle of $\beta$=+5° is equal to 0 mA (so that the right LED 32d is extinguished). At step 118, the microcontroller causes the left LED 32c to illuminate, applying a current of $I_{LED-C}$ having a value equal to the constant value C minus the same function of y, f(y). For example, if f(y)=y/R, if C=10 mA, and R=10 ohms, then the value of $I_{LED-C}$ when the tool is angled at an angle of $\beta$=+5° is equal to 0 mA (so that the left LED 32c is extinguished). The value of $I_{LED-C}$ when the tool is angled at an angle of $\beta$=−5° is equal to 20 mA (so that the left LED 32c is illuminated at maximum brightness). At step 120, the microcontroller causes the top LED 32a to illuminate, applying a current of $I_{LED-A}$ having a value equal to the constant value C (selected to cause an intermediate brightness) plus a function of z, f(z). In one embodiment, f(z) is a linear function where f(z)=z/R, where R is a constant. For example, if C is 10 mA, and R=10 ohms, then the value of $I_{LED-A}$ when the tool is angled at an angle of $\alpha$=+5° is equal to 20 mA (so that the top LED 32a is illuminated at maximum brightness). The value of $I_{LED-A}$ when the tool is angled at an angle of $\alpha$=−5° is equal to 0 mA (so that the top LED 32a is extinguished). At step 122, the microcontroller causes the bottom LED 32b to illuminate, applying a current of $I_{LED-B}$ having a value equal to the constant value C minus the same function of z, f(z). For example, if f(z)=z/R, C=10 mA, and R=10 ohms, then the value of $I_{LED-B}$ when the tool is angled at an angle of $\alpha$=+5° is equal to 0 mA (so that the bottom LED 32b is extinguished). The value of $I_{LED-B}$ when the tool is angled at an angle of $\alpha$=−5° is equal to 20 mA (so that the bottom LED 32b is illuminated at maximum brightness). In other embodiments, f(x), f(y), and f(z) may be a more complex or higher order functions of x, y, and z, respectively.

After step 122 the algorithm loops back to the first step 102, and continues until the user stops operating the power tool.

Figure 9:
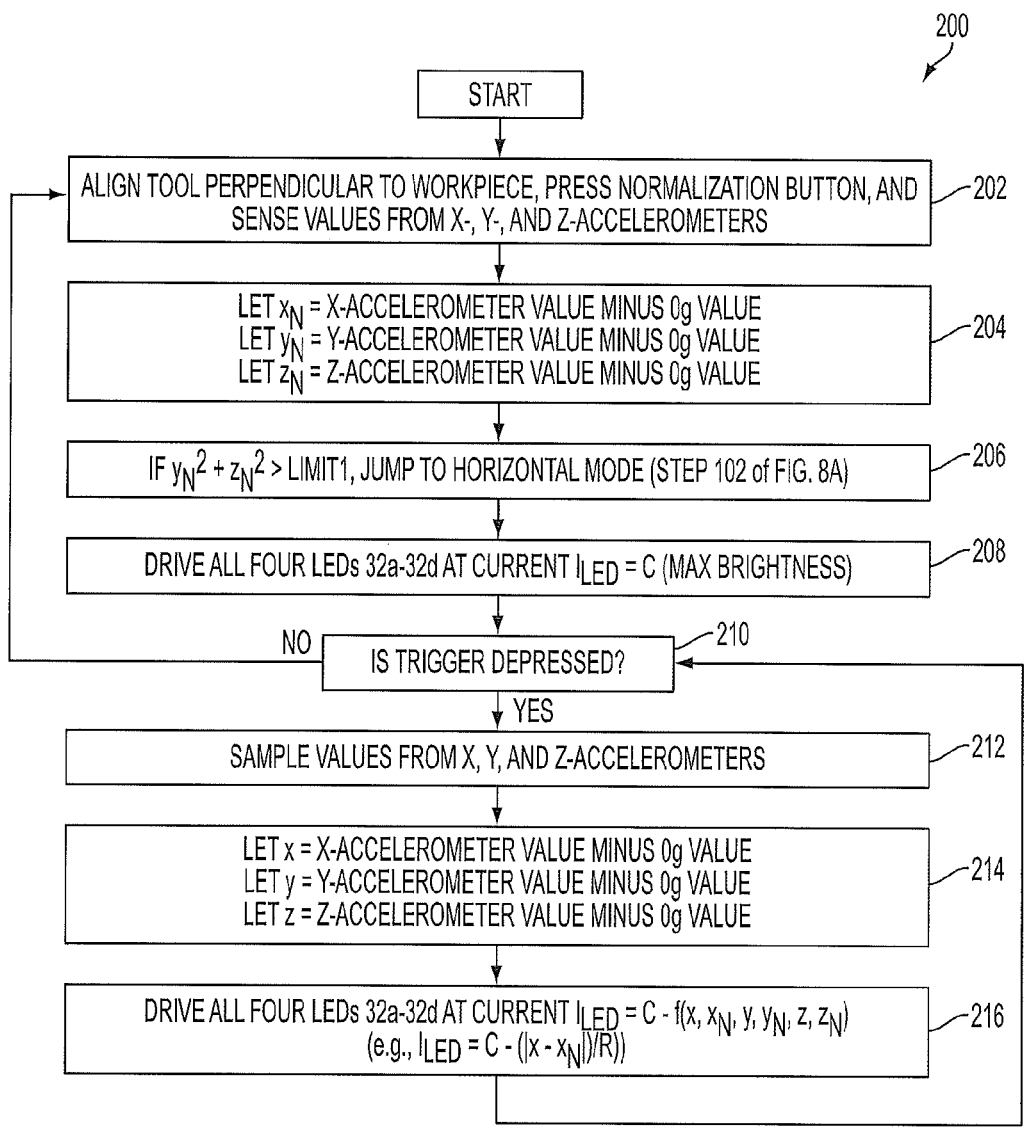
FIG. 9 is a flow chart illustrating an algorithm for controlling illumination of the LEDs of the power tool of FIG. 1 in an angled mode.
Figure 10A:
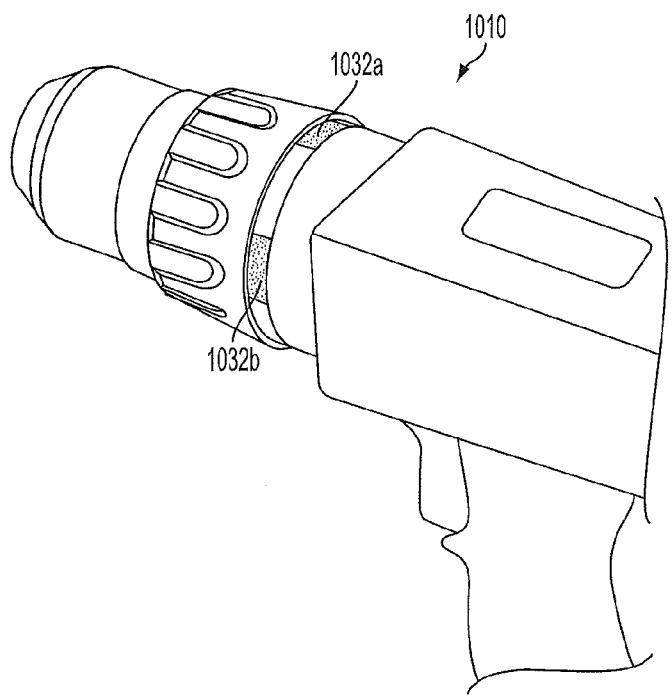
FIGS. 10A-10D illustrate a second embodiment of a power tool with multi-colored LEDs as the level and plumb indicators.
Figure 10B:
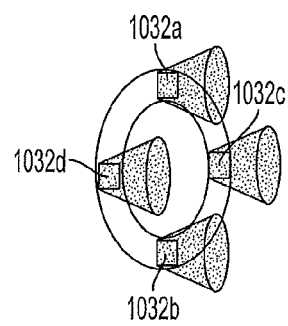
Figure 10C:
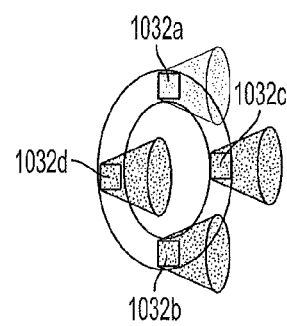
Figure 10D:
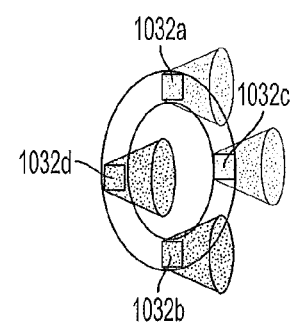

Referring to FIG. 9, one implementation of an algorithm 200 for controlling illumination of the four LEDs in the angled mode includes the following steps. First at step 202, the tool is normalized by the user aligning the tool perpendicular to the workpiece (or in another desired orientation), and pressing a normalization button, and the tool sensing the values from the X, Y, and Z-accelerometers. For example, normalization may be achieved by depressing the trigger a for less than one second. At step 204, normalized values for $x_N$, $y_N$, and $z_N$ are set to be equal to digital representations of the X-, Y-, and Z-accelerometer values minus their zero g values, respectively. At step 206, it is determined whether $y_N^2+z_N^2>$Limit 1 (which is slightly less than the $g^2$ values for the Y- and Z-accelerometers. If this is true, this indicates that the tool is in the horizontal mode, and the algorithm jumps to the horizontal mode at step 102 of FIG. 8A. If not, then at step 208, the processor causes all four LEDs to be driven at a constant current $I_{LED}$=C, where C is set to provide maximum illumination to the LEDs (e.g., 20 mA). At step 210, the tool detects whether the trigger has been depressed to initiate the operation of the tool. If not, the tool returns to the first normalization step 202. If yes, at step 212, values from the X-, Y-, and Z-accelerometers are sampled. At step 214, the variables x, y, and z are set to be equal to digital representations of the X-, Y-, and Z-accelerometers, minus their zero g values, respectively. At step 216, all four LEDs are driven at a current $I_{LED}$=C minus a function of x and $x_N$, of y and $y_N$, and/or of z and $z_N$, so that the LEDs are each caused to illuminate less brightly or to be extinguished if the tool is rotated away from its desired orientation in any direction. For example, $I_{LED}$ may be equal to $|x-x_N|/R$. Other more complex or higher order functions, or functions also making use of the y and z variables may be used.

Referring to FIGS. 10A-10D, in an alternative embodiment of a power tool 1010, the LEDs 32a, 32b, 32c, and 32d can be replaced with multi-colored LED packages 1032a, 1032b, 1032c, and 1032d that appear to change color when the tool is not aligned with the workpiece. For example, the LEDs may all illuminate one color (e.g., green) when the tool is level, plumb, or perpendicular to the workpiece (see FIG. 10B) and one or more of the LEDs may illuminate as another color (e.g., red) when the tool is not level, plumb, or perpendicular to the workpiece. In one particular embodiment, when the tool is not level, plumb or perpendicular to the workpiece, the LED(s) that are closer to the workpiece are illuminated as red, while the other LEDs illuminate as green. For example, if the tool is tilted upward (see FIG. 10C), the top LED 1032a may illuminate as red, while the other LEDs illuminate as green. If the tool is tilted upward and to the right (see FIG. 10D), the top and right LEDs 1032a, 1032c may illuminate as red, while the other LEDs illuminate as green. Alternatively, the top and bottom LEDs may extinguish when the tool is level, but illuminate red or green depending upon which LED is closer to the work surface. For instance, the closer LED would illuminate green, while the more distant LED would illuminate red.

Figure 11:
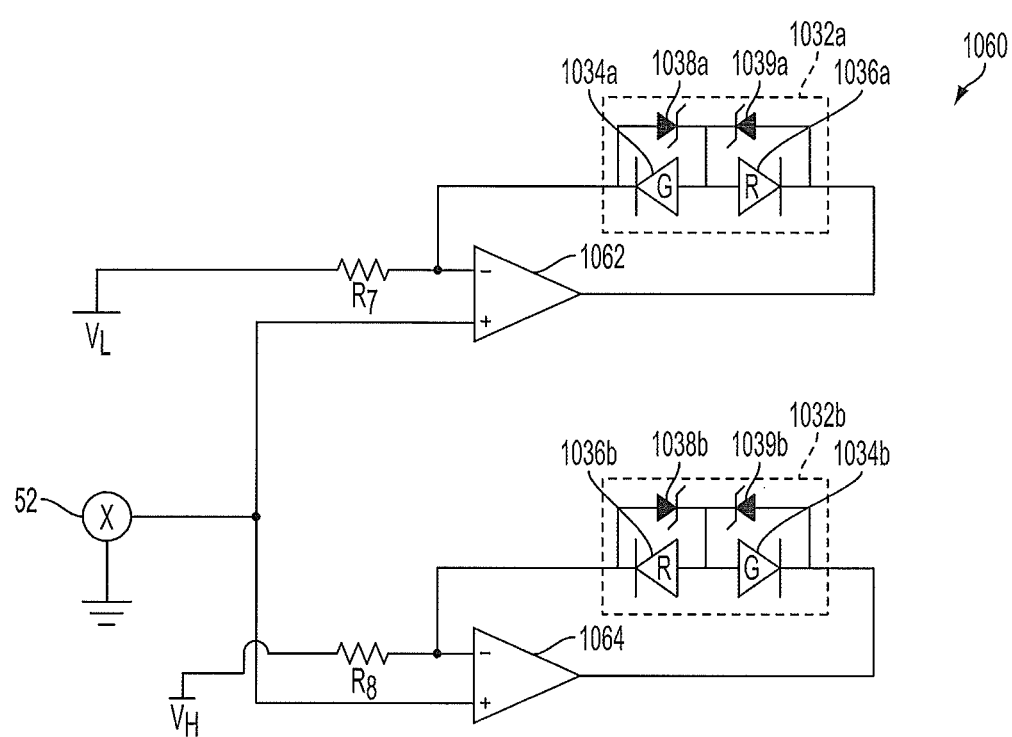
FIG. 11 is a schematic diagram of an analog circuit that controls illumination of the LEDs in the power tool of FIG. 10.

Referring to FIG. 11, illumination of the top and bottom LED packages 1032a, 1032b in a horizontal mode (as shown in FIG. 3) can be controlled by an analog circuit 1060 that is connected to the output of the X-accelerometer. The signal from the X-accelerometer 52 is output to the positive input of a first op amp 1062. The negative input of the first op amp 1062 is connected to a low reference voltage $V_L$ via a resistor R7. The low reference voltage $V_L$ is equal to a threshold voltage that is equal to the voltage output from the X-accelerometer at 0 g. The output of the first op amp 1062 is connected to the top LED package 1032a. The top LED package 1032a includes a green LED 1034a and a red LED 1036a wired with reverse polarity, and Zener diodes 1038a, 1039a to bypass current around the red and green LEDs 1034a, 1036a when either one of them is reverse biased. The output from the first op amp 1062 causes the green LED 1034a to illuminate when the output of the X-accelerometer is greater than the 0 g reference voltage $V_L$, and the red LED 1036a to illuminate when the output of the X-accelerometer is less than the 0 g reference voltage $V_L$. Thus, if the tool axis X is not level but is inclined by the angle $+\gamma$ (tilting downward), the voltage output from the X-accelerometer will be greater than $V_L$, and the top LED package 1032a will appear green. Conversely, if the tool axis X is inclined by the angle $-\gamma$ (tilting upward), then the voltage output of the X-accelerometer will be less than $V_L$, and the top LED package 1032a will appear red.

The signal from the X-accelerometer is also output to the positive input of a second op amp 1064. The negative input of the second op amp 1064 is connected to the 0 g reference voltage $V_H$ via a resistor R8. The high reference voltage $V_H$ is equal the voltage output from the X-accelerometer at 0 g. The output of the second op amp 1064 is connected to the bottom LED package 1032b. The bottom LED package 1032b includes a green LED 1034b and a red LED 1036b wired with reverse polarity, and Zener diodes 1038b, 1039b to bypass current around the red and green LEDs 1034b, 1036b when either one of them is reverse biased. The output from the second op amp 1064 causes the green LED 1034b to illuminate when the output of the X-accelerometer is less than the high reference voltage $V_H$, and causes the red LED 1036b to illuminate when the output of the X-accelerometer is greater than the high reference voltage $V_H$. Thus, if the tool axis X is inclined by the angle $-\gamma$ (tilting upward), the voltage output from the X-accelerometer will be less than $V_H$, and the bottom LED package 1032b will appear green. Conversely, if the tool axis X is inclined by the angle $+\gamma$ (tilting downward), the voltage output of the X-accelerometer will be greater than $V_H$, and the bottom LED package 1032b will appear red.

One of ordinary skill in the art will understand how similar analog circuits can be designed to also control illumination of the top, bottom, left and right LED packages 1032a-1032d in the vertical mode, or in the angled drilling mode. One of ordinary skill in the art will also understand that the illumination of such multi-colored LED packages alternatively could be controlled by a digital circuit using a programmed microprocessor. Use of such a digital circuit allows rapid reversal of currents flowing through the LED packages such that if 20 mA is the normal current for full illumination, then 20 mA in one direction for 50% of the time (50% duty cycle) and 20 mA in the other direction for 50% of the time, namely the level condition, will result in a yellow LED color. And a duty cycle of 100%, which is to say current flowing in one direction only, will produce one of the LED colors, say red. While 0% duty cycle, which is to say current flowing in the opposite direction only, will produce the other LED color, say green. In this way if the upper LED tilts closer to the work surface, then the upper LED becomes more greenish, until it is entirely green, while the lower LED becomes more reddish, until it is entirely red. Tilting in the opposite direction, such that the lower LED is closer to the work surface, results in the lower LED becoming more greenish until it is entirely green, and the upper LED becoming more reddish until it is entirely red.

Figure 12A:
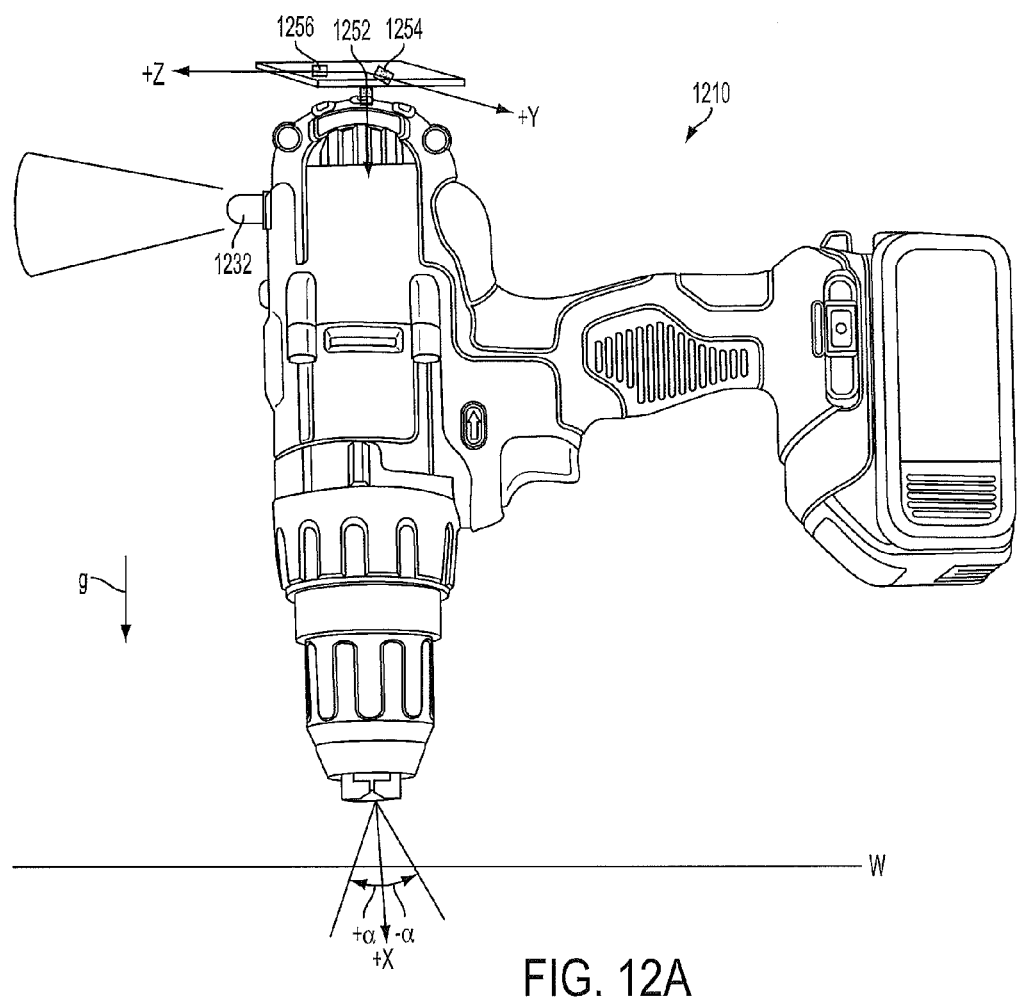
FIG. 12A is a side view of a third embodiment of a power tool in a vertical mode of operation.
Figure 12B:
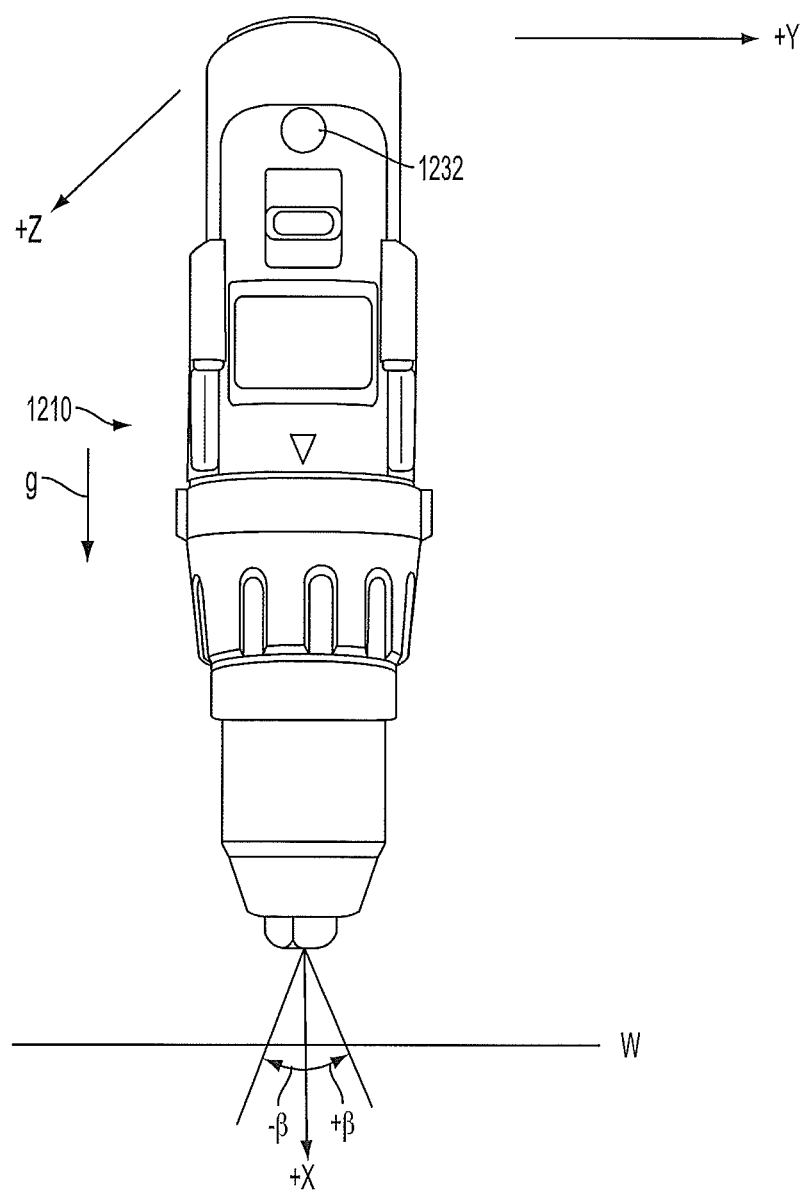
FIG. 12B is a top view of the power tool of FIG. 12A in a vertical mode of operation.
Figure 12C:
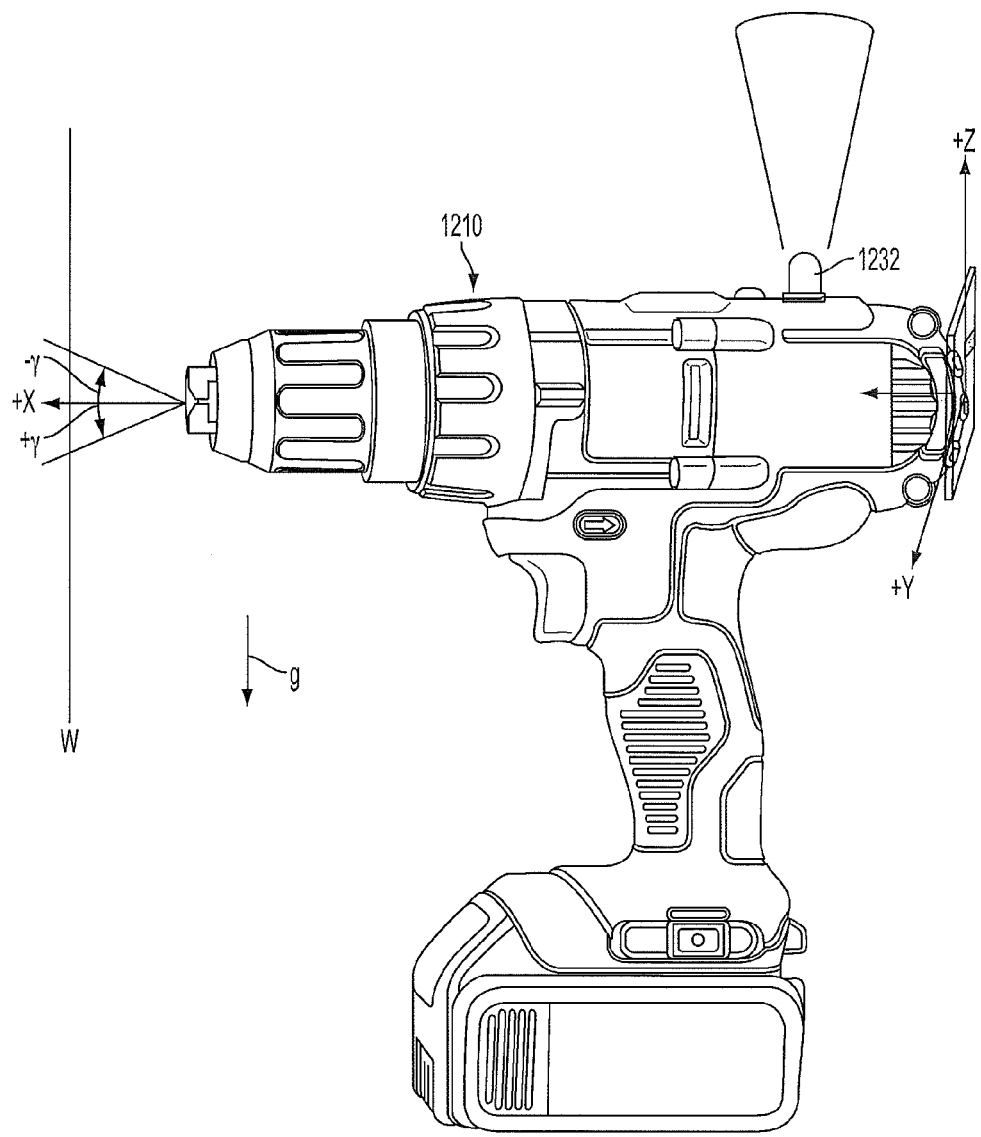
FIG. 12C is a side view of the power tool of FIG. 12A in a horizontal mode of operation.

Referring to FIGS. 12A-12C, in another embodiment, a power tool 1210, similar in design to the power tool 12 of FIG. 1, has a single LED or LED package 1232 that indicates whether the power tool 1210 is level, plumb, or perpendicular to the work surface. The power tool 1210 includes X-, Y-, and Z-accelerometers 1252, 1254, 1256 oriented similar to the X-, Y-, and Z-accelerometers 52, 54, 56 of FIG. 1.

Figure 13A:
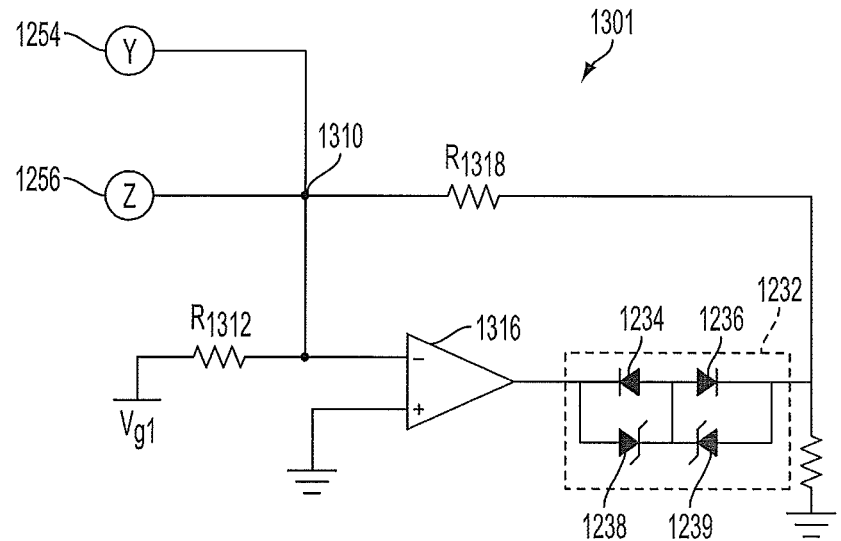
FIGS. 13A-13B are schematic diagrams of an embodiment of analog circuits that control illumination of the LED of the power tool of FIGS. 12A-12C.

Referring to FIG. 13A, in the vertical mode (FIGS. 12A and 12B), illumination of the LED package 1232 can be controlled by analog circuit 1301. The outputs of the Y- and Z-accelerometers 1254, 1256 are connected to each other at a first summing junction node 1310, which in turn is connected to a reference voltage Vg1 via a resistor R1312 at the same summing junction node 1310. The output of the node 1310 is connected to the negative input of a op amp 1316. The positive input of the op amp 1316 is connected to ground. The summing junction 1310 is connected to one side of a resistor R1318, the other side of which is connected to LED package 1232. The other side of the LED package 1232 is connected to the output of the op amp 1316. The LED package 1232 includes a pair of LEDs 1234, 1236 wired in reverse polarity, and a pair of Zener diodes 1238, 1239 to bypass current around the LEDs 1234, 1236 when either one of them is reverse biased. The LEDs 1234 and 1236 may be the same color so that the LED package 1232 always appears to illuminate the same color, or may have different colors so that the LED package 1232 appears to illuminate as different colors depending on whether the tool is tilted in the positive or negative direction.

The reference voltage Vg1 is selected to be approximately equal to the 0 g of voltage outputs of the Y- and Z-accelerometers 1254, 1256 when these accelerometers are perpendicular to the direction of gravity (i.e., their 0 g values). For example, if the 0 g values for the Y- and Z-accelerometers each is 1.5V, then the reference voltage Vg1 is equal to −3V when the value or resistor R1312 is equal to the output impedance of one of the accelerometers. If the resistor R1312 is equal to half the output impedance of one of the accelerometers, then Vg1 is equal to −1.5V. Therefore, the voltage of the summing junction node 1310 is equal to zero when both the Y- and Z-accelerometers are perpendicular to the direction of gravity, indicating that the tool is plumb. If this happens, little or no current flows through the LED package 1232, and neither of the LEDs 1234, 1236 illuminates. If the orientation(s) of the Y- and/or Z-accelerometers 1254, 1256 deviate from this plumb orientation, then the current into the summing junction 1310 from the accelerometers will not equal the current into the sink comprised of resistor R1312 and Vg1, and the difference must be supplied by the output of op amp 1316 through LED 1232. If the output of the accelerometers is greater than the current that sinks into resistor R1312, then the current flows to illuminate LED 1234. If the output of the accelerometers is less than the current that sinks into resistor R1312, then the current flows to illuminate LED 1236. Thus, the LED package 1232 appears to illuminate when the tool is not plumb, and the LED package 1232 appears to be extinguished when the tool is plumb.

Figure 13B:
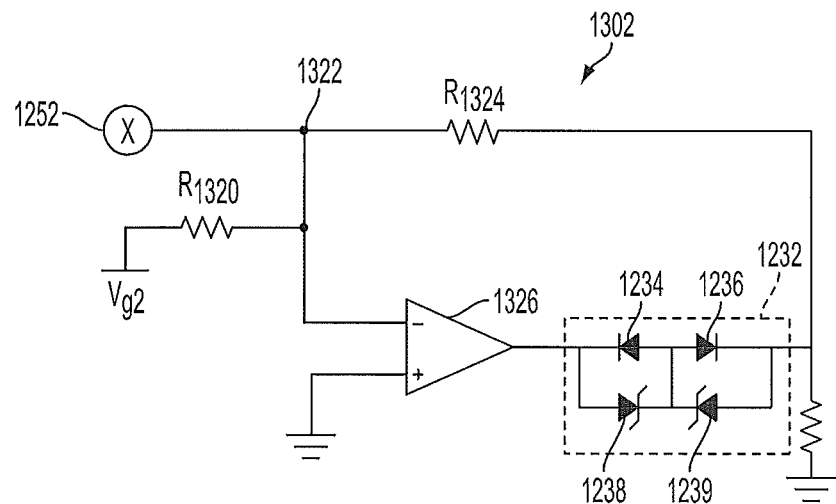

Referring to FIG. 13B, in the horizontal mode (FIG. 12C), illumination of the LED package 1242 can be controlled by analog circuit 1302. The output of the X-accelerometer 1252 is connected to a reference voltage Vg2 via a resistor R1320 at a summing junction node 1322. The node 1322 is connected to the negative input of a op amp 1326. The positive input of the op amp 1326 is connected to ground. The output of the X-accelerometer 1252 is also connected to one side of resistor R1324, the other side of which connects to the LED package 1232. The other side of the LED package 1232 is connected to the output of the op amp 1326. The LED package 1232 includes the pair of LEDs 1234, 1236 wired in reverse polarity, and the pair of Zener diodes 1238, 1239 when either one of them is reverse biased the LEDs 1234, 1236 when either one of them is reverse biased.

The reference voltage Vg2 is selected to be approximately equal to the voltage output of the X-accelerometer 1252 when the X-accelerometer is perpendicular to the direction of gravity (i.e., its 0 g values). For example, if the 0 g values for the X accelerometer is 1.5V, then the reference voltage Vg1 is equal to −1.5V. Therefore, the output of the X-accelerometer into the summing junction node 1322 is equal to zero when the X-accelerometer is perpendicular to the direction of gravity, indicating that the tool is level. If this happens, little or no current flows through the LED package 1232, the output current of the X-accelerometer 1252 equals the current that sinks into resistor 1320 and Vg2, and neither of the LEDs 1234, 1236 illuminates. If the orientation(s) of the X-accelerometer 1252, deviates from this level orientation, then the current from the X-accelerometer into the summing junction 1302 will not equal the current into resistor 1320 and the op amp 1326 will supply the difference through LED package 1232. If the output is positive, then the current flows to illuminate LED 1234. If the output is negative, then the current flows to illuminate LED 1236. Thus, the LED package 1232 appears to illuminate when the tool is not level, and the LED package 1232 appears to be extinguished when the tool is level.

Figure 20A:
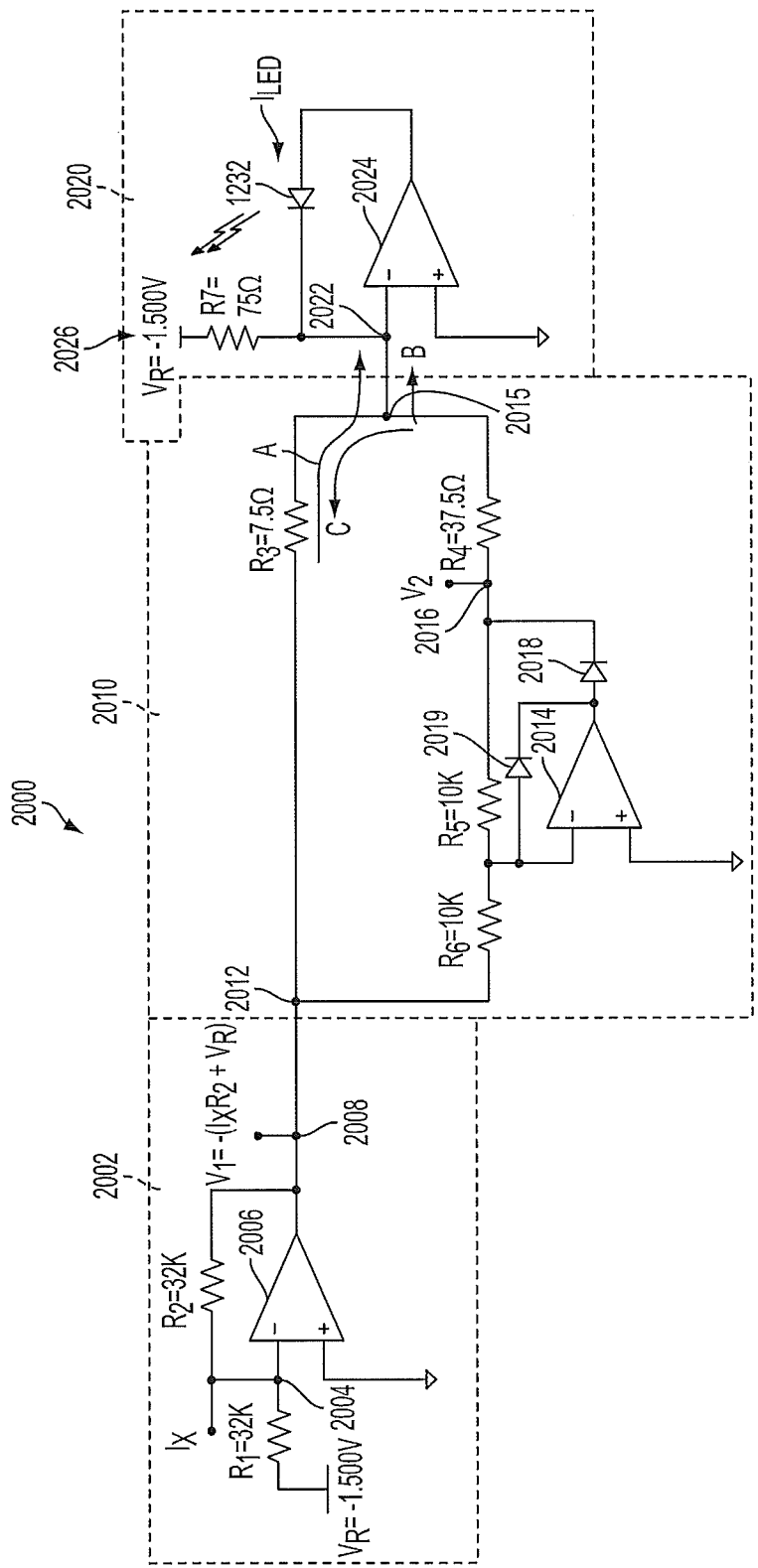
FIGS. 20A-20C are schematic diagrams of another embodiment of analog circuits for controlling the illumination of the power tool of FIGS. 12A-12C.
Figure 20B:
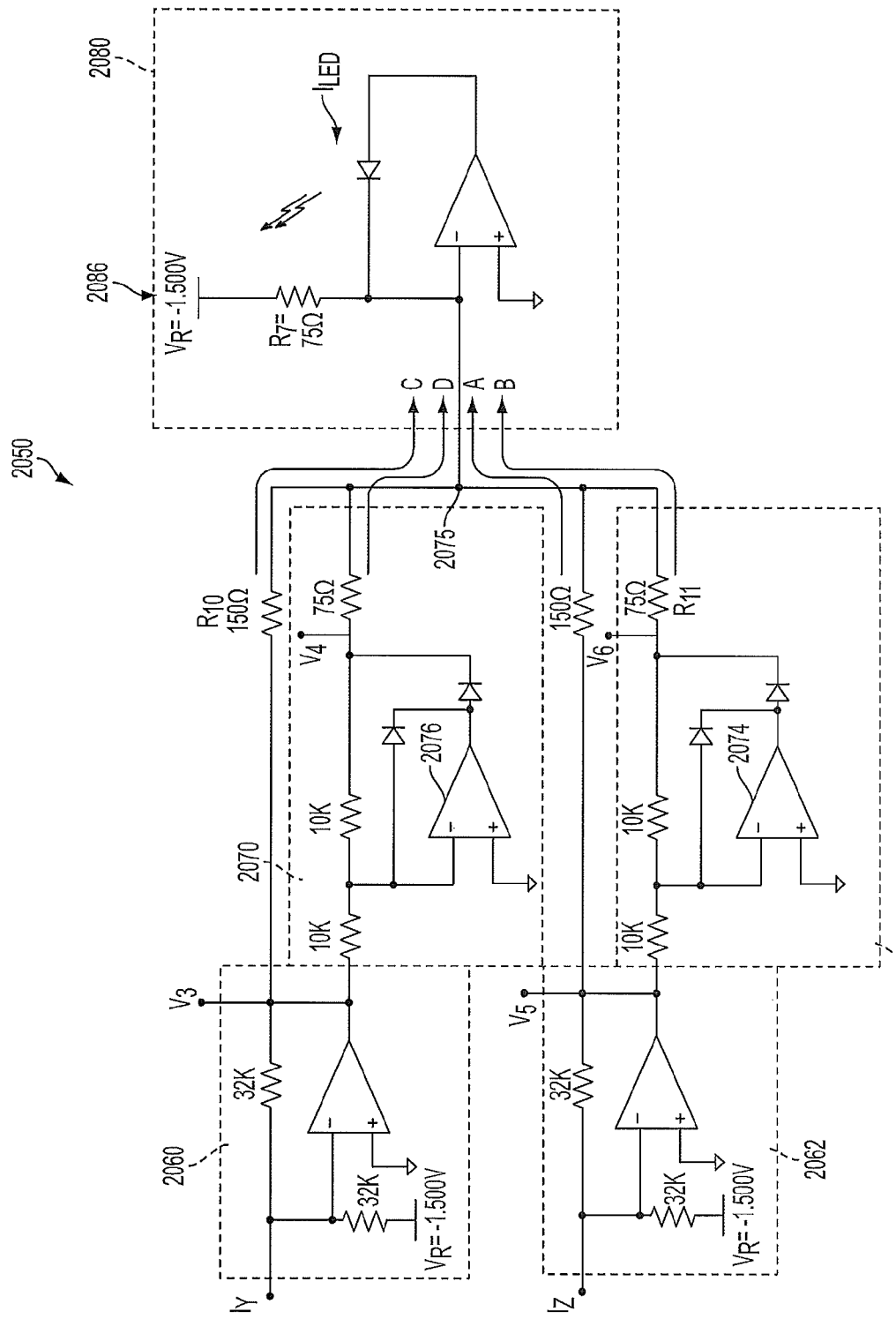

Referring to FIGS. 20A and 20B, in another embodiment the illumination of the LED package 1232 may be controlled by analog circuits 2000 and 2050 so that the LED package 1232 appears illuminate when the tool is level or plumb, and appears to be dimmer or extinguished when the tool is not level or plumb. Referring to FIG. 20A, in the horizontal mode, illumination of the LED 1232 is controlled by analog circuit 2000 that includes an op-amp summing junction circuit 2002, an absolute value circuit 2010, and an LED driver circuit 2020. The output from the X-accelerometer is connected to the op-amp summing junction circuit 2002, and op amp 2006 generates an output current at an output voltage $V_1$ that is equal to the negative of a sum of the product of the output current from the X-accelerometer and the resistance of resistor R2 and a negative reference voltage $V_R$, i.e., $V1=-(I_X*R2)-Y_R$ The op-amp summing junction circuit 2002 includes an op-amp 2006 with a positive input connected to ground, and a negative input connected to a node 2004, where the current from the X-accelerometer is added to the current from the negative reference voltage $V_R$. The output of the op-amp 2006 is connected in a negative feedback loop with the negative input to the op-amp, and to an output node 2008. The voltage at the output node 2008 is designated as $V_1$.

The summing junction circuit 2002 generates a current at the output node 2008 at the voltage $V_1$, which is equal to the negative of the sum of the current from the X-accelerometer and the current from $V_R$, which is a negative, or subtractive, current. $Y_R$ is selected to be the negative of the X-accelerometer output voltage when the tool is level and the acceleration in the X-direction is zero. Thus, if the tool is level, the current flows directly from the X-accelerometer to $V_R$, and the op amp generates no current at the output node 2008, such that the voltage potential at V1 is equal to 0V. If the tool is angled at an angle +γ (as shown in FIG. 12C), then the op amp generates a current at the output node 2008 with a positive voltage potential at V1. If tool is angled at an angle −γ (as shown in FIG. 12C), then the op amp generates a current at the output node 2008 with a negative voltage potential at V1.

The output node 2008 of the op-amp summing junction circuit 2002 is connected to an input node 2012 of the absolute value circuit 2010 (the output node 2008 and the input node 2012 are electronically the same node), which generates an output current at a voltage potential equal to the absolute value of the output voltage $V_1$. The input node 2012 is connected to an output node 2015 via a resistor R3. The input node 2012 is also connected to a negative input of an op-amp 2014 through resistor R6. The positive input to the op-amp 2014 connected to ground. The output of the op-amp 2014 is connected to the output node 2015 via a first diode 2018 and a resistor R4, and is connected to the negative input of the op amp 2014 via a second diode 2019 and resistor R5. The input node 2012 is further connected to the output node 2015 via resistors R4, R5, and R6, which are in series with each other, and parallel to the op amp 2014 and the diodes 2018, 2019. The voltage potential at an intermediate node 2016 is designated as $V_2$.

The absolute value circuit 2010 generates a current through the output node 2015 at a ground potential. If V1=0, then no current flows through the resistor R3 into the output node 2015, nor through resistor R4 into the output node 2015. If V1 is positive, then the voltage potential V2 at the node 1216 will be equal to zero, and current will flow from node 2012 through resistor R3 into the output node 2015 to the LED driver circuit 2020 in the direction A, at ground potential at node 2015. If V1 is negative, then V1 in combination with resistor R3 will act as a current sink, and the op amp 2014 will generate current having a potential V2 equal to |V1|, and then current flows through resistor R4 to the output node 1215. Some of that current will sink into R3, but the rest of that current will sink into R7. Also, R3=R7=2*R4. Thus, the current flowing through the output node 1215 to the LED driver circuit 2020 will always be driven at ground potential and that current is equal to the value of |V1|/R7.

The output node 2015 of the absolute value circuit is connected to an input node 2022 of the LED driver circuit 2020, thus the nodes 2015 and 2022 are electronically the same node. The LED driver circuit 2020 causes maximum current $I_{LED}$ to flow through the LED when V1=0, to illuminate the LED at maximum brightness when no current is flowing through the output node 1215, and causes less or no current $I_{LED}$ to flow through the LED when V1 is positive or negative, causing the LED to be dimmer or to be extinguished. The LED driver circuit 2020 includes an op amp 2024 with a positive input connected to ground and a negative input connected to the output node 2015 of the absolute value circuit via the input node 2022. The output of the op amp 2024 is connected to the input of the LED 1232 and to a current sink 2026 defined by a resistor R6 and the reference voltage $V_R$. The current sink 2026 is also connected to the negative input of the op amp 2024 and to the output node 2015 of the absolute value circuit 2010, via input node 2022. The values for the resistor R6 and reference voltage $V_R$ in the current sink 2026 are selected so that the amount of current flowing through the LED 1232 to the current sink, when the current from the output node 2015 is zero, will be equal to the amount current needed to illuminate the LED 1232 at maximum brightness.

When no current is flowing through output node 2015 (i.e., V1=0), then the op amp 2024 will generate all the current required to flow into the current sink, and it must flow through LED 1232 thereby causing it to illuminate at maximum brightness. If current is flowing in either direction A or direction B through the output node 2015, then some or all of the current will also flow to the current sink 2026. This reduces the amount of current that the op amp 2024 will contribute to the current sink 2026, reducing the brightness of the LED. If the current and voltage potential through the output node 2015 is sufficiently high (from either direction A or B) to satisfy the current sink 2026, then no current will flow from the op amp 2024 output through the LED 1232, causing the LED 1232 to be extinguished.

Thus, if tool is level, then the output of the X-accelerometer is a current that sinks entirely into R1 and VR, and V1=0, so that no current flows out of output node 2015, and the current $I_{LED}$ is at its maximum possible value, causing the LED to illuminate at maximum brightness. If the tool is angled at an angle +γ (as shown in FIG. 12C), then the output of the X-accelerometer is a current that does not entirely sink into R1 and VR, and V1<0, causing current to flow through the output node 2015 in the direction B, and to the current sink 2026. This causes the current $I_{LED}$ to be less than its maximum possible value, or even zero, causing the LED to illuminate at a lesser brightness or to be extinguished. If tool is angled at an angle −γ (as shown in FIG. 12C), the output of the X-accelerometer is a current that does not entirely sink into R1 and VR, and V1>0, causing current to flow through the output node 2015 in the direction A to the current sink 2026. This causes the current $I_{LED}$ to be less than its maximum possible value, or even zero, causing the LED to illuminate at a lesser brightness or to be extinguished.

FIG. 20A illustrates one example for the values of the electronic components for an X-accelerometer that has an impedance of 32KΩ, with an output voltage of 1.5 V at 0 g (when the tool is level and the accelerometer is otherwise unconnected), 3.0V at +(1/20) g (when the tool is angled at +γ by approximately 3°), and 0V when at −(1/20) g (when the tool is angled at −γ by approximately 3°) The values for $V_1$, $V_2$, and $I_{LED}$ for these scenarios is shown in the following table:

| γ | $I_X$ | $V_R$ | $V_1$ | $V_2$ | $I_{LED}$ |
|---|---|---|---|---|---|
| 0 (level) | +1.5 V/32K | −1.5 V | 0 V | 0 V | 20 mA |
| +3° | +3.0 V/32K | −1.5 V | −1.5 V | +1.5 V | 0 mA |
| −3° | 0 V/32K | −1.5 V | +1.5 V | 0 V | 0 mA |

Referring to FIG. 20B, for the vertical mode of operation, the outputs of the Y- and Z-accelerometers each are connected to an op amp summing junction circuit 2060, 2062 and an absolute value circuit 2070, 2072 that are analogous in structure and function to the op amp summing junction circuit 2002 and the absolute value circuit 2010 described above with respect to FIG. 20A. The outputs of the absolute value circuits are connected by an output node 2075. The node 2075 is connected to the input of an LED driver circuit 2080 that is analogous in structure and function to the LED driver circuit 2020 of FIG. 20A, including a current sink 2086 defined by reference voltage $V_R$ and resistor R7.

$V_R$ is selected to be the negative of the Y- and Z-accelerometer output voltages, when they are not otherwise connected to any other circuitry, when the tool is plumb and the acceleration in the Y- and Z-directions are both zero. If the tool is plumb then $I_Y=V_R*R_{19}$, $I_Z=V_R*R_{20}$, and V3=V5=0, so that no current flows out through output node 2075 to the LED driver circuit 2080, and the current $I_{LED}$ is at its maximum possible value, causing the LED to illuminate at maximum brightness. If the tool is angled at an angle +α (as shown in FIG. 12A), then $I_Z*R_{20}<-V_R$ and V5>0, causing current to flow from V5 through a resistor to the output node 2075 in the direction A to the current sink 2086. This causes the current $I_{LED}$ to be less than its maximum possible value, or even zero, causing the LED to illuminate at a lesser brightness or to be extinguished. If tool is angled at an angle −α (as shown in FIG. 12A), $I_Z*R_{20}>-V_R$, V5<0, and V5 acts as a current sink from the op amp 2074 causing current to flow through resistor R11 to the output node 2075 in the direction B to the current sink 2026. This causes the current $I_{LED}$ to be less than its maximum possible value, or even zero, causing the LED to illuminate at a lesser brightness or to be extinguished. If the tool is angled at an angle +β (as shown in FIG. 12B), then $I_Y*R_{19}>-V_R$ and V3<0, causing current to flow from V4 through the output node 2075 in the direction D to the current sink 2026. This causes the current $I_{LED}$ to be less than its maximum possible value, or even zero, causing the LED to illuminate at a lesser brightness or to be extinguished. If tool is angled at an angle −β (as shown in FIG. 12B), $I_Y*32K<-V_R$, V3>0, and V3 acts as a current source, causing current to flow from the op amp 2076 through the output node 2075 in the direction C, and into the current sink 2026. This causes the current $I_{LED}$ to be less than its maximum possible value, or even zero, causing the LED to illuminate at a lesser brightness or to be extinguished.

If the tool is angled both in the Y-direction and the Z-direction (i.e., by angles α and β, then, current will flow from both of the absolute value circuits 2070 and 2072 to the output node 2075, where the currents will be added to flow through the output node to the current sink 2086 of the LED driver circuit 2080. This causes the current $I_{LED}$ to be less than its maximum possible value, or even zero, causing the LED to illuminate at a lesser brightness or to be extinguished. In this situation (and in the above situations), the current through the LED ($I_{LED}$) can be determined by the following equation:

$$I_{LED} = (-V_R/R_{18}) - (|I_Y*R_{19}+V_R|/R_{14}) - (|I_Z*R_{20}+V_R|)/R_{16})$$

Figure 20C:
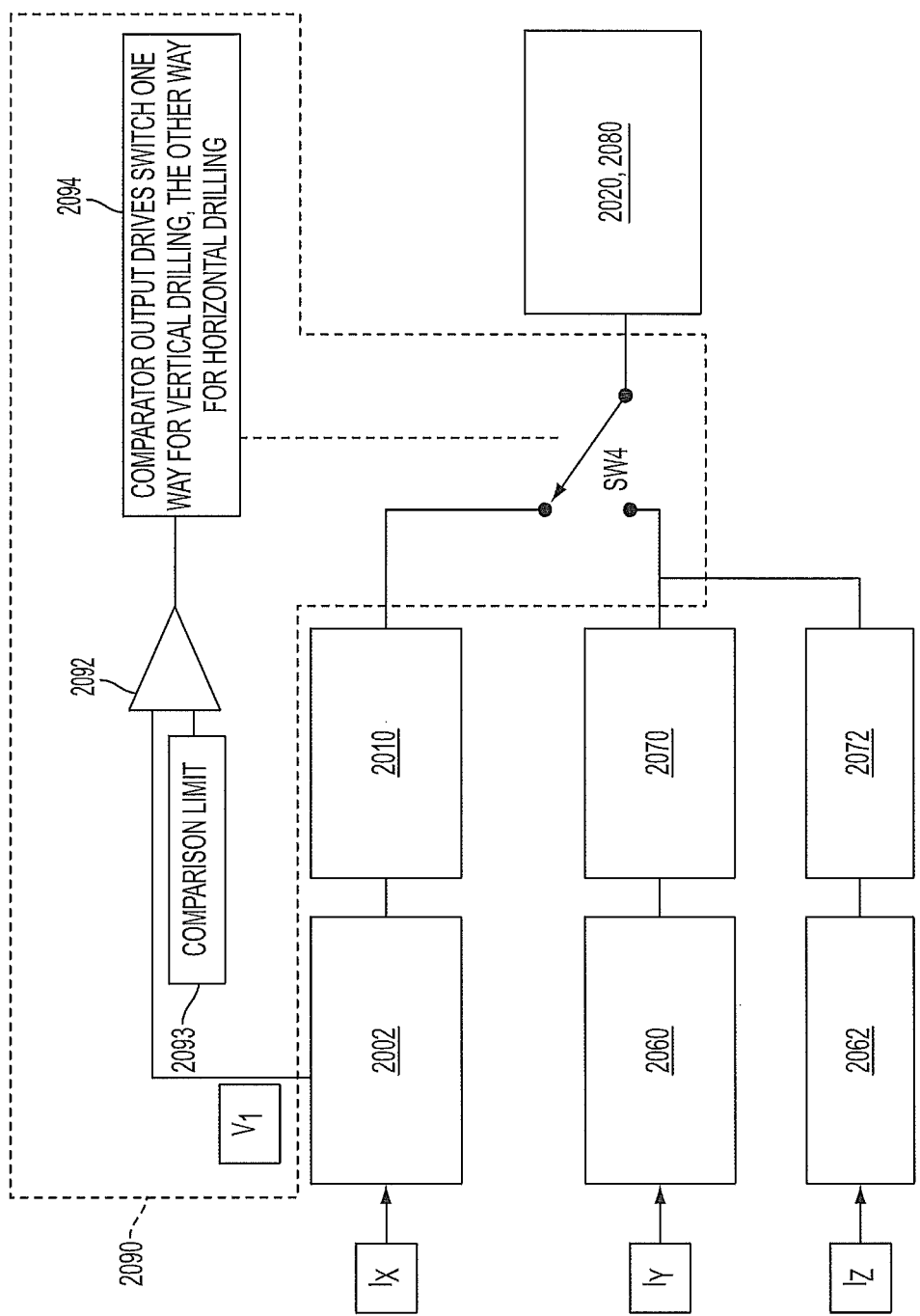

Referring to FIG. 20C, the op amp summing junction circuits 2002, 2060, 2062, the absolute value circuits 2010, 2070, and 2072, and the LED driver circuits 2020 and 2080 of FIGS. 20A-20B may include and be connected to a comparison circuit 2090 that automatically switches between the horizontal and vertical modes of operation based on the detected value from the X-accelerometer. The voltage V1 from circuit 2002 is connected to one input of a comparator 2092. A comparison limit 2093 is connected to the other input of the comparator 2092. The comparison limit 2093 is selected so that if the voltage V1 does not exceed the comparison limit 2093, this indicates that the tool is in the horizontal mode, and if the voltage V1 exceeds the comparison limit 2093, this indicates that the tool is in the vertical mode. The output of the comparator 2092 is connected to an output driver circuit 2094 that controls the position of a switch SW4, which may be, e.g., an electronic or electromechanical switch, such as a transistor switch or a relay. When the comparator determines that the tool is in the horizontal mode, then the switch SW4 connects the X-accelerometer op amp summing junction circuit 2002 and absolute value circuit 2010 to the LED driver circuit 2020, so that the output from the X-accelerometer controls illumination of the LED (as shown in FIG. 20C). When the comparator determines that the tool is in the vertical mode, the switch SW4 is switched to connect the Y- and Z-accelerometer op amp summing junction circuits 2060, 2062 and absolute value circuits 2070, 2072 to the LED driver circuit 2080 (which in this case is one in the same as LED driver circuit 2020), so that the outputs from the Y- and Z-accelerometers control illumination of the LED. In an alternative embodiment, the switch SW4 may be linked to a manual toggle switch that is actuatable by the user to select between the vertical and horizontal modes. In other alternative embodiments, the analog circuits of FIGS. 13A-13B may be connected to a similar automatic switching circuit or user-actuatable switch to toggle between the horizontal and vertical modes.

Figure 14:
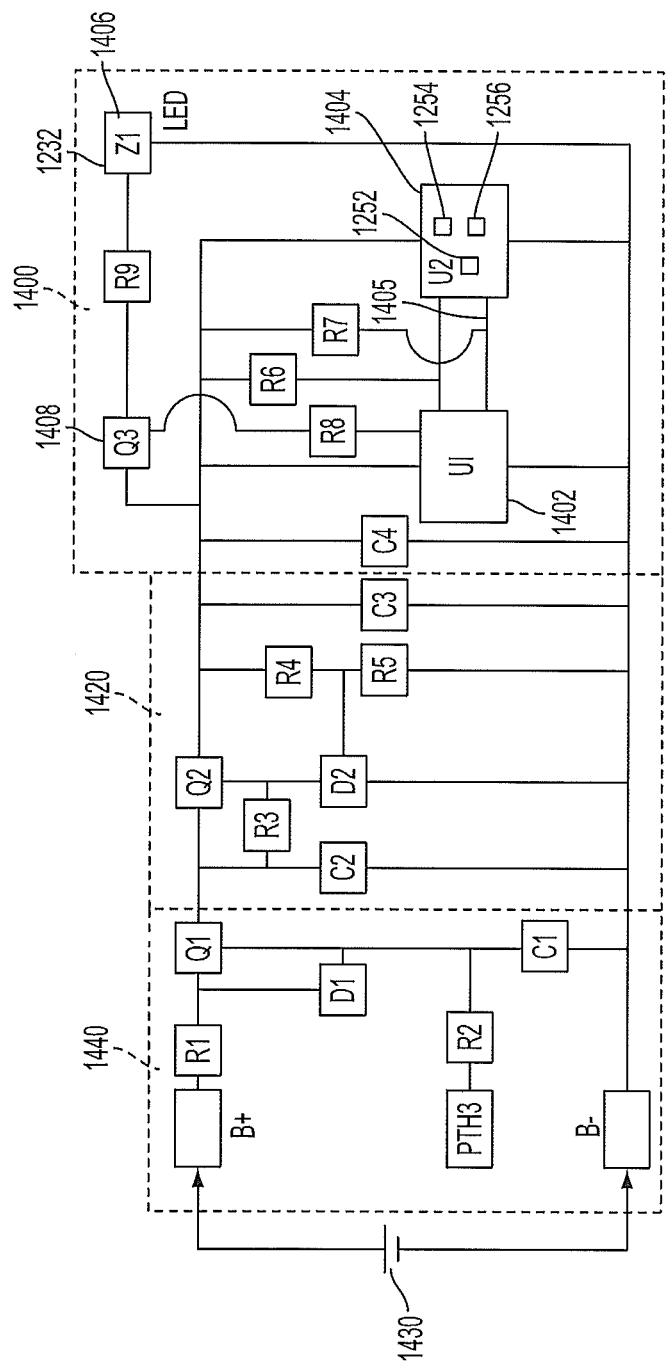
FIG. 14 is a schematic diagram of an embodiment of a digital circuit that controls illumination of the LED of the power tool of FIGS. 12A-12C.

Referring to FIG. 14, in another embodiment, illumination of the LED package 1232 (which in this case includes a single LED 1406) can be controlled using a digital circuit 1400. The digital circuit is connected to a power supply circuit 1420, which in turn is connected to a battery 1430 via a trigger control circuit 1440. The trigger control circuit 1440 includes electronic components that sense when the trigger has been pulled a sufficient amount to activate the tool, and provide a signal to the power supply circuit 1420. The design of the trigger control circuit 1420 can have many forms that will be apparent to those of ordinary skill in the art. The power supply circuit 1420 creates a regulated power supply for powering the LED 1232 and the digital LED control circuit 1400. The design of the power supply circuit 1420 can have many forms as will be understood by those of ordinary skill in the art.

The X-, Y-, and Z-accelerometers 1252, 1254, 1256 are included in a single 3-axis accelerometer sensor chip 1404 that provides a single digital output of a unique digital value that indicates the values of all three accelerometers. For example, the sensor chip 1404 may be a MMA7660FC 3-axis micromachined accelerometer chip sold by Freescale Semiconductor, Inc of Austin, Tex., U.S.A. The digital output of the sensor is connected to an input of a microcontroller 1402. Alternatively, the X-, Y-, Z-accelerometers may have analog outputs that are connected to the microcontroller 1402 via one or more analog to digital converters (not shown). In yet another embodiment, the X-, Y-, and Z-accelerometers may have separate digital outputs that are input to separate digital inputs of the microcontroller.

One output of the microcontroller 1402 is connected to the gate of an electronic switch, e.g., a bipolar junction transistor 1408. When the tool is level or plumb, the microcontroller 1408 outputs a signal to the transistor 1408, causing current to illuminate the LED 1406. The microcontroller 1402 may also include or be coupled to a memory (e.g., a ROM chip, not shown) that stores threshold values needed to evaluate the signals from the accelerometer sensor 1404, e.g., in a look-up table. The microcontroller 1402 is programmed using hardware circuits or software algorithms to control illumination of the LED 1406.

Figure 15A:
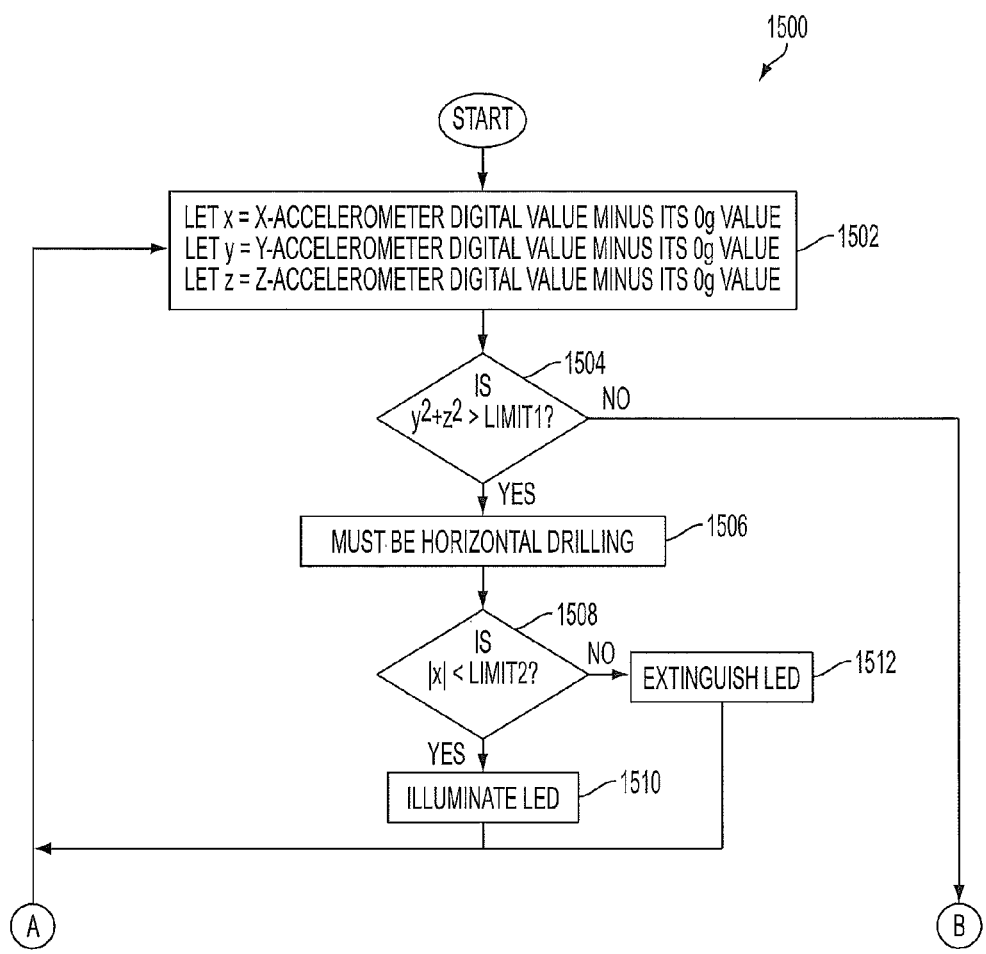
FIGS. 15A-15B are flow charts illustrating one embodiment of an algorithm for controlling illumination of the LED in the power tool of FIGS. 12A-12C in the horizontal and vertical modes of operation.
Figure 15B:
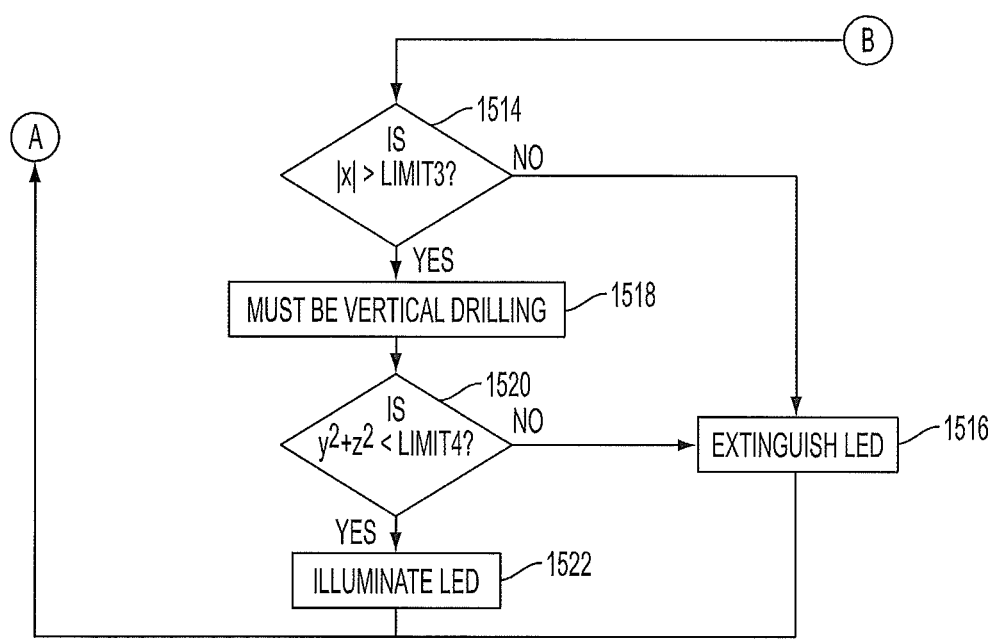

Referring also to FIGS. 15A and 15B, one implementation of an algorithm 1500 for controlling illumination of the LEDs in the horizontal and vertical modes includes the following steps. At step 1502, values for variables x, y, and z are set to be equal to the values generated by each of the X-, Y-, and Z-accelerometers, respectively, minus each of their values at zero g, or when they are perpendicular to the direction of gravity. For example, if the X-accelerometer (and the X-axis) is perpendicular to the direction of gravity, then the value of x will equal zero. If the X-accelerometer deviates from an orientation perpendicular to gravity, then the value of X will be positive if the tool is angled in the positive X direction, and negative if the tool is angled in the negative X direction. Similar relationships exist for the variables y and z and the Y- and Z-accelerometers.

At step 1504, the sum of the squares of y and z is compared to a threshold value Limit1 to determine whether drilling is horizontal. If drilling is horizontal (as shown in FIG. 12C) then the sum of the squares of y and z should be close to the digital equivalent of the g value squared. Accordingly, Limit1 is set to be half way between zero and the value of the digital equivalent of the g value squared. If $y^2+z^2$ is greater than Limit1, then at step 1505, this indicates that the drill is in a horizontal mode (as shown in FIG. 12C).

At step 1508, the microcontroller determines whether the absolute value of x is less than Limit2 (which is slightly greater than zero). If |x| is less than Limit2, this means that the tool is level, (i.e., the X-axis is substantially perpendicular to the workpiece), and at step 1510, the microcontroller drives the LED 1232 to illuminate. If |x| is not less than Limit2, this indicates that the tool is not level (i.e., the X-axis is canted upward at an angle +γ or −γ (as shown in FIG. 12C), and at step 1512, the microcontroller causes the LED to be extinguished. After one of steps 1510 and 1512, the algorithm loops back to the first step 1502, and continues until the user stops operating the power tool.

If, at step 1504, $y^2+z^2$ is not greater than Limit1, then the microcontroller proceeds to determine whether the tool is in a vertical mode. At step 1514, the microcontroller determines whether the absolute value of x is greater than a Limit3, which is slightly less than the g value for x. If |x| is less than or equal to Limit3, this indicates that the tool is not in vertical operation, the algorithm extinguishes the LED at step 1516, and loops back to the first step 1502. If, at step

1514, the microcontroller determines that |x| is greater than Limit3, then, at step 1518, this indicates that the tool is in a vertical mode.

At step 1520, the microcontroller determines whether the sum of the squares of y and z ($y^2+z^2$) is less than a Limit4, which is slightly greater than zero. If $y^2+z^2$ is less than Limit4, this means that the tool is plumb (i.e., both the Y- and Z-axes are substantially parallel to the workpiece), and at step 1522, the microcontroller causes the LED 1232 to illuminate. If $y^2+z^2$ is not less than Limit4, this indicates that the tool is not plumbed (i.e., that the tool is canted in at an angle of +α or −α, as shown in FIG. 12A, or at an angle of +β or −β, as shown in FIG. 12B). Then, at step 1516, the microcontroller causes the LED to be extinguished. After one of steps 1516 or 1522, the algorithm loops back to step 1502, and continues until the user stops operating the power tool.

Figure 16:
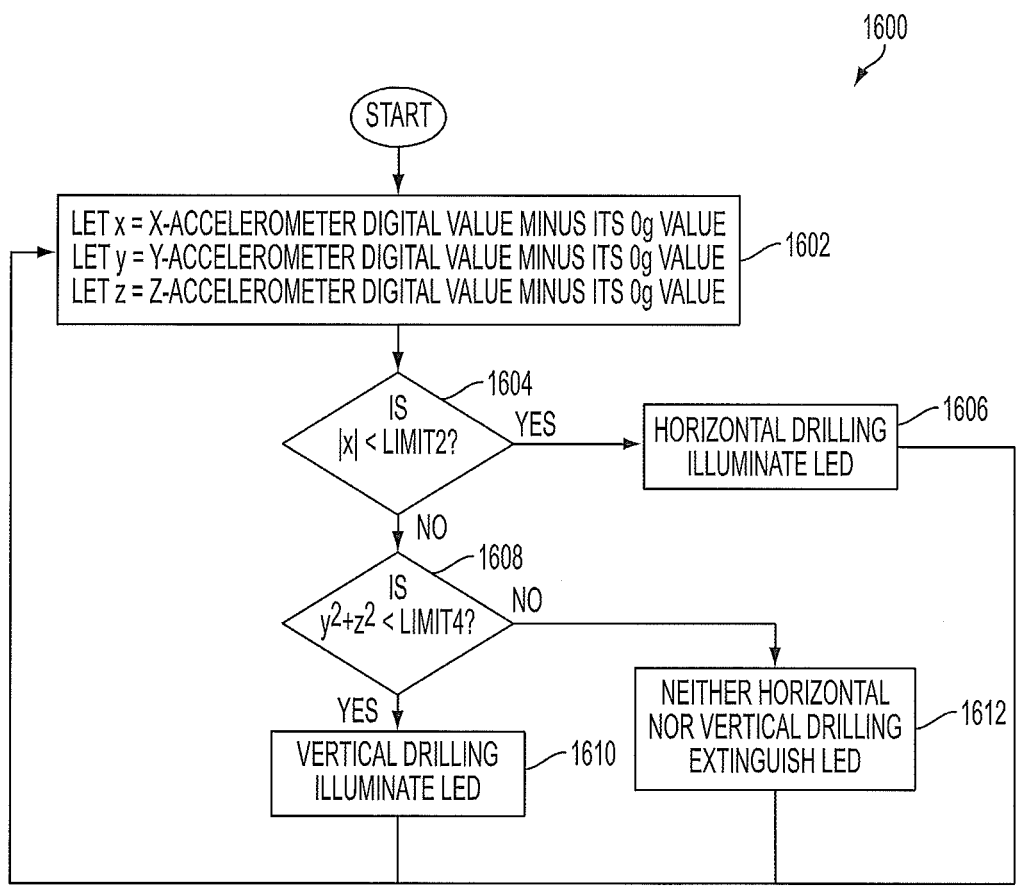
FIG. 16 is a flow chart illustrating another embodiment of an algorithm for controlling illumination of the LED in the power tool of FIGS. 12A-12C in the horizontal and vertical modes of operation.

Referring to FIG. 16, another implementation, an algorithm 1600 for controlling illumination of the LEDs in the horizontal and vertical modes includes the following steps. At step 1602, values for variables x, y, and z are set to be equal to the values generated by each of the X-, Y-, and Z-accelerometers, respectively, minus each of their values at zero g, or when they are perpendicular to the direction of gravity. For example, if the X-accelerometer (and the X-axis) is perpendicular to the direction of gravity, then the value of x will equal zero. If the X-accelerometer deviates from an orientation perpendicular to gravity, then the value of x will be positive if the tool is angled in the positive X direction, and negative if the tool is angled in the negative X direction. Similar relationships exist for the variables y and z and the Y- and Z-accelerometers.

At step 1604, the microcontroller determines whether the absolute value of x is less than Limit2 (which is slightly greater than zero). If |x| is less than Limit2, this means that the tool is operating in the horizontal mode (as shown in FIG. 12C), and is substantially level, (i.e., the X-axis is substantially perpendicular to the workpiece), and at step 1606, the microcontroller drives the LED 1232 to illuminate. If |x| is not less than Limit2, this indicates that the tool is not level in the horizontal mode, and the algorithm proceeds to step 1608. At step 1608, the microcontroller determines whether the sum of the squares of y and z, ($y^2+z^2$), is less than a Limit4, which is slightly greater than zero. If $y^2+z^2$ is less than Limit4, this means that the tool is plumb (i.e., both the Y- and Z-axes are substantially parallel to the workpiece), and at step 1610 the microcontroller causes the LED 1232 to illuminate. If $y^2+z^2$ is not less than Limit4, this indicates that the tool not operating in the vertical mode (or is so off kilter as to not even be close to plumb). If so, then at step 1612, the microcontroller extinguishes illumination of the LED 1232. After one of steps 1606, 1610, or 1612, the algorithm loops back to step 1602, and continues until the user stops operating the power tool.

Referring to FIG. 17A, in another embodiment, a power tool 1710 may be operated in the angled mode of operation, where it is intended to operate with the tool axis X perpendicular to a workpiece W that is at any arbitrary angle θ to the ground G. The power tool 1710 is similar to the power tool 1210 of FIGS. 12A-12C and 14, but additionally has a normalization switch 1750 that can be actuated by the user to indicate when the tool is initially perpendicular to the workpiece W. The normalization switch 1750 is connected to another input of the microcontroller 1402 to detect when the normalization switch 1750 is actuated. In an alternative embodiment, the trigger itself can be used as the normalization switch, such that when the trigger is pulled only a small amount it causes normalization of the tool. The reference numbers and drawings of FIGS. 12A-12C and 14 will be used to refer to the remaining elements of the power tool 1710.

Figure 18:
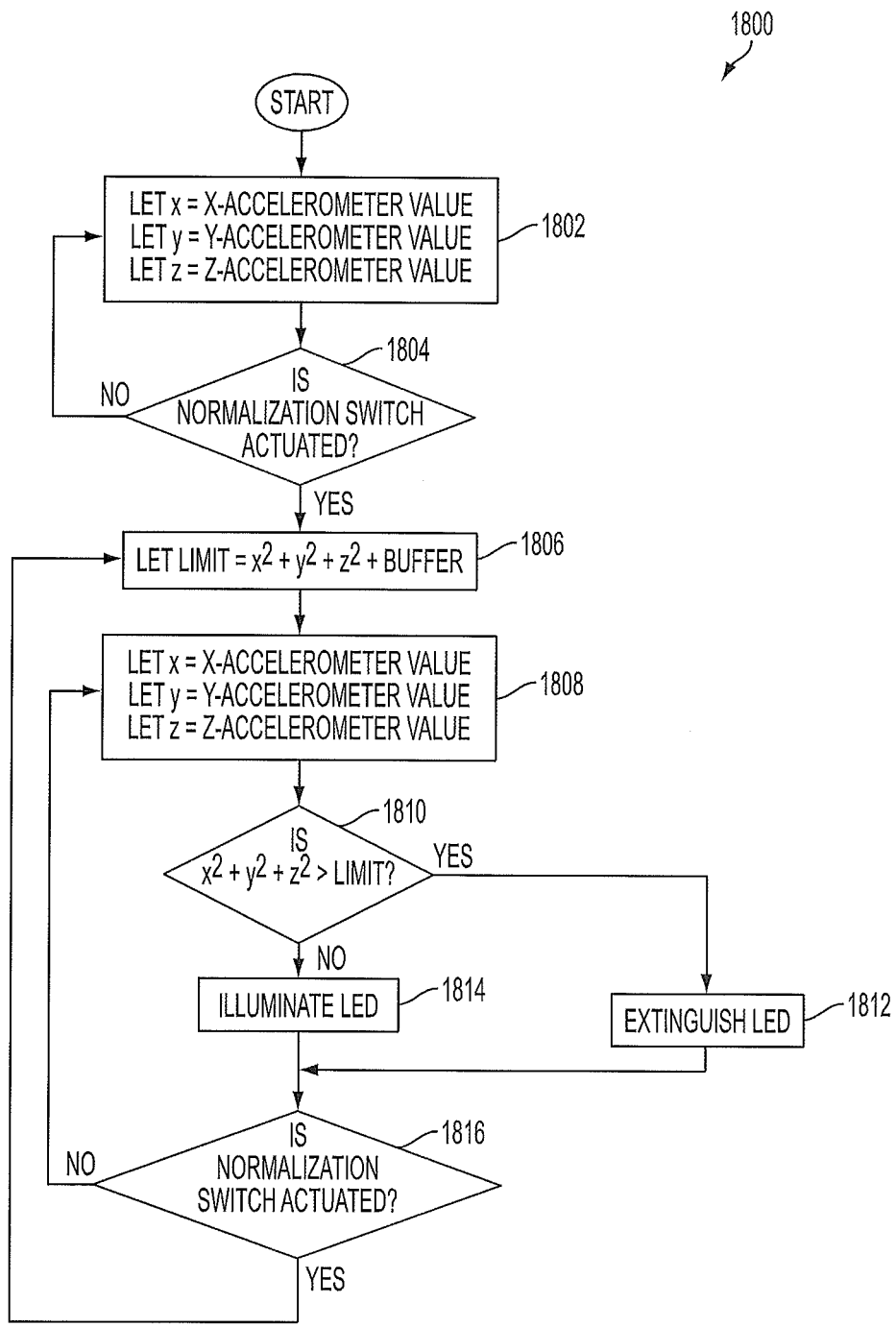
FIG. 18 is a flow chart illustrating an algorithm for controlling illumination of the LED of the power tool of FIGS. 12A-12C in the angled mode of operation.

Referring to FIG. 18, an algorithm 1800 for controlling illumination of the LED of the power tool 1710 in an angled drilling mode of operation includes the following steps. First, at step 1802, values for variables x, y, and z are set to be equal to the values generated by each of the X, Y, and Z-accelerometers, respectively. At step 1804, the microcontroller determines whether the normalization button as been actuated. If the normalization switch has not been actuated, then the algorithm loops back to step 1802, and resets the values for x, y, and z. If the normalization switch has been actuated, then the microcontroller calculates a value for a threshold value for determining whether the tool is perpendicular, and stores it in memory. The threshold value could be calculated using trigonometric Euler angle functions (e.g., as described in Weisstein, Eric W. "Euler Angles." From *MathWorld*—A Wolfram Web Resource. http://mathworld.wolfram.com/EulerAngles.html). However, for simplification and reduction of computing resources needed in the microprocessor, at step 1806, the threshold value Limit is calculated by adding the squares of the digital values from the X, Y, and Z accelerometers, and then adding a buffer value that corresponds to a small deviation tolerance (e.g., +/−5 degrees) from a perpendicular orientation of the power tool.

Next, at step 1808, values for the variables x, y, and z are reset to be equal to the values generated by each of the X, Y, and Z-accelerometers, respectively. At step 1810, the sum of the squares of x, y, and z is compared to the value for Limit. If the sum of the squares is greater than the Limit, this indicates that the tool has deviated beyond the tolerance range from perpendicular, and, at step 1812, the microcontroller causes the LED to be extinguished. Otherwise, at step 1814, the microcontroller causes the LED to be illuminated. Following steps 1812 and 1814, at step 1816, the microcontroller determines whether the normalization switch has again been actuated to re-normalize the orientation of the tool. If yes, the algorithm loops back to step 1806 to recalculate the value for Limit. If no, the algorithm loops back to step 1808 to again compare the values for x, y, and z to Limit. The microcontroller continues to run this algorithm so long as the tool is being used on the workpiece.

Figure 17B:
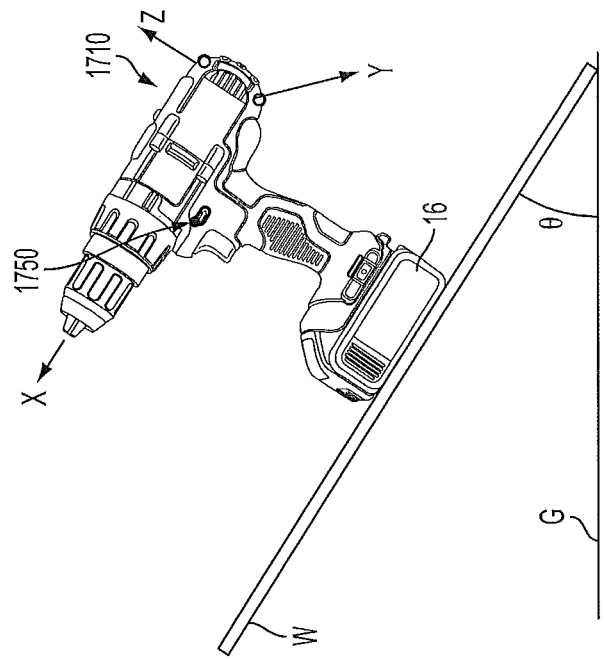
FIG. 17B is a side view of the power tool of FIGS. 12A-12C in a normalization mode for angled operation.
Figure 17A:
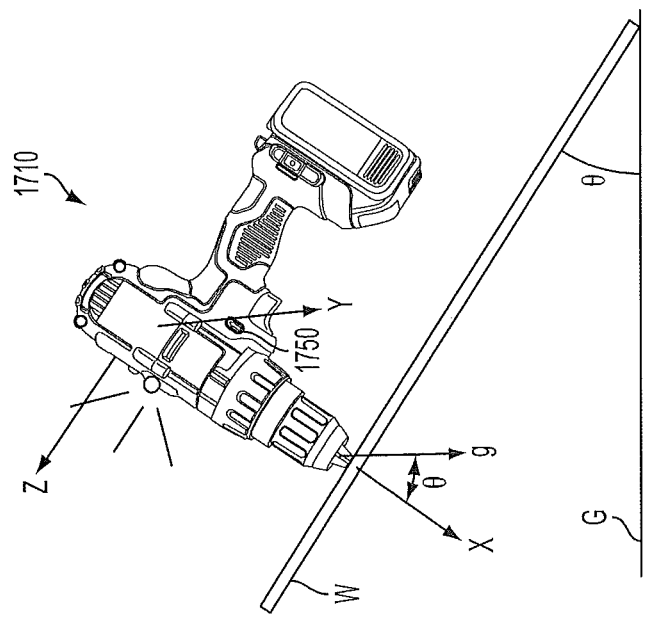
FIG. 17A is a side view of the power tool of FIGS. 12A-12C in an angled drilling mode of operation.

Referring to FIG. 17B, in another embodiment, the tool 1710 can be normalized by placing the bottom surface of the battery 16, which is parallel to the X-axis against the workpiece W. In this embodiment, the Limit value can be calculated from the values of x, y, and z by transforming their values to a frame of reference where the X-axis is orthogonal to the workpiece W, by using well-known Euler trigonometric and transfer functions. The values for x, y, and z during operation can then be compared to the Limit value to determine whether the tool has deviated from an orientation that is perpendicular to the tool axis. In alternative embodiment, one or more gyroscopes could be used instead of three accelerometers, where the three gyroscopes sense rotation of the tool about an desired tool axis, which can then be used to indicate to the user when the tool is out of alignment.

In other embodiments, it can be desirable to reduce or eliminate the effects of linear movement of the power tool along the tool axis and/or vibration from the power tool confusing measurements by the accelerometers. For example, if the user applies an axial bias and acceleration of the tool along the X-axis during a horizontal operation, the X-accelerometer will give a reading other than 0 g, which may give a false indication that the tool has been angled away from being level to the workpiece. In another example, if the level and plumb indication is implemented in a power tool that has a hammering mechanism (such as a hammer drill), the axial hammering action may transmit vibrations to the Y-, and Z-accelerometers, giving a reading for $y^2+z^2$ substantially different than zero, which would be a false indication that the tool has been angled away from being plumb. There are several ways in which to reduce or eliminate the linear movement and/or vibration effects on the accelerometers.

Figure 22:
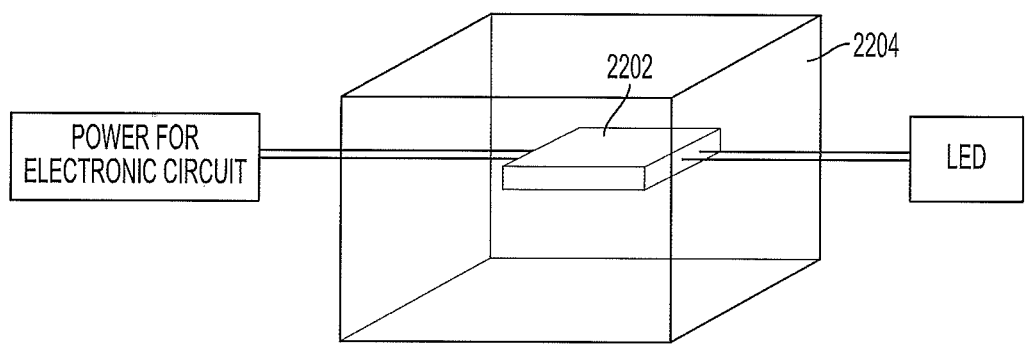
FIG. 22 is a schematic diagram of another embodiment of a power tool that has the motion sensors enclosed in material to dampen vibrations.

Referring to FIG. 22, in one such embodiment, the accelerometer sensor(s) 2202 and, optionally their circuits can be encased in a block 2204 composed of elastomeric or springy material in order to dampen, reduce, or eliminate vibrations transferred from the power tool to the sensors.

In another such embodiment, the traditional X-, Y-, and Z-accelerometers (which work based on capacitive or piezoresistive sensing of a micromachined vibrating mass) could be replaced with one or more thermal accelerometers, such as one or more MXC6226XU dual axis thermal accelerometers sold by MEMSIC, Inc. of Andover, Mass., U.S.A. A thermal accelerometer includes a single silicon chip with a proof mass of gas molecules that are heated. The accelerometer senses acceleration by sensing changes in the heat convection patterns of the gas molecules. This type of accelerometer is less subject to self-resonance energized by broad-spectrum vibrations, which encompass the self-resonant frequency, like some other kinds of accelerometers.

Figure 19A:
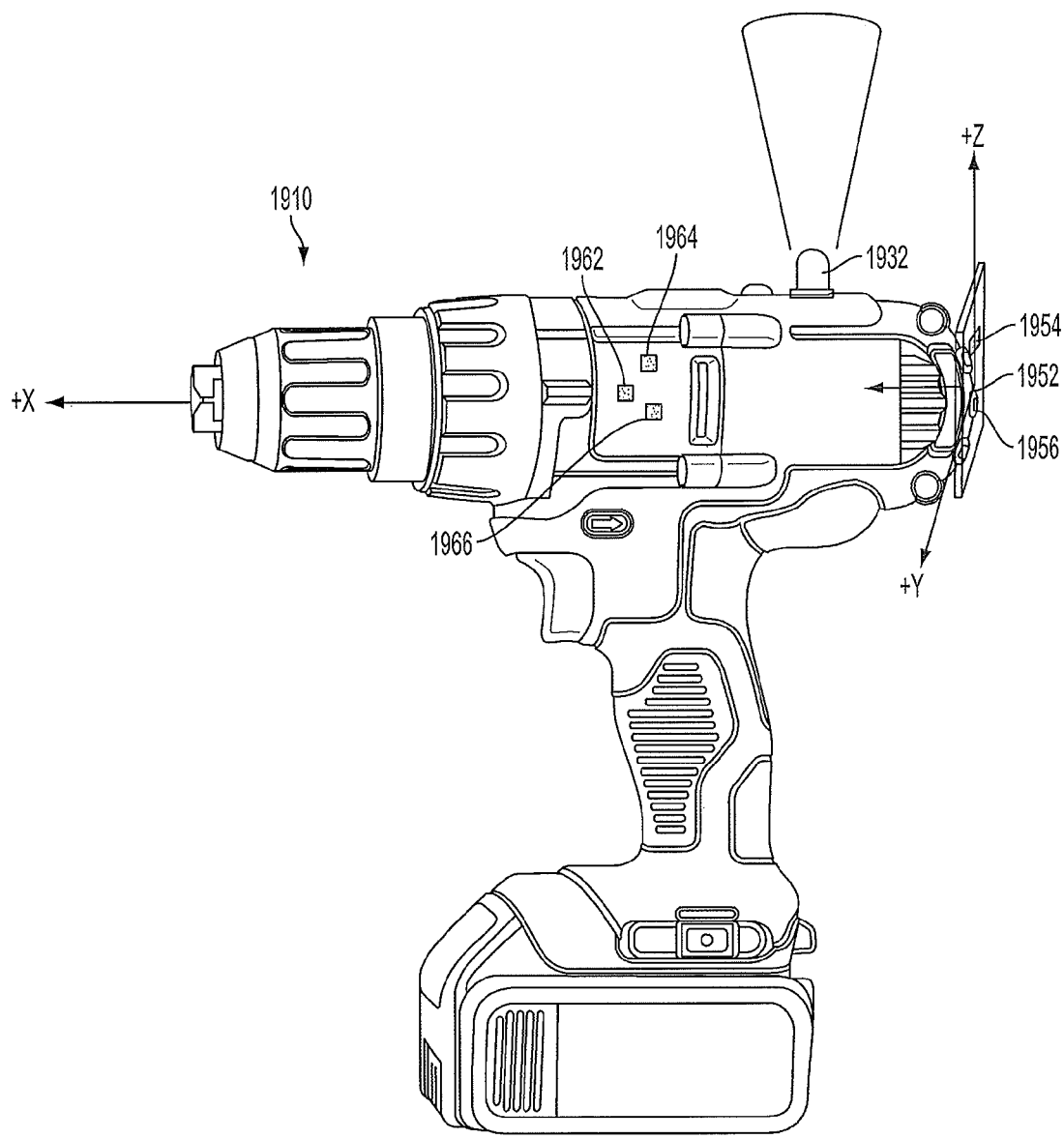
FIG. 19A is a side view of a fourth embodiment of a power tool that includes sensors for sensing linear acceleration and rotational motion of the power tool.
Figure 19B:
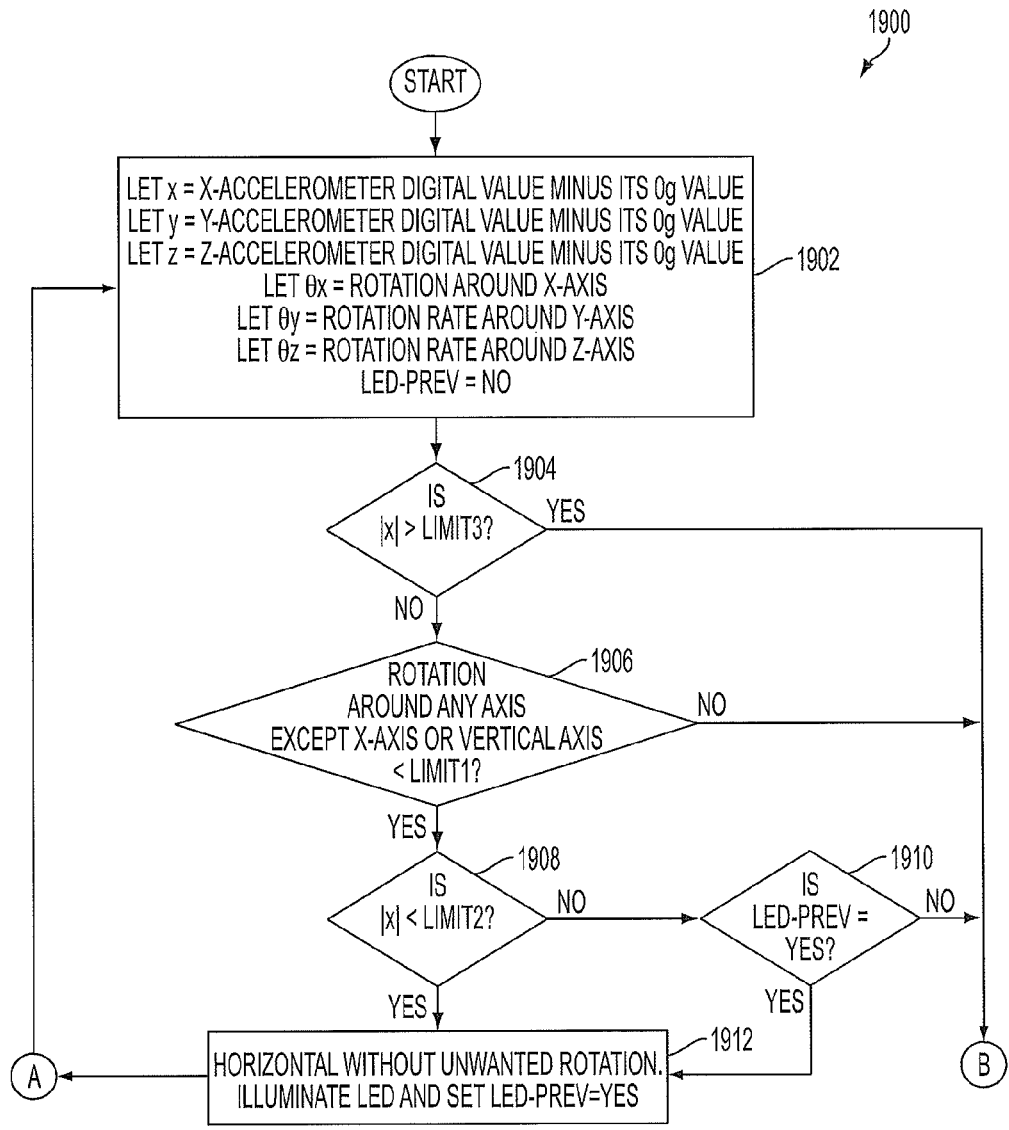
FIGS. 19B-19D are flow charts illustrating algorithms for controlling illumination of an LED of the power tool of FIG. 19A.
Figure 19C:
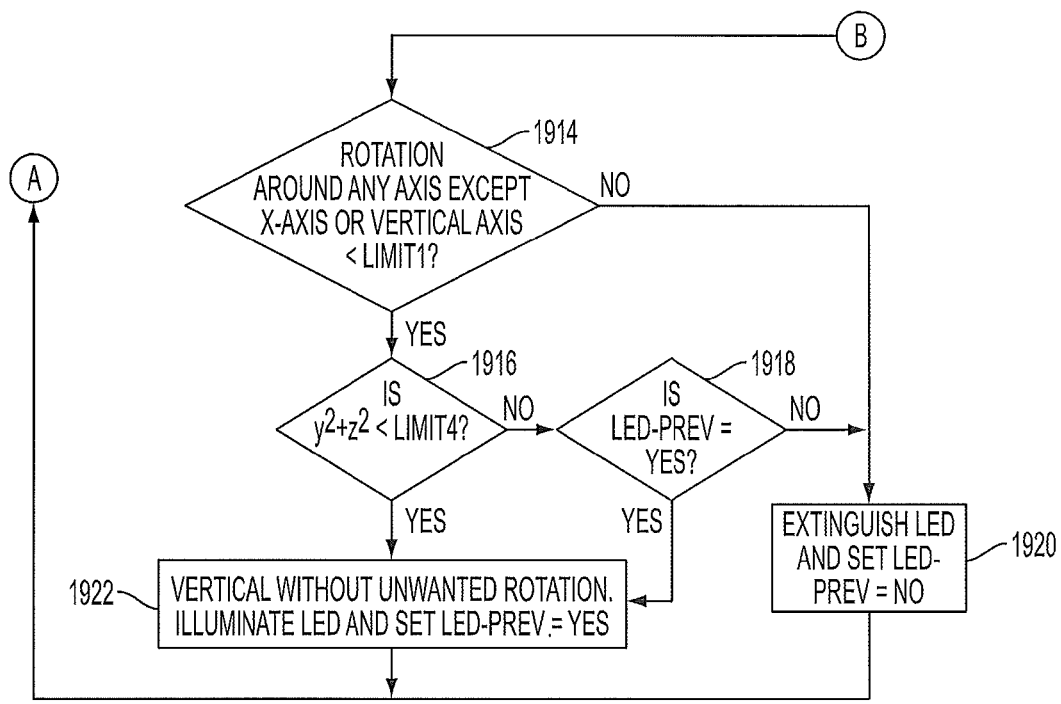
Figure 19D:
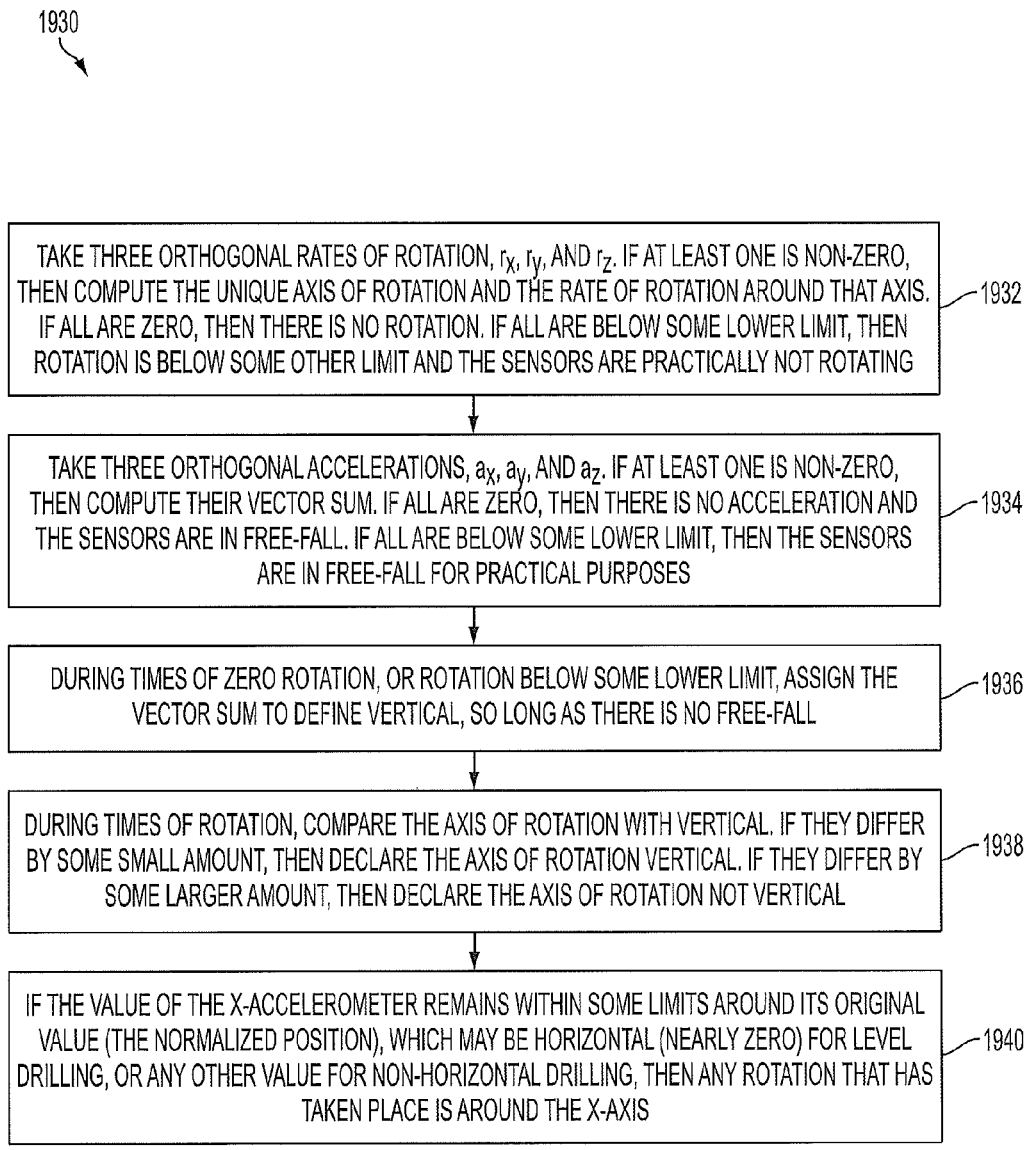

Referring to FIG. 19A, in yet another such embodiment, a power tool 1910, similar in design to the power tool 1210 of FIGS. 12A-12C, has a single LED or LED package 1932 that indicates whether the power tool 1910 is level, plumb, or perpendicular to the work surface, X-, Y-, and Z-accelerometers 1952, 1954, 1956 oriented similar to the X-, Y-, and Z-accelerometers 1252, 1254, 1256 of FIGS. 12A-12C, and additionally includes X-, Y-, and Z-gyroscopic sensors 1962, 1964, and 1966 that sense the angular rate of rotation about the X-, Y-, and Z-axes. The output signals from the three gyroscopic sensors are output to one or more inputs of a microcontroller 1970. If the values from the X-, Y-, and/or Z-accelerometers indicate that the tool is no longer level or plumb, the signals from the X-, Y-, and Z-gyroscopes enable the microcontroller 1970 to determine whether this is a false indication due to purely linear accelerations without any rotation. If the gyroscopes indicate that the tool has been rotated from its previous position about an axis other than the tool axis, then the readings from the X-, Y-, and/or Z-accelerometers are likely valid and correct, and the LED indicates that the tool is no longer level or plumb. If the gyroscopes indicate that the tool has not been rotated, or has been rotated only about the tool axis, then the readings from the X, Y-, and/or Z-accelerometers are likely to be false indications of out-of-level or out-of-plumb. In that case, the microprocessor determines whether the LED was previously illuminated, and, if so, keeps the LED illuminated. Thus, the gyroscopes can be used to reduce or eliminate the effects of purely linear acceleration due to user movement of the tool and/or due to vibrations. FIGS. 19B-19D illustrate one embodiment of an algorithm 1900 used by the microprocessor 1970 to determine when to illuminate the LED. At step 1902, values for variables x, y, and z are set to be equal to the values generated by each of the X-, Y-, and Z-accelerometers, respectively, minus each of their values at zero g, or when they are perpendicular to the direction of gravity. For example, if the X-accelerometer (and the X-axis) is perpendicular to the direction of gravity, then the value of x will equal zero. If the X-accelerometer deviates from an orientation perpendicular to gravity, then the value of x will be positive if the tool is angled in the positive X direction, and negative if the tool is angled in the negative X direction. Similar relationships exist for the variables y and z and the Y- and Z-accelerometers. In addition a YES/NO flag LED-PREV that indicates whether the LED has been previously illuminated is set to NO.

At step 1904, the absolute value of x is compared to a threshold value Limit3 to determine whether the tool is in the horizontal mode or the vertical mode of operation. Limit3 is slightly less than the g value for x. If |x| is less than or equal to Limit3, this indicates that the tool is in the horizontal mode, and the algorithm proceeds to step 1906. If |x| is greater than Limit3, this indicates that the tool is in the vertical mode, and the tool proceeds to step 1914.

If the tool is in the horizontal mode, then at step 1906, the processor determines whether the tool undergone a rotation greater than a threshold value Limit1 (set to be a relatively small angle) about the X-axis, or about a vertical axis (i.e., an axis that is parallel to the workpiece). This is determined, e.g., using subroutine 1930 illustrated in FIG. 19D. At step 1932, the three orthogonal rates of rotation rx, ry, and rz, are sensed using the three gyroscopes. If at least one is non-zero, then the unique axis of rotation and rate of rotation about that axis is calculated using well known trigonometric functions. If all are zero or below a lower limit, there is little or no rotation, and the subroutine ends. At step 1934, if there is rotation, than the three orthogonal accelerations ax, ay, and az are sensed. If at least one is non-zero, then the vector sum of these accelerations is calculated. If all are zero, or below a lower limit, then the sensors are in free-fall. At step 1936, during times of zero rotation, or rotation below a lower limit, the vector sum of the accelerations defines the vertical axis, so long as there is no free-fall. At step 1938, during times of rotation about a lower limit, the axis of rotation is compared to vertical. If they differ by some small amount, then the axis of rotation is vertical. If not, the axis of rotation is not vertical. At step 1940, if the value of the X-accelerometer is within some limit around its original (normalized) value, which may be horizontal (and thus nearly zero), for the horizontal mode, or any other value for the vertical mode, then any rotation that has taken place is around the X-axis.

Returning to a discussion of step 1906, if the rotation about the X-axis or a vertical axis is greater than Limit1, this indicates that the X-accelerometer has given a false indication of being in the horizontal mode, and the algorithm proceeds to step 1914 to evaluate the vertical mode of operation. If rotation about the X-axis or vertical axis is less than Limit1, then, at step 1908, the microprocessor determines whether the absolute value of X is less than a Limit2, which indicates that the tool is level. If so, then at step 1912, the microprocessor causes the LED to be illuminate and changes the value of LED-PREV to be YES. If not, then at step 1910, the microprocessor determines whether the value of LED-PREV is equal to YES. If YES, this indicates that the LED was already illuminated, and that the reading of X is a false reading of not being level. The algorithm proceeds to step 1912 to keep the LED illuminated, LED-PREV remains YES, and the algorithm loops back to step 1902. If not, the algorithm proceeds to step 1914 to evaluate the vertical mode.

At step 1914, the microprocessor again determines whether any rotation about the X-axis or a vertical axis is less than Limit1. If not, this indicates that the tool is not level or plumb, or is not in the vertical mode, and, at step 1920, the LED is extinguished LED-PREV is set to NO. If yes, then at step 1916, the microcontroller determines whether the sum $(y^2+z^2)$ is less than a Limit4, which is slightly greater than the $g^2$ value for these variables. If $y^2+z^2$ is less than Limit4, this means that the tool is plumb, and at step 1922, the microcontroller causes the LED to illuminate. $y^2+z^2$ is not less than Limit4, this indicates that the tool is not plumb or that the Y- and Z-accelerometer have given a false indication of being out-of-plumb. At step 1918, the microprocessor determines whether LED-PREV is YES. If YES, this indicates that the Y- and Z-accelerometers have given a false indication of being out of plumb, and at step 1922, the LED remains illuminated, LED-PREV remains YES, and the algorithm loops back to step 1902. If NO, then the tool is not plumb, and at step 1920, the microcontroller extinguishes illumination of the LED 1232, resets LED-PREV as NO, and loops back to step 1902.

Figure 21A:
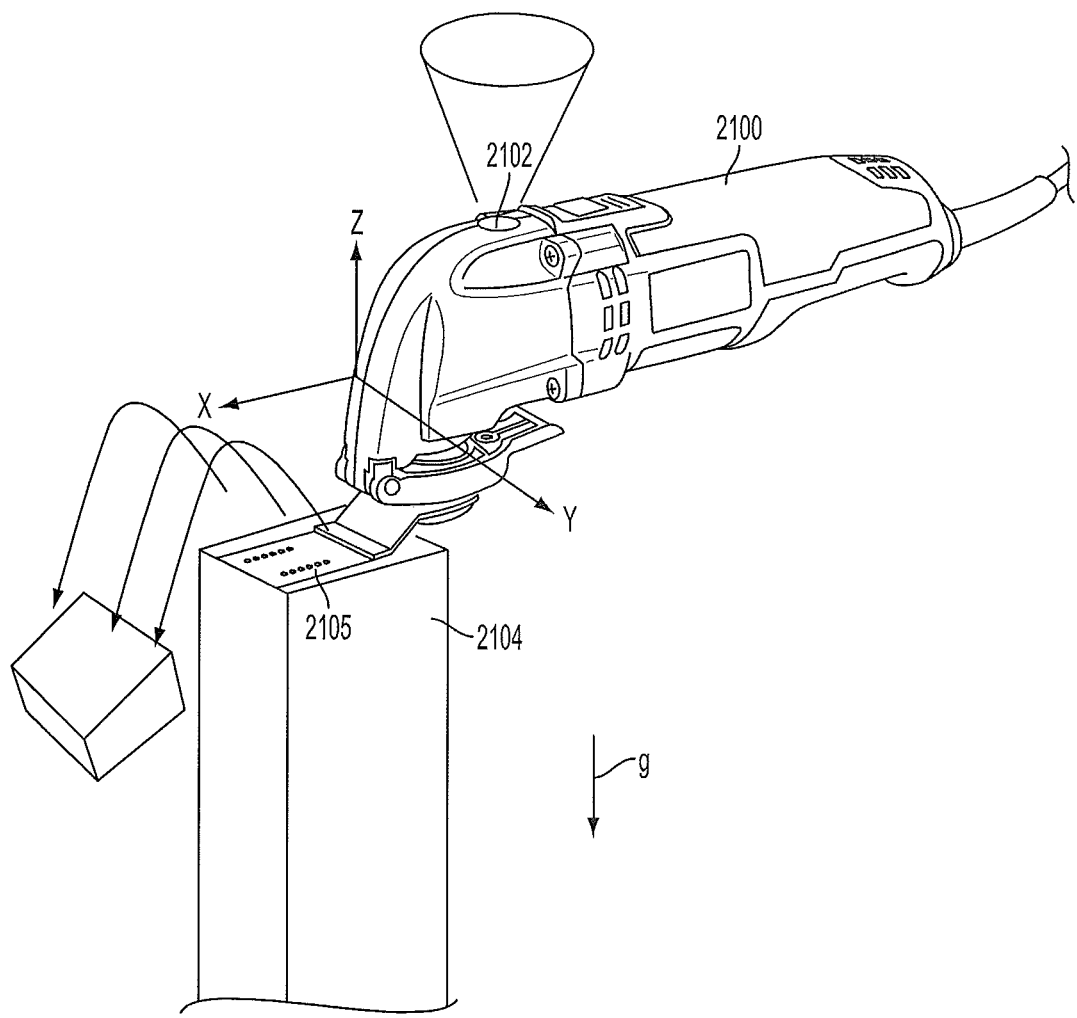
FIGS. 21A-21D illustrate various types of power tools that include LEDs for indicating when the tool is level, plumb, and/or perpendicular to a workpiece.
Figure 21B:
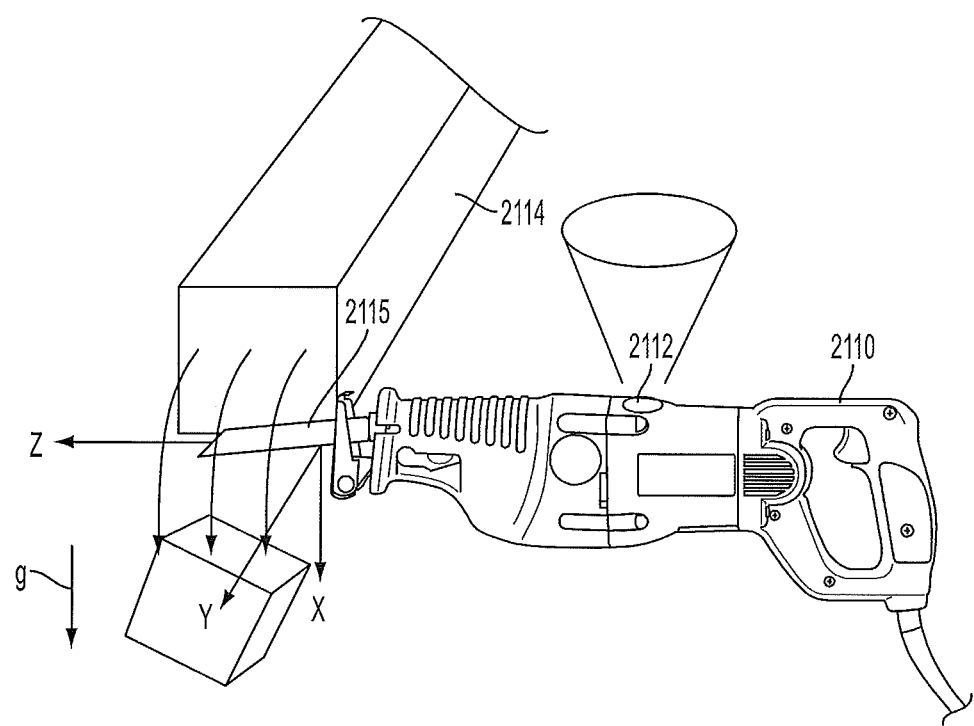
Figure 21C:
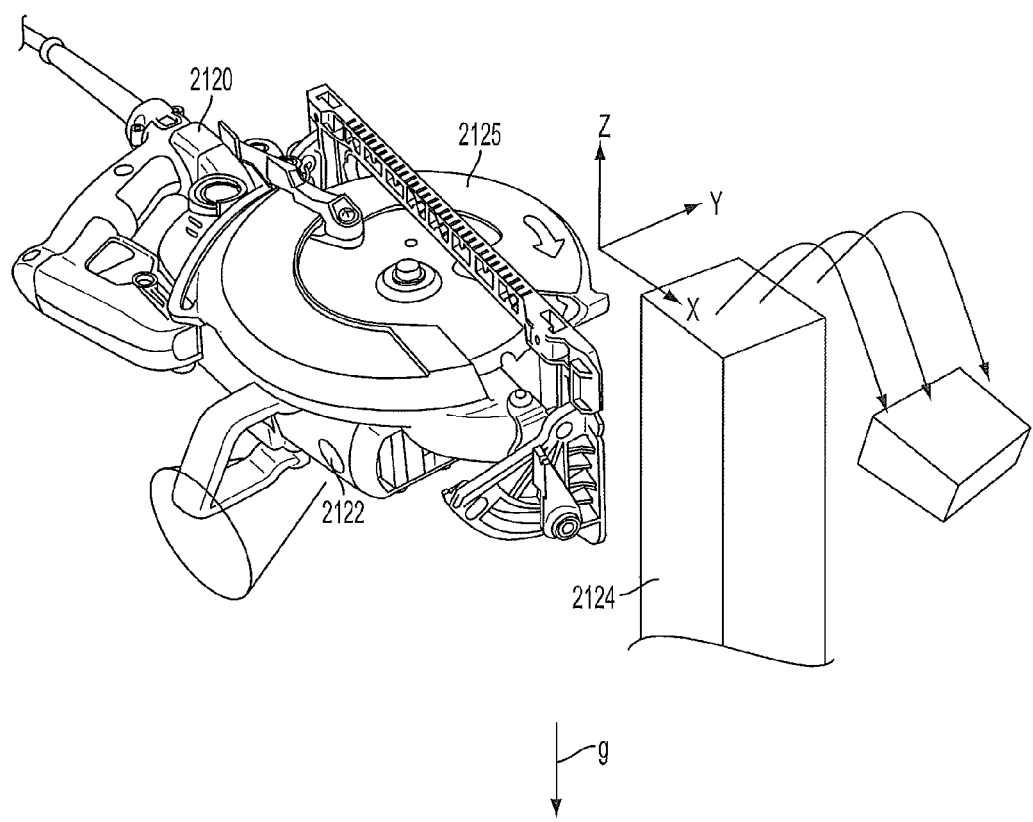
Figure 21D:
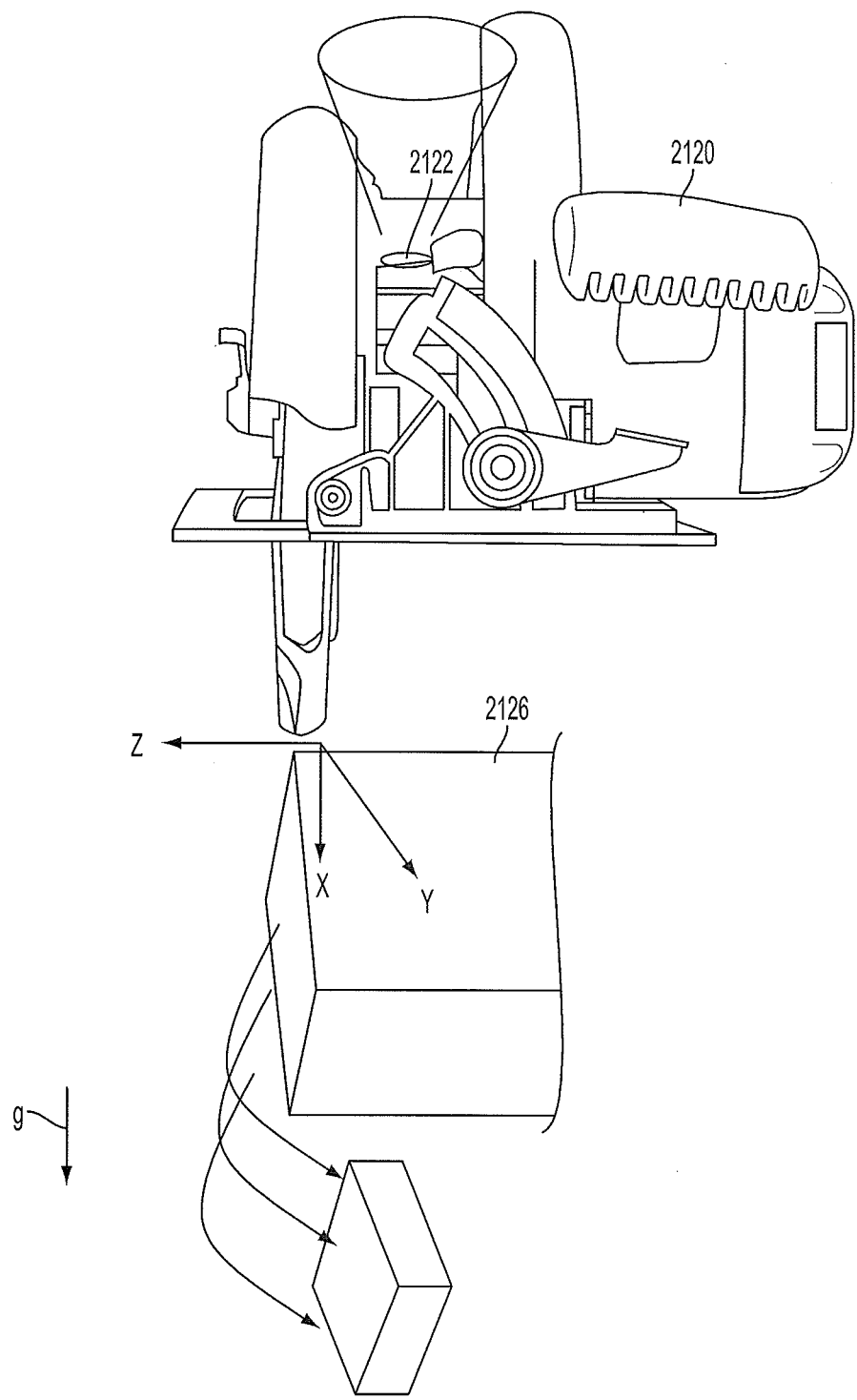

Referring to FIGS. 21A-21D, any of the above-described embodiments for indicators for level, plumb, or angled operation of a power tool, can be implemented in a wide variety of other types of power tools. For example, in FIG. 21A, an oscillating tool 2100 can include X-, Y-, and/or Z-accelerometers to determine whether the cutting blade 2105 is level (and perpendicular to gravity g) when cutting the top of a vertical post 2104, and to indicate the level condition with an LED 2102. In FIG. 21B, an reciprocating saw 2110 can include X-, Y-, and/or Z-accelerometers to determine whether the cutting blade 2115 is plumb (and parallel to gravity g) when cutting the side of a horizontal post 2114, and to indicate the level condition with an LED 2112. In FIGS. 21C and 21D, a circular saw 2120 can include X-, Y-, and/or Z-accelerometers to determine whether the cutting blade 2125 is level (and perpendicular to gravity g) when cutting the top of a vertical post 2124 (FIG. 21C) or plumb (and parallel to gravity g) when cutting the end of a horizontal post 2126 (FIG. 12D), and indicate the level or plumb condition with an LED 2122. Such systems may be implemented in numerous other types of power tools as will be apparent to those of ordinary skill in the art.

Numerous other modifications may be made to the exemplary implementations described above. For example, the accelerometers could be replaced with other types of motion sensors such as gyroscopes or inclinometers. The four LED embodiments may use a larger or smaller number of LEDs. Also, the LEDs may be mounted in another location on the tool, such as on the top of the tool in a four point compass-type array, or on the chuck of a drill. The LEDs may be configured to change colors, brighten, dim, flash, or extinguish, or otherwise change state to indicate when the tool axis is level, plumb, or perpendicular to a workpiece. The tool may include one or more switches (such as potentiometer switches or digital switches) that enable the user to change the sensitivity of the level or plumb accuracy (e.g., so that the LED may be set to extinguish if the angle from level or plumb exceeds a variable threshold value that is set by the user). Non-visual indicators could be incorporated into the tool for indicating to the user when the tool is level, plumb, or perpendicular, such as a sound generator, or a small motor for causing the handle of the tool to vibrate. The signals from the accelerometers can be filtered or otherwise processed to reduce the effects of vibration on the tool. The LEDs may be mounted on a pivoting gimbal assembly that moves in the direction of gravity so that the LEDs always point in a direction parallel or perpendicular to the direction of gravity. These and other implementations and modifications are within the scope of the invention.

What is claimed is:

1. A power tool comprising:
a housing;
an output shaft extending from the housing in a direction of a tool axis;
a motion sensor including at least one accelerometer configured to sense motion of the tool housing by detecting acceleration of the tool housing along an X-axis that is substantially parallel to the tool axis, a Y-axis that is substantially orthogonal to the X-axis, and a Z-axis that is substantially orthogonal to the X-axis and the Y-axis, the motion sensor further configured to generate at least one input signal that comprises an X input value corresponding to acceleration of the tool housing along the X-axis, a Y input value corresponding to acceleration of the tool housing along the Y-axis, and a Z input value corresponding to acceleration of the tool housing along the Z-axis;
a control circuit configured (a) to receive the at least one input signal from the motion sensor, (b) to make a first determination, based on the at least one input signal, automatically, whether the tool is being operated in a horizontal mode or a vertical mode wherein in the vertical mode the tool axis is substantially perpendicular to ground and in the horizontal mode the tool axis substantially parallel to ground, and (c) to make a second determination, based on the input signal, whether the tool axis is substantially level when the tool is being operated in the horizontal mode or the tool axis is substantially plumb when the tool is being operated in the vertical mode, wherein the control circuit is configured to make the first determination by comparing one of the input values or a result of a calculation of two of the input values to an at least one reference value that has been pre-stored independently of a user input, in order to distinguish whether the tool is being operated in the horizontal mode or the vertical mode, and
an indicator coupled to the control circuit, the indicator configured to receive an output signal from the control circuit that causes the indicator to indicate whether the tool axis is level when being operated in the horizontal mode or plumb when being operated in the vertical mode.

2. The power tool of claim 1, wherein the at least one accelerometer comprises at least three accelerometers arranged to detect acceleration of the tool housing along at least three different axes.

3. The power tool of claim 2, wherein the at least three accelerometers comprises an X-accelerometer arranged to detect acceleration along the X-axis, a Y-accelerometer arranged to detect acceleration along the Y-axis, and a Z-accelerometer arranged to detect acceleration along the Z-axis.

4. The power tool of claim 1, wherein the at least one reference value includes a first reference value, and the control circuit is configured to compare a mathematical combination of the Y input value and the Z input value to the first reference value, to make the first determination whether the tool is being operated in the horizontal mode.

5. The power tool of claim 4, wherein the at least one reference value includes a second reference value, and when the tool is being operated in the horizontal mode, the control circuit is configured to compare the X input value to the second reference value to make the second determination whether the tool axis is substantially level.

6. The power tool of claim 4, wherein the at least one reference value includes a third reference value, and the control circuit is configured to compare the X input value to the third reference value to make the first determination whether the tool is being operated in the vertical mode.

7. The power tool of claim 6, wherein the at least one reference value includes a fourth reference value, and when the tool is being operated in the vertical mode, the control circuit is configured to compare a mathematical combination of the Y input value and the Z input value to the fourth reference value to make the second determination whether the tool axis is substantially plumb.

8. The power tool of claim 1, wherein the at least one reference value includes a first reference value, and the control circuit is configured to compare the X input value to the first reference value to make the first determination whether the tool is being operated in the horizontal mode, and the second determination whether the tool axis is substantially level.

9. The power tool of claim 8, wherein the at least one reference value includes a second reference value, and the control circuit is configured to compare a mathematical combination of the Y input value and the Z input value to the second reference value to make the first determination whether the tool is being operated in the vertical mode, and the second determination whether the tool axis is substantially plumb.

10. The power tool of claim 1, wherein the control circuit comprises a microprocessor programmed to make the first and second determinations.

11. The power tool of claim 1, wherein the control circuit comprises at least one operational amplifier coupled the motion sensor, the operational amplifier configured to compare the input signals from the motion sensor to at least one reference signal make the second determination.

12. The power tool of claim 2, wherein the motion sensor further comprises a rotational motion sensor arranged to detect rotational motion of the tool housing, and the control circuit is configured to determine, based on the detected rotational motion of the tool housing, whether any of the accelerometers have given a false indication that the tool axis is substantially level or substantially plumb.

13. The power tool of claim 1, further comprising a memory unit and a normalization switch for activating an angled mode of operation, wherein when the normalization switch is actuated, a reference value corresponding to a desired orientation of the tool axis is stored in the memory unit, and the control circuit is configured to compare further input signals from the motion sensor to the reference value to determine whether the tool axis is substantially aligned with the desired orientation of the tool axis, and to generate an output signal that corresponds to whether the tool axis is substantially aligned with the desired orientation of the tool axis.

14. A method for indicating when a power tool having a housing and an output shaft extending in a direction of a tool axis is level when being operated in a horizontal mode, or plumb when being operated in a vertical mode, the method comprising:

receiving an input signal from a motion sensor that is configured to sense motion of the tool housing, the motion sensor including at least one accelerometer configured to detect acceleration of the tool housing along an X-axis that is substantially parallel to the tool axis, a Y-axis that is substantially orthogonal to the X-axis, and a Z-axis that is substantially orthogonal to the X-axis and the Y-axis, the input signal including an X input value that corresponds to the detected acceleration along the X-axis, a Y input value that corresponds to the detected acceleration along the Y-axis and a Z input value that corresponds to the detected acceleration along the Z-axis;

making a first determination, based on the input signal, automatically, whether the tool is being operated in a horizontal mode or a vertical mode, wherein in the vertical mode the tool axis is substantially perpendicular to ground and in the horizontal mode the tool axis substantially parallel to ground, wherein making the first determination includes comparing one of the input values or a result of a calculation of two of the input values to an at least one reference value that has been pre-stored independently of a user input, in order to distinguish whether the tool is being operated in the horizontal mode or the vertical mode, making a second determination, based on the input signal, whether the tool axis is level when the tool is being operated in the horizontal mode, or whether the tool axis is plumb when the tool is being operated in the vertical mode; and generating an output signal to an indicator to cause the indicator to indicate when the tool axis is substantially level when the tool is being operated in the horizontal mode or the tool axis is substantially plumb when the tool is being operated in the vertical mode.

15. The method of claim 14, wherein receiving the input signal comprises receiving input signals from an X-accelerometer arranged to detect acceleration along the X-axis, a Y-accelerometer arranged to detect acceleration along the Y-axis, and a Z-accelerometer arranged to detect acceleration along the Z-axis.

16. The method of claim 15, wherein the at least one reference value includes a first reference value, and making the first determination that the tool is being operated in the horizontal mode, and making the second determinations that the tool axis is substantially level each comprise comparing the X value to the first reference value.

17. The method of claim 15, wherein the at least one reference value includes a second reference value, and making the first determination that the tool is being operated in the vertical mode, and the second determination that the tool axis is substantially plumb comprise comparing a mathematical combination of the Y value and the Z value to the second reference value.

18. The method of claim 15, further comprising receiving a rotational motion signal from a rotational motion sensor arranged to detect rotational motion of the tool housing, and, based on the rotational motion signal, determining whether any of the accelerometers have given a false indication of the tool axis being substantially level or substantially plumb.

19. The method of claim 14, further comprising receiving a normalization signal for activating an angled mode of operation, and, when the normalization switch is received, storing a reference value corresponding to a desired orientation of the tool axis, and comparing further input signals from the motion sensor to the reference value to determine whether the tool axis is substantially aligned with the desired orientation of the tool axis, and generating an output signal to the indicator that corresponds to the determination of whether the tool axis is substantially aligned with the desired orientation.

* * * * *